(12) United States Patent
Gabiniewicz et al.

(10) Patent No.: US 6,186,013 B1
(45) Date of Patent: Feb. 13, 2001

(54) CLOSURE SYSTEM TESTING APPARATUS

(75) Inventors: Joseph V. Gabiniewicz, Novi; Guenther T. Braeuner, Farmington Falls; Galus Chelaidite, Royal Oak; Haydn W. C. Yik, Walled Lake, all of MI (US)

(73) Assignee: Atoma International Inc., Ontario (CA)

( * ) Notice: Under 35 U.S.C. 154(b), the term of this patent shall be extended for 0 days.

(21) Appl. No.: 09/250,136

(22) Filed: Feb. 16, 1999

Related U.S. Application Data

(63) Continuation of application No. 08/702,429, filed on Aug. 9, 1996, now Pat. No. 5,902,941.
(60) Provisional application No. 60/002,999, filed on Aug. 9, 1995.

(51) Int. Cl.[7] ................................................ G01N 19/00

(52) U.S. Cl. ............................................................ 73/865.9

(58) Field of Search ................................ 73/865.8, 865.9, 73/865.6

(56) References Cited

FOREIGN PATENT DOCUMENTS

| 269190 | * | 4/1992 | (JP) . |
| 6281542 | * | 10/1994 | (JP) . |
| 7069570 | * | 3/1995 | (JP) . |

* cited by examiner

*Primary Examiner*—Hezron Williams
*Assistant Examiner*—Nashmiya Fayyaz
(74) *Attorney, Agent, or Firm*—Pillsbury Madison & Sutro LLP

(57) ABSTRACT

A vehicle closure testing apparatus for opening or closing a vehicle door of any of a variety of vehicles under test comprises a supporting structure, a door moving mechanism, and an assembly selectably configured to position the door moving structure. The supporting structure positions the vehicle closure testing apparatus in spaced relationship to the vehicle under test. The door moving mechanism engages and rotates the vehicle door when the door moving mechanism is activated. The assembly enables the door moving mechanism to be movably positioned into a functional position relative to a specific door of the variety of vehicle doors having a specific axis of rotation and enables the doors having a specific axis of rotation and enables the door moving mechanism to be repositioned in a similar functional position relative to a different vehicle door having a different axis of rotation.

10 Claims, 60 Drawing Sheets

CLOSURE SYSTEM TESTING APPARATUS

This is a continuation of application Ser. No. 08/702,429, filed Aug. 9, 1996 now U.S. Pat. No. 5,902,941.

The present application claims priority as a continuation application to U.S. Pat. application of Gabiniewicz et al., Ser. No. 08/702,429, filed Aug. 9, 1996, now U.S. Pat. No. 5,902,941, issued May 11, 1999. This application claims priority from provisional application No. 60/002,999 filed on Aug. 9, 1995.

BACKGROUND OF THE INVENTION

1. Scope of the Invention

The closure system testing apparatus described herein provides full vehicle testing of all body hardware closures. As explained in more detail below, the full vehicle test system according to the present invention simultaneously operates all handles and body closures in a manner that simulates human use of those handles and closures. In that regard, the system according to the present invention assures that no extraneous loads or added mass are imparted or added to the closures and handles.

The closure system testing apparatus can be configured to open and close the doors of any of a variety of vehicles thereby eliminating the need to customize a system for any particular vehicle. The apparatus incorporates modular and adjustable fixturing of various handle and closure actuators and cyclers attachable to various main and base frames. The ability to configure the apparatus, in turn, affords the system the ability to accommodate a wide range of vehicle sizes from compact vehicles to full size vans including pick-up trucks, avoiding the need to customize the apparatus to work with a particular vehicle.

2. Prior Art

It has been known to provide a vehicle closure testing apparatus for opening and closing particular vehicle doors having a particular axis of rotation of a particular vehicle under test having a supporting structure providing support for the vehicle closure testing apparatus. These known supporting structures have been configured to be positioned either on the outside of the vehicle under test or within the interior of the vehicle under test. The known outside supporting structures have also been configured to allow a particular, fully-operational vehicle under test to be driven onto the outside supporting structure and to support the particular, fully-operational vehicle under test including the vehicle's wheels and suspension. The outside and inside supporting structures are positioned relative to the particular vehicle under test such that the supporting structure is in a spaced relationship to either the exterior surface or the interior surface of the particular vehicle door, respectively.

Such known closure systems testing apparatuses also include a door moving mechanism disposed on the supporting structure that engages the vehicle door and rotates the vehicle door in an opening direction or a closing direction when the door moving mechanism is activated. It has been known to use an outside door moving mechanism to both open and close the particular vehicle door, an inside door moving mechanism to both open and close the particular vehicle door, and both inside and outside door moving mechanisms to open and close the particular vehicle door.

These known door moving mechanisms are movably disposed on the supporting structure at a position that enables the door moving mechanisms to engage an area of contact on the particular vehicle door and are designed to move in a first direction and a second direction counter to the first direction. The door moving mechanisms engage the area of contact on the particular vehicle door and move the door in either (or both) the opening direction and the closing direction such that the area of contact remains fixed while the door moving mechanism open and close the door.

The known vehicle closure testing apparatuses also include electric actuators operatively associated with the door moving mechanisms and cause the door moving mechanisms to engage and move the particular vehicle door in either (or both) the opening direction or the closing direction. The electric actuators are controlled by an electric actuator controller communicating with the electric actuators so as to transfer control signals to the electric actuators and to receive feedback signals indicative of door movements. The electric actuator controller can control the electric actuators to obtain a desired velocity profile in the movement of the particular vehicle door.

BRIEF SUMMARY OF THE INVENTION

As most will recognize, vehicles come in many sizes and configurations, including sub-compact through full-size vehicles, vans and pick-up trucks. Each particular door of the many of variety of vehicles has a particular axis of rotation about which the particular door rotates. The degree of inclination and position of an axis of rotation of one particular vehicle door is typically quite different from the inclination and position of another vehicle door. Thus, to test any particular door, a door moving mechanism must be designed and customized to move the particular door about the particular door axis. Yet with the variety of door configurations and the corresponding need to customize a test system for each particular door, it becomes expensive to be able to test all of the variety of vehicles.

Unfortunately, prior art vehicle closure testing apparatuses fail to address this limitation. Each prior art testing apparatus was customized to move a particular vehicle door. Each time a different door needed to be tested, a new testing apparatus had to be designed and customized to work with the different door.

It is an object of the present invention to overcome the limitations of the prior art closure system testing apparatuses. In accordance with this object, a vehicle closure system testing apparatus capable of being selectably configured to move any of a variety of vehicle doors from a position outside of a vehicle under test and being capable of being re-configured to test a different vehicle door having a different axis of rotation is provided. In that regard, the present invention is a vehicle closure testing apparatus for opening and closing a vehicle door of a vehicle under test wherein the vehicle door has an exterior surface and an axis of rotation. The apparatus comprises a supporting structure positioned outside of the vehicle under test such that the supporting structure is in a spaced relationship to the exterior surface of the vehicle door and is disposed in an operative position relative to the vehicle under test during a testing of the vehicle door.

The apparatus also includes a door moving mechanism movably disposed on the supporting structure at a position on the supporting structure that enables the door moving mechanism to engage the exterior surface of the vehicle door having the axis of rotation when the supporting structure is in the operative position. The door moving mechanism is designed to move in a first direction and in a second direction counter to the first direction such that the door moving mechanism can engage the exterior surface of the vehicle door and move the vehicle door in an opening and closing direction.

The apparatus also includes an assembly disposed on the supporting structure capable of being selectably configured to position the door moving mechanism in functional positions relative to exterior surfaces of a variety of vehicle doors having different axes of rotation so that the door moving mechanism can engage and move any of the variety of vehicle doors. The door moving mechanism is movably mounted on the assembly.

The assembly is configured to enable the door moving mechanism to be movably positioned into a functional position relative to a specific exterior surface of a specific vehicle door having a specific axis of rotation such that when the specific vehicle door is under test, the door moving mechanism pivots about either an axis parallel to the specific vehicle door axis or an axis aligned and coextensive with the specific vehicle door axis. The assembly also can be selectably re-configured to re-position the door moving mechanism in a similar functional position relative to a different exterior surface of a different vehicle door having a different axis of rotation such that when the different vehicle door is under test, the door moving mechanism pivots about either an axis parallel to the different vehicle door axis or an axis aligned and coextensive with the different vehicle door axis.

It is another object of this invention to provide a vehicle closure system testing apparatus capable of being selectably configured to move any of a variety of vehicle doors from a position inside of a vehicle under test and being capable of being re-configured to test a different vehicle door having a different axis of rotation. In that regard, the present invention is a vehicle closure testing apparatus for opening and closing a vehicle door of a vehicle under test wherein the vehicle door has an interior surface and an axis of rotation. The apparatus includes a supporting structure positioned inside of the vehicle under test such that the supporting structure is in a spaced relationship to the interior surface of the vehicle door and is disposed in an operative position relative to the vehicle under test during a testing of the vehicle door.

The apparatus also includes a door moving mechanism movably disposed on the supporting structure at a position on the supporting structure that enables the door moving mechanism to engage the interior surface of the vehicle door having the axis of rotation when the supporting structure is in the operative position. The door moving mechanism moves in a first direction and in a second direction counter to the first direction such that the door moving mechanism can engage the interior surface of the vehicle door and move the vehicle door in an opening direction and a closing direction.

The apparatus includes an assembly disposed on the supporting structure capable of being selectably configured to position the door moving mechanism in functional positions relative to interior surfaces of a variety of vehicle doors having different axes of rotation so that the door moving mechanism can engage and move any of the variety of vehicle doors. The door moving mechanism is movably mounted on the assembly.

The assembly enables the door moving mechanism to be movably positioned into a functional position relative to a specific interior surface of a specific one of the variety of vehicle doors having a specific axis of rotation such that when the specific vehicle door is under test, the door moving mechanism pivots about either an axis parallel to the specific vehicle door axis or an axis aligned and coextensive with the specific vehicle door axis. The assembly can be selectably re-configured to re-position the door moving mechanism in a similar functional position relative to a different interior surface of a different vehicle door having a different axis of rotation such that when the different vehicle door is under test, the door moving mechanism pivots about either an axis parallel to the different vehicle door axis or an axis aligned and coextensive with the different vehicle door axis.

It is also an object of this invention to provide a vehicle closure system testing apparatus capable of being selectably configured to move any of a variety of vehicle doors from positions both outside and inside of a vehicle under test and being capable of being re-configured to test a different vehicle door having a different axis of rotation. In that regard, the present invention is a vehicle closure testing apparatus for opening and closing a vehicle door of a vehicle under test wherein the vehicle door has an exterior surface, an interior surface and an axis of rotation. The apparatus includes an outside supporting structure positioned outside of the vehicle under test such that the outside supporting structure is in a spaced relationship to the exterior surface of the vehicle door and is disposed in an operative position relative to the vehicle under test during a testing of the vehicle door.

The apparatus also includes an inside supporting structure positioned inside of the vehicle under test such that the supporting structure is in a spaced relationship to the interior surface of the vehicle door and is disposed in an operative position relative to the vehicle under test during a testing of the vehicle door.

The apparatus includes an outside door moving mechanism movably disposed on the outside supporting structure at a position on the outside supporting structure that enables the outside door moving mechanism to engage the exterior surface of the vehicle door having the axis of rotation when the supporting structure is in the operative position. The outside door moving mechanism moves in a first direction and in a second direction counter to the first direction such that the outside door moving mechanism can engage the exterior surface of the vehicle door and move the vehicle door in either an opening direction or a closing direction.

The apparatus includes an inside door moving mechanism movably disposed on the inside supporting structure at a position on the inside supporting structure that enables the inside door moving mechanism to engage the interior surface of the vehicle door having the axis of rotation when said the supporting structure is in the operative position. The inside door moving mechanism moves in a third direction and in a fourth direction counter to the third direction such that the inside door S moving mechanism can engage the interior surface of the vehicle door and move the vehicle door in the other of the opening direction or the closing direction.

The apparatus includes an outside assembly disposed on the outside supporting structure capable of being selectably configured to position the outside door moving mechanism in functional positions relative to exterior surfaces of a variety of vehicle doors having different axes of rotation so that the outside door moving mechanism can engage and move any of the variety of vehicle doors. The outside door moving mechanism is movably mounted on the outside assembly.

The outside assembly enables the outside door moving mechanism to be movably positioned into a functional position relative to a specific exterior surface of a specific one of the variety of vehicle doors having a specific axis of rotation such that when the specific vehicle door is under test, the outside door moving mechanism pivots about either an axis parallel to the specific vehicle door axis or an axis aligned and coextensive with the specific vehicle door axis. The outside assembly also can be selectably re-configured to re-position the outside door moving mechanism in a similar functional position relative to a different exterior surface of a different vehicle door having a different axis of rotation such that when the different vehicle door is under test, the outside door moving mechanism pivots about either an axis parallel to the different vehicle door axis or an axis aligned and coextensive with the different vehicle door axis.

The apparatus includes an inside assembly disposed on the inside supporting structure capable of being selectably configured to position the inside door moving mechanism in functional positions relative to interior surfaces of a variety of vehicle doors having different axes of rotation so that the inside door moving mechanism can engage and move any of the variety of vehicle doors. The inside door moving mechanism is movably mounted on said inside assembly.

The inside assembly enables the inside door moving mechanism to be movably positioned into a functional position relative to a specific interior surface of a specific one of the variety of vehicle doors having a specific axis of rotation such that when the specific vehicle door is under test, the inside door moving mechanism pivots about either an axis parallel to the specific vehicle door axis or an axis aligned and coextensive with the specific vehicle door axis.

The inside assembly also can be selectably re-configured to re-position the inside door moving mechanism in a similar functional position relative to a different interior surface of a different vehicle do or having a different axis of rotation such that when the different vehicle door is under test, the inside door moving mechanism pivots about either an axis parallel to the different vehicle door axis or an axis aligned and coextensive with the different vehicle door axis.

These and other objects of the present invention will become more apparent du ring the course of the following detailed description an d appended claims. The invention may be best understood with reference to the accompanying drawings.

BRIEF DESCRIPTION OF THE DRAWINGS

The present invention will become apparent from the following description when taken in conjunction with the accompanying drawings, in which.

DETAILED DESCRIPTION OF THE INVENTION

Figure 1:
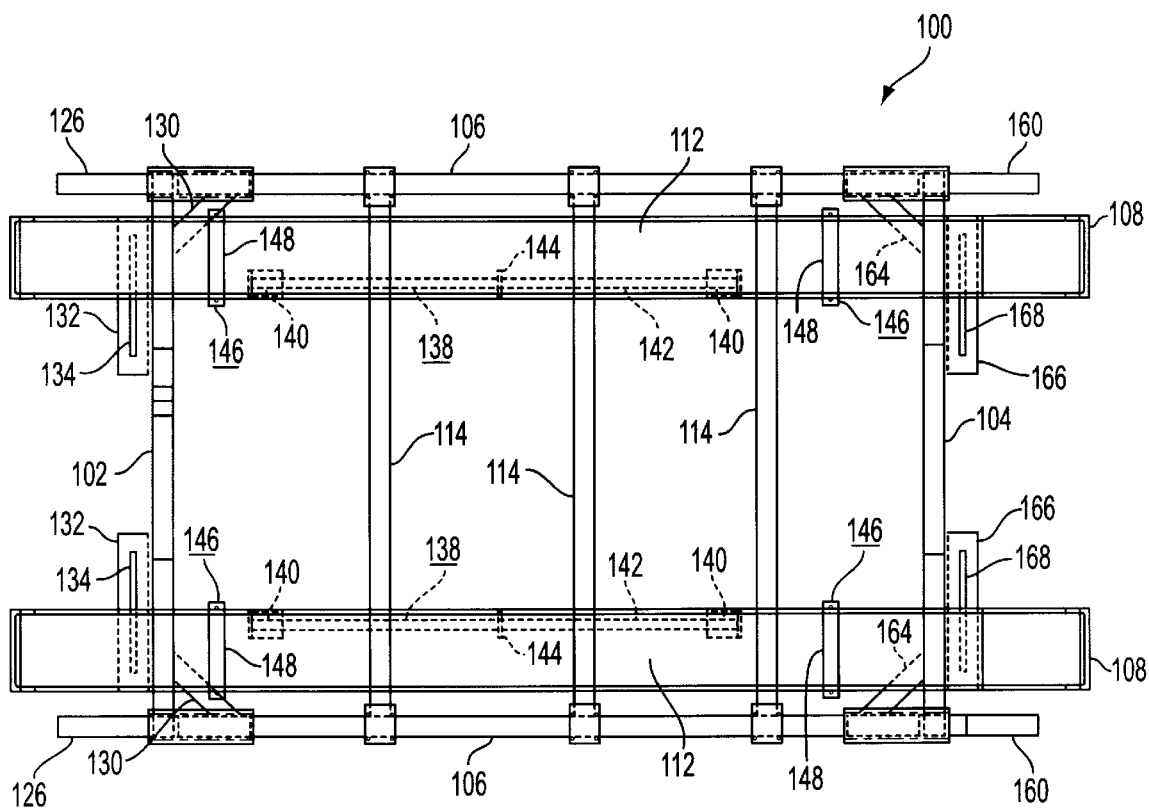
FIG. 1 is a top plan view of a small main frame of the present invention.

The foundation of the closure system testing (CST) apparatus is the system frame. As described below, the CST apparatus includes a main frame adapted to support a fully-operational vehicle under test. In other words, the frame is designed to allow a vehicle under test—fully equipped including suspension—to be driven onto the frame for closure testing. Once the vehicle under test is secured to the frame, the CST apparatus can simulate human closure of vehicle doors even though the doors may be subject to movement because they rest on the vehicle suspension.

More particularly, the CST apparatus incorporates preferably three main frames, small, medium, and large, providing the structure upon which the actuation modules are attached. The three discrete frame sizes provide the ability to position the actuation modules substantially near the body closures for all sized vehicles. In the broadest concept of the invention, however, only a single frame need be provided.

Moreover, The CST frame including a vehicle under test secured thereto is portable. The frame includes moving gears that lift the frame and vehicle under test on rollers thereby allowing the frame, modules and vehicle under test to be transported to different test locations. This feature of the frame allows the vehicle under test to be moved, for example, to a temperature chamber for cycling of closures at temperature extremes without having to move the vehicle under test to a second test frame and reconfiguring the modules.

The system according to the present invention also includes actuator modules controlled in a manner that simulates human use of vehicle closures without loading the closures with extraneous mass or force. The various actuation modules are adapted to be selectively attached at any three dimensional position relative to the vehicle under test on any of the frames. In that regard, therefore, the closure system test apparatus can accommodate any vehicle type irrespective of any particular location of handles and body closures.

The primary actuator modules are those modules that cycle vehicle doors. The term "door" is broader than just those closures that provide access to a vehicle cab. The door modules can be classified as vertically hinted door actuators, including for example, rear and side van door and automobile door actuators, and as horizontally hinted door actuators, including for example, hood and trunk actuators. Additionally, various door actuators are configured for cycling doors from an inside vehicle position, while others are configured for cycling doors from an outside vehicle position. The CST apparatus according to the present invention includes, as described in more detail below, the following door actuation modules:

VERTICALLY HINGED DOOR ACTUATORS:
  outside door actuator—90 degree rotation;
  outside door actuator—180 degree actuation;
  inside door actuator—90 degree rotation;
  inside door actuator—120 degree rotation;
  inside door actuator—180 degree rotation;
HORIZONTALLY HINGED DOOR ACTUATORS:
  assisted hood actuator;
  free-fall hood actuator;
  decklid release; and
  decklid actuator.

All of the above-referenced modules are driven by linear or rotary actuators including, for example, electric and air cylinders and electric motors. The applicants have learned, however, that electric cylinders and motors are preferred over other actuators when more precise control over velocity profiles of door closures is required to simulate human closure of vehicle doors. For example, one test requirement may be to initially close a car door slowly then accelerate the door to slam it closed. To simulate such a velocity profile, electric actuators are preferred. Additionally, electric actuators are better suited for achieving repeatable test results at temperature extremes. Outputs of hydraulic and pneumatic cylinders vary as the temperature of the hydraulic oil and air varies.

The CST apparatus also includes various handle and check load modules that cooperate with the door modules to complete a door cycle. For example, an outside door handle actuator would release a door latch by pulling an outside door handle prior to the outside door actuator cycling the door. Once the door actuator opened the door, a check load module would load the door checks. The following modules are representative of the modules that could be incorporated into the CST apparatus:
  check load actuator; and
  outside handle actuator.

Preferably, each of the actuation modules that must drive body closures through varied expected loads, small sedan compact vehicle doors versus full size coupe doors, for example, is provided in at least two force output sizes. Of course, in the broadest concept of the invention, the actuation modules need only be sized for the largest expected load. Thus, as one skilled in the art will recognize readily, the modular nature of the closure system testing apparatus provides numerous configurations that can be adapted to the design of any particular vehicle or to the requirements of the user of the presently contemplated invention. In its simplest embodiment, the closure system testing apparatus of the present invention includes one of the frames and one of the actuation modules attached thereto. Different and/or additional actuation modules can be attached to the frame to meet specific requirements.

The description of the CST apparatus that follows begins with a disclosure of the individual modules including their structure, operation and relationship to both the frame and vehicle under test. Thereafter, the overall system concept is presented.

FRAMES

Main Frames

The closure system test apparatus includes three main frames that support both the vehicle under test and the actuation modules. The main frames are sized to accommodate various sized vehicles and are embodied preferably in three sizes: small, medium, and large. The main frames substantially encircle the exterior of the vehicle under test thereby providing the foundation upon which exterior actuation modules are attached. An interior base frame is also provided. The interior base frame is disposed fixedly to the interior of the vehicle under test and provides the foundation upon which interior actuation modules are attached. Finally, a check load frame is provided. The check load frame, as described in more detail below, is disposed horizontally on a main frame and provides the foundation upon which check load fixtures are attached.

Figure 2:
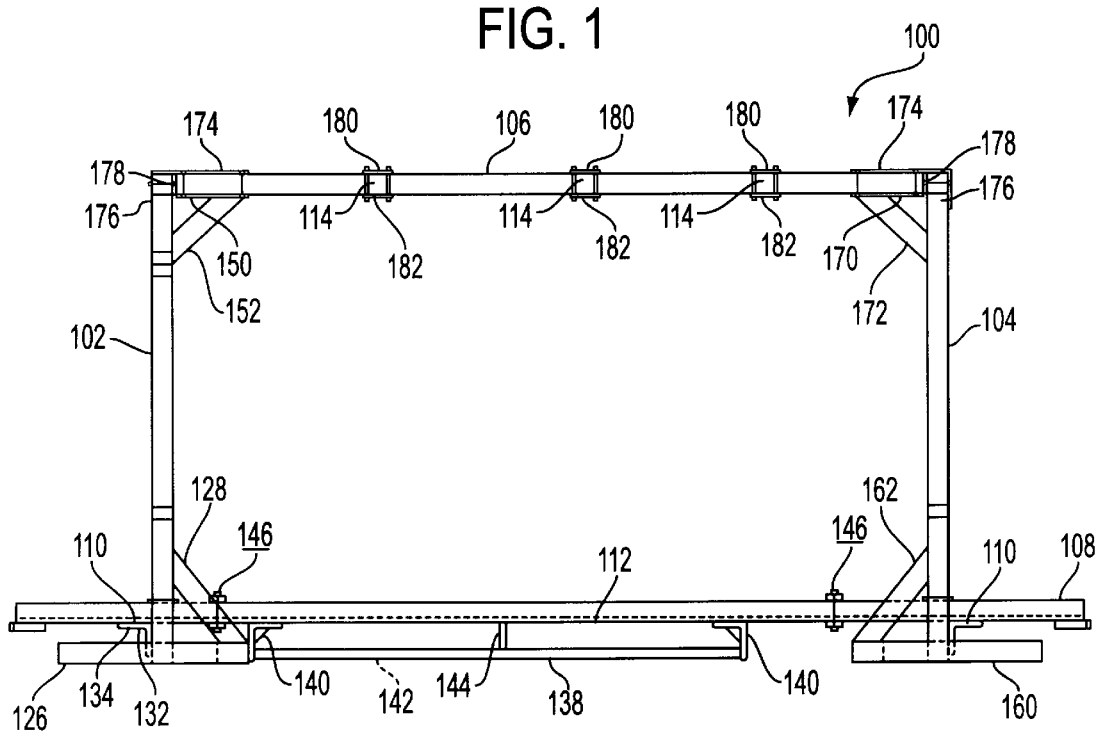
FIG. 2 is a side elevational view of a small main frame of the present invention.

As shown in FIGS. 1 and 2, the small main frame is designated generally by the reference number 100. The small main frame includes a forward frame member 102 and a rearward frame member 104 laterally spaced therefrom such that the longitudinal separation between the frame members is at least longer than the longitudinal wheelbase of a compact sedan. As configured, the forward frame member 102 can be positioned relatively forward of a forward edge of a front door of a compact sedan under test while the rearward frame member 104 is positioned rearward of a rear edge of a rear door of the vehicle under test. Preferably, the separation between the forward and rearward frame members is sufficiently wide so that an exterior side fuel door of a vehicle under test positioned on the small main frame would be between the forward and rearward frame members. Two, substantially parallel longitudinal frame members 106 are disposed on the top exterior positions of the forward 102 and rearward 104 frame members extending therebetween thus spanning the separation and connecting the forward frame member 102 to the rearward frame member 104. Two, substantially parallel vehicle supports 108, having a pair of holes 110 laterally spaced at each end providing attachment points, are disposed on a bottom interior position of the frame members extending therebetween. The vehicle supports 108 provide the bearing surface 112 upon which the vehicle under test rests and are, thus, laterally spaced at a distance substantially equal to a transverse wheelbase of a compact vehicle. Preferably, the vehicle supports 108 are constructed from "C" channel, oriented in an upwardly facing or "U" configuration, sufficiently wide to accommodate a range of compact vehicles with varied wheelbases. Preferably as well, the vehicle supports 108 extend farther than the separation between the forward and rearward frames 102, 104 thereby maximizing the ability to position the vehicle under test relative to the main frame. Finally, the small main frame includes at least one transverse member 114 disposed substantially perpendicularly between the parallel, longitudinal frame members 106. Preferably, the small main frame includes three transverse members 114.

Figure 3:
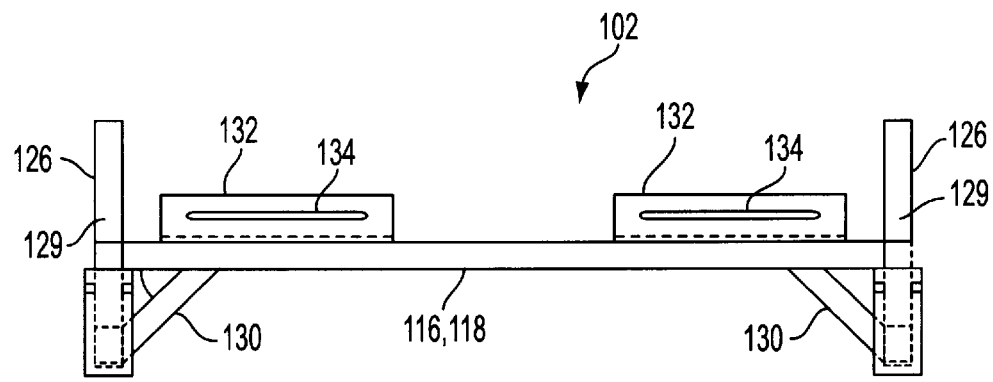
FIG. 3 is a top plan view of a support assembly of the main frame of FIG. 1.
Figure 4:
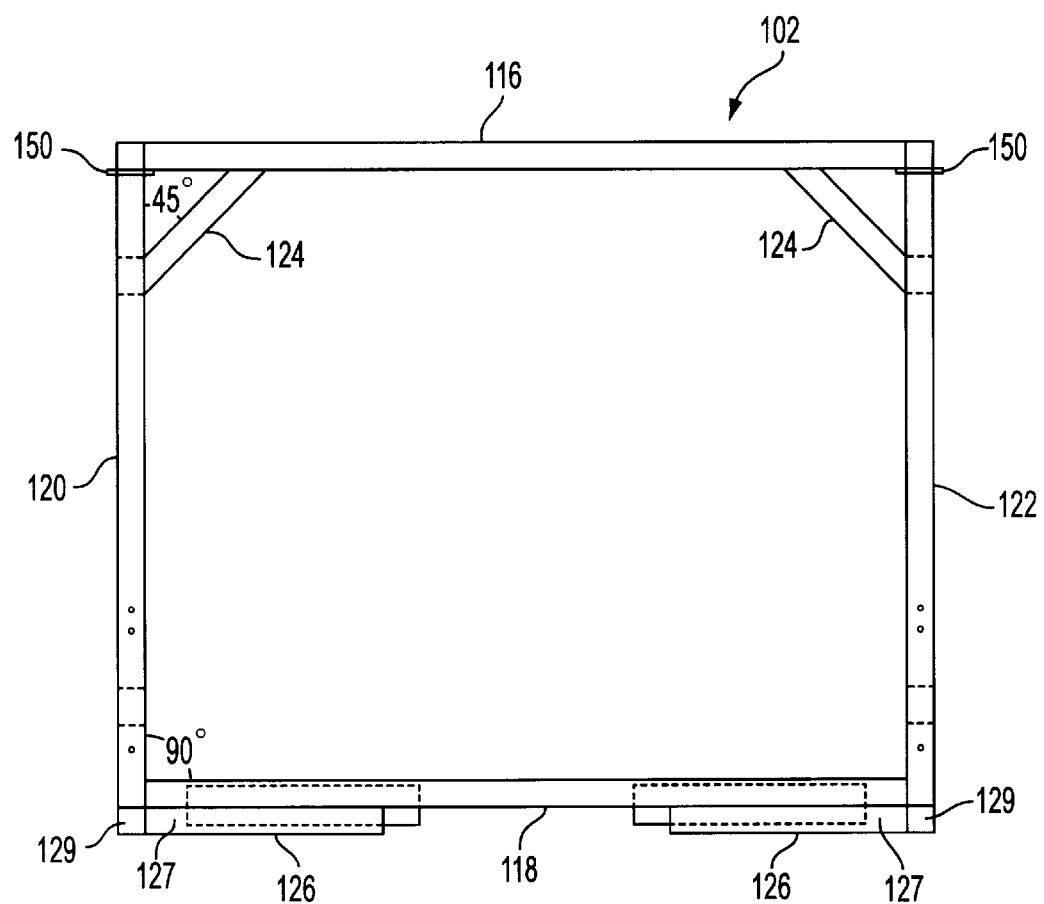
FIG. 4 is a front elevational view of a forward frame member of the mainframe of FIG. 1.

More particularly, as best viewed in FIG. 4, the forward frame member 102 comprises two, substantially parallel transverse members, conveniently labeled the upper 116 and lower 118 transverse members, vertically spaced at a distance higher than the expected height of a compact vehicle. Two substantially parallel vertical members, left 120 and right 122 vertical members, are provided. Each of the vertical members are disposed in abutting relationship to opposing ends of each of the transverse members, preferably attached by welding, such that the transverse members 116, 118 and the vertical members 120, 122 provide a rectangular configuration as viewed in the longitudinal direction. The width of the transverse members, of course, is wider than the expected width of the vehicle under test. As viewed from the longitudinal direction, a stiffener member 124 is disposed in each of the upper, inside corners of the rectangular configuration attached, preferably by welding, between the vertical members 120, 122 and the transverse members 116, 118, preferably at 45 degrees. The rectangular configuration comprising the vertical members 120, 122 and the transverse members 116, 118 is attached, again preferably by welding, to support assemblies 126. The support assemblies comprise a T-shaped member attached to the lower, outside corners of the rectangular configuration such that the vertical segment 127 of the "T" abuts a bottom surface of the lower transverse member 118. The horizontal segment 129 of the "T" extends perpendicularly to the plane formed by the rectangular configuration. As best viewed in FIG. 2, a second stiffener member 128 is disposed between each of the vertical members 120, 122 and the horizontal segment 129 of its associated T-shaped member, preferably at 45 degrees. Placement of the second stiffener members 128 forward or aft of the vertical members 120, 122 is merely a matter of design choice. As best viewed in FIG. 3, a third stiffener member 130 is disposed between each of the horizontal segments 129 of the T-shaped members and the vertical segments 127 of the T-shaped members, preferably at 45 degrees. Placement of the third stiffener members 130 forward or aft of the lower transverse member 118 is merely a matter of design choice; however, the second 128 and third 130 stiffener members should be disposed preferably on opposed sides of the rectangular configuration of the forward frame member 102.

As best viewed in FIG. 3, a pair of flanges 132 are disposed on the forward facing surface of the lower transverse member 118 such that horizontal surfaces of the flanges are substantially within the plane defined by the upper surface of the lower transverse member 118. The flanges 132 are spaced laterally from a mid point of the lower transverse member 118 at a distance corresponding roughly to the wheelbase of the vehicle under test. Preferably, a linear slot 134 extending in the transverse direction is disposed through each of the flanges 132 thereby providing a convenient place to which the vehicle supports 108 can be attached to the flanges 132 by mechanical fasteners. The linear slots 134 provide the ability to attach the vehicle supports 108 by mechanical fasteners passing through the holes 110 in the supports in various lateral positions to thereby accommodate vehicles of various wheelbases. In the alternative, the linear slots 134 may be replaced with a linear array of holes.

Figure 5:
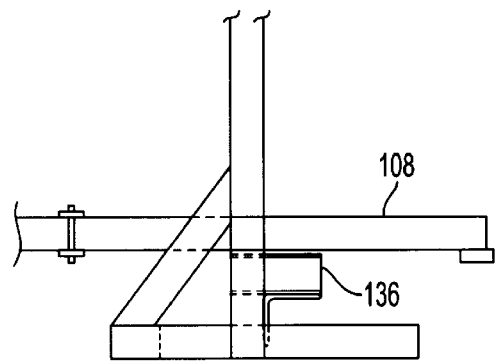
FIG. 5 is a side elevational view a support assembly of the main frame of FIG. 1.

As shown in FIG. 5, a height adjuster 136 is provided. The height adjuster 136 comprises a length of rectangular steel tube having a pair of through holes extending through both opposed walls of the tube—spaced identically with the holes of the supports 108—that can be aligned with the linear slots 134 of the vehicle supports 108. A height adjuster 136 is disposed, as required, between each flange 132 and its associated vehicle support 108 thereby providing a convenient method of adjusting the relative height of the vehicle under test.

As best seen in FIGS. 1 and 2, a tubular track assembly 138 is disposed on the underside of the vehicle supports 108. The track assembly comprises a pair of L-shaped flanges 140 fixed, preferably by welding, to the underside of each vehicle support 108. A steel tubular member 142 is fixed, preferably by welding, between each of the flanges 140 and extends substantially parallel with the vehicle supports 108. Preferably, intermediate brackets 144 fixed between intermediate positions of the tubular member and the vehicle supports are provided.

Finally, pairs of chocks 146 are provided for each vehicle support for securing the vehicle under test from longitudinal movement during testing. Each chock comprises a pair of plates 148 wider than the width of the vehicle support 108 having holes at each end. The chocks are secured to the vehicle supports by mechanical fasteners passing through the holes.

Disposed on the rearward facing surface of each of the vertical members 120, 122 substantially within the plane of the lower surface of the upper transverse member 114, a plate 150 extends rearwardly from each of the vertical members 120, 122 providing a support for the longitudinal members 106. A fourth stiffener member 152 is disposed between each of the plates 150 and the vertical members 120, 122, preferably at 45 degrees. A plurality of holes extend through the plates 150 thereby providing a location for attachment of the longitudinal members 106 to the forward frame member 102 by mechanical fasteners.

Figure 6:
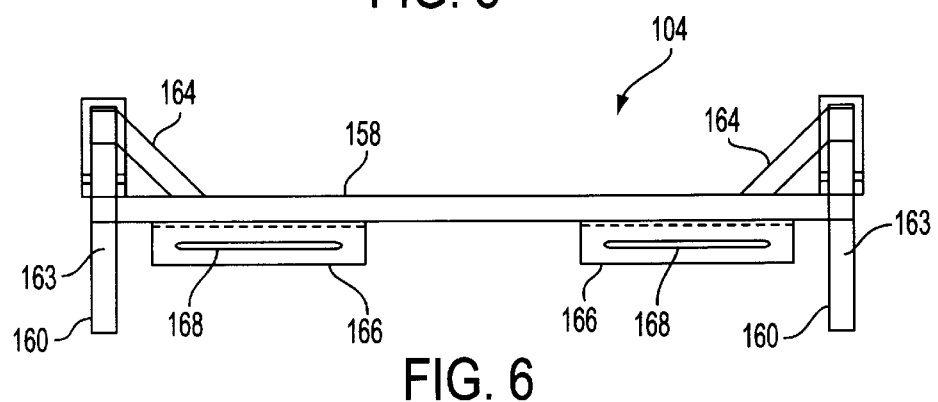
FIG. 6 is a top plan view of the support assembly of FIG. 5.
Figure 7:
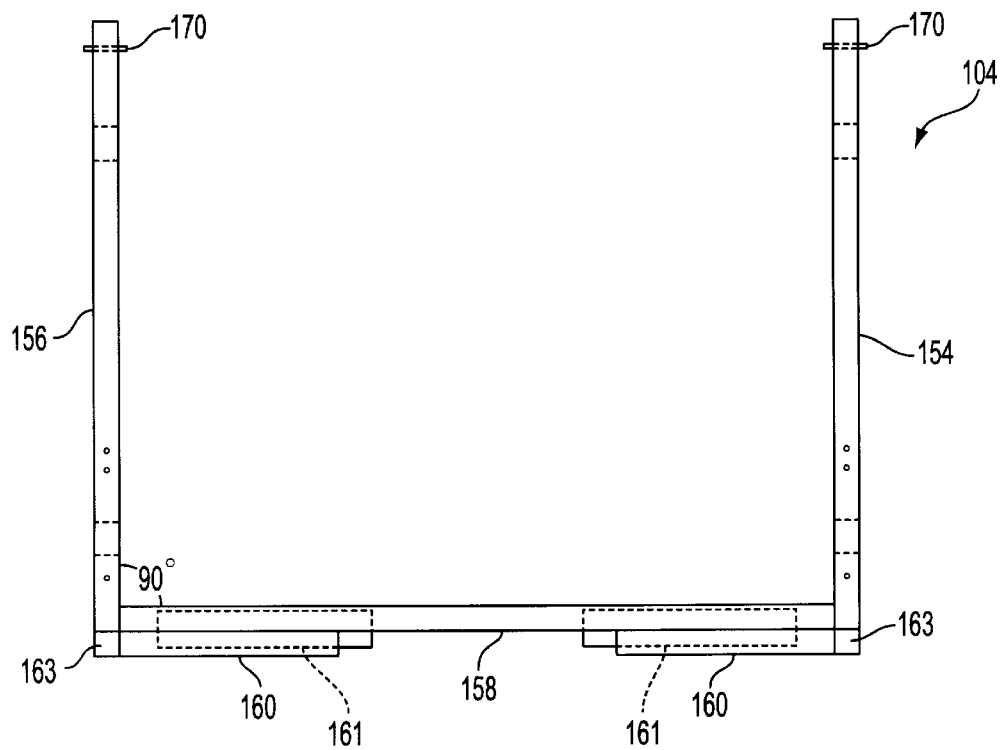
FIG. 7 is a rear sectional view of a rearward frame member of the main frame of FIG. 1.

As shown in FIGS. 6 and 7, the rearward frame member 104 comprises two, substantially parallel vertical members, conveniently labeled the right 154 and left 156 vertical members, laterally spaced at a distance greater than the expected width of a compact vehicle. A transverse member 158 is provided. The transverse member 158 is disposed in abutting relationship to lower ends of each of the vertical members 154, 156, preferably attached by welding, such that the transverse member 158 and the vertical members 154, 156 provide an upright U-configuration as viewed in the longitudinal direction. The upright U-configuration comprising the vertical members 154, 156 and the transverse member 158 is attached, again preferably by welding, to support assemblies 160. The support assemblies 160 comprise a T-shaped member attached to the lower, outside corners of the U-configuration such that the vertical segment 161 of the "T" abuts a bottom surface of the lower transverse member 158. The horizontal segment 163 of the "T" extends perpendicularly to the plane formed by the U-configuration. As best viewed in FIG. 2, a stiffener member 162 is disposed between each of the vertical members 154, 156 and the horizontal segment 163 of its associated T-shaped member, preferably at 45 degrees. Placement of the stiffener members 162 forward or aft of the vertical members 154, 156 is merely a matter of design choice. A second stiffener member 164 is disposed between each of the horizontal segments 163 of the T-shaped members and the vertical segments 161 of the T-shaped members, preferably at 45 degrees. Placement of the second stiffener members 164 forward or aft of the lower transverse member 158 is merely a matter of design choice; however, the first 162 and second 164 stiffener members should be disposed preferably on opposed sides of the U-configuration of the rearward frame member 104.

As best viewed in FIG. 6, a pair of flanges 166 are disposed on the rearward facing surface of the lower transverse member 158 such that horizontal surfaces of the flanges are substantially within the plane defined by the upper surface of the lower transverse member. As assembled, the upper surfaces of the lower transverse members 118, 158 of the forward and rearward frame members, respectively, and the horizontal surfaces of the forward 132 and rearward 166 flanges are coplanar. The flanges 166 are spaced laterally from a mid point of the lower transverse member 158 at a distance corresponding roughly to the wheelbase of the vehicle under test. Preferably, a linear slot 168 extending in the transverse direction is disposed through each of the flanges 166 thereby providing a convenient place to which the vehicle supports 108 can be attached to the flanges by mechanical fasteners. The linear slots 168 provide the ability to attach the vehicle supports 108 in various lateral positions affording the capability to accommodate vehicles of various wheelbases. Alternatively, the slots 168 can be replaced by a linear array of holes.

Disposed on the forward facing surface of each of the vertical members 154, 156 substantially within the plane of the lower surface of the upper transverse member 116 of the forward frame member 102, a plate 170 extends forwardly from each of the vertical members providing a support for the longitudinal members 106. A third stiffener member 172 is disposed between each of the plates 170 and the vertical members 154, 156, preferably at 45 degrees. A plurality of holes extend through the plates 170 thereby providing a location for attachment of the longitudinal members 106 to the rearward frame member 104 by mechanical fasteners.

The longitudinal members 106 comprise a plate 174 attached to the top surface of the longitudinal members 106, preferably by welding, to each of the opposing ends of the longitudinal members 106 and extend substantially parallel with the top surface of the longitudinal members 106 past the opposing ends. The plate is also wider than the surface to which it is attached and defines a plurality of holes on each side of the plate 174 along the portion of the plate extending over the width of the longitudinal member 106. The plurality of holes in the plates of the longitudinal members align with the holes of the longitudinally extending plates 150, 170 of the forward 102 and rearward 104 frames. Mechanical fasteners join the longitudinal members 106 to the forward 102 and rearward 104 frames. The longitudinal members 106 further comprise a second plate 176 disposed perpendicularly and downwardly on the extended ends of the first plates 174. The second or perpendicular plate 176 is also wider than the width of the longitudinal member 106. The perpendicular plates define a plurality of holes along the lateral edges. A final, unattached plate 178 having a plurality of holes that are alignable with the holes of the perpendicular plates 176 is provided for each end of the longitudinal members 106.

As configured, the longitudinal members 106 are positioned on the forward and rearward members so that the perpendicular plates 176 abut the forwardly facing surfaces of the vertical members 120, 122 of the forward frame 102 and the rearwardly facing surfaces of the vertical members 154, 156 of the rearward frame 104. The unattached plates 178 are positioned between the ends of the longitudinal members 106 and the vertical members 120, 122, 154, 156 such that the holes of the unattached plates align with the holes of the perpendicular plates. Once positioned, the first plates 174 fixed to the longitudinal members 106 are fastened to the plates 150, 170 extending from the vertical members 120, 122, 154, 156, and the perpendicular plates 176 are fastened to the unattached plates 178. This configuration affords the ability to disassemble the frame if required and provides the flexibility to change the overall length of the main frame should a longer vehicle need to be tested.

The transverse members 114, preferably three transverse members, are disposed substantially perpendicularly between the longitudinal members 106. The transverse members include a plate 180 fixed, preferably by welding, to the top surface of each end of the transverse member such that the plate extends substantially parallel with the top surface of the transverse member beyond the ends of the transverse members. The plates 180 are wider than the width of the transverse members 114 and define a plurality of holes along the lateral edges of the plates. The transverse members 114 are positioned on the longitudinal members 106 such that the ends of the transverse members abut perpendicularly against the longitudinal members and the plates 180 of the transverse members abut along the top surface of the longitudinal members. The holes of the plate are spaced such that some of the plurality of holes are on each side of the longitudinal members. An unattached plate 182 having a plurality of holes alignable with the plurality of holes of the transverse member plates 180 is disposed below each plate of the transverse members 114. The aligned plates 180, 182 clamp the transverse members 114 to the longitudinal members 106 by mechanical fasteners. As configured, the transverse members may be positioned anywhere along the length of the longitudinal members where it is necessary to support an actuation module.

As shown in FIGS. 8 through 13, medium and large main frames are also provided. The medium and large main frames 300, 500 are constructed and arranged substantially similarly as the small main frame. Common elements between the frames share the same reference characters except for the first reference digit. Reference characters 1xx, 3xx and 5xx designate small, medium, and large, respectively.

The medium main frame includes a forward frame member 302 and a rearward frame member 304 laterally spaced therefrom such that the longitudinal separation between the frame members is at least longer than the longitudinal wheelbase of a full-size car. The width and height of the forward and rearward frame members 302, 304 are sized larger than the width and height of a full-size car. Similarly, the large main frame includes a forward frame member 502 and a rearward frame member 504 laterally spaced therefrom such that the longitudinal separation between the frame members is at least longer than the longitudinal wheelbase of a full-size van. The width and height of the large forward and rearward frame members 502, 504 are sized larger than the width and height of a full-size van.

The medium and large rearward frame members 304, 504 include additional elements not found in the small rearward frame member 104. The medium and large rearward frame members 304, 305 each comprise two, substantially parallel transverse members, conveniently labeled the upper 359, 559 and lower transverse members 358, 558, vertically spaced at a distance higher than the expected height of a full-sized car and a full-sized van, respectively. Two substantially parallel vertical members, left vertical members 356, 556 and right vertical members 354, 554, are provided. Each of the vertical members are disposed in abutting relationship to opposing ends of each of the transverse members, preferably attached by welding, such that the transverse members and the vertical members provide a rectangular configuration as viewed in the longitudinal direction. The width of the transverse members, of course, is wider than the expected width of the vehicle under test. As viewed from the longitudinal direction, a stiffener member 351, 551 is disposed in each of the upper, inside corners of the rectangular configuration attached, preferably by welding, between the vertical member and the transverse member, preferably at 45 degrees. The rectangular configuration comprising the vertical members and the transverse members is attached, again preferably by welding, to support assemblies, as described above. The additional upper transverse member of the medium and large rearward frames provides additional stability and rigidity to the larger frames.

Figure 8:
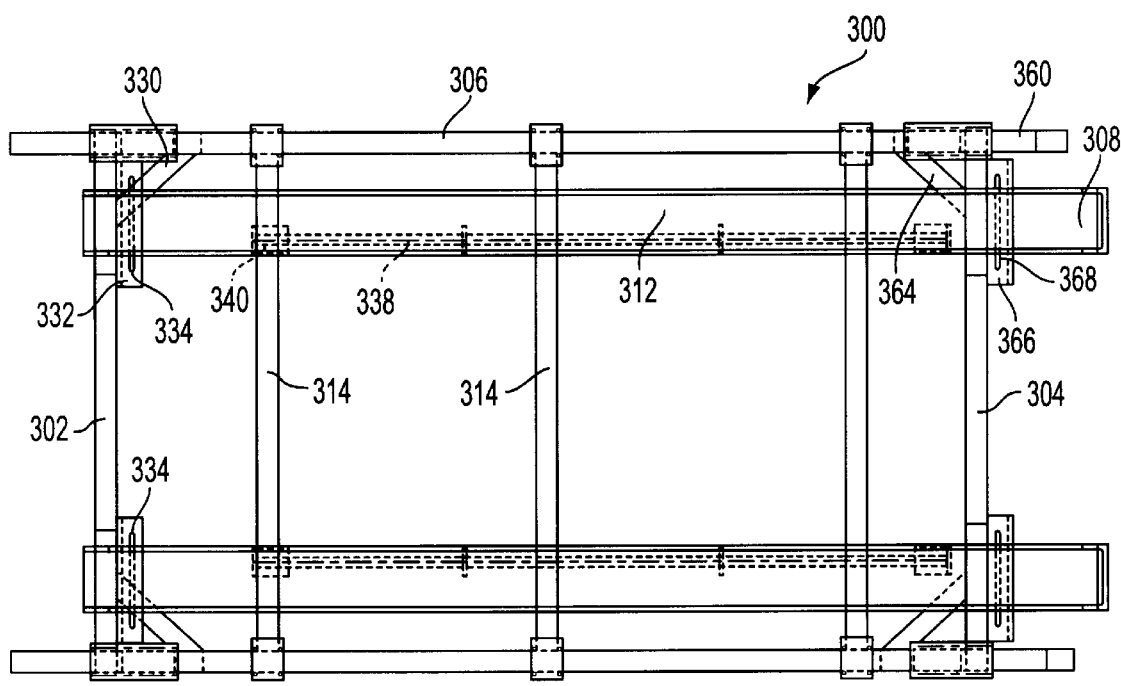
FIG. 8 is a top plan view of a medium main frame of the present invention.
Figure 9:
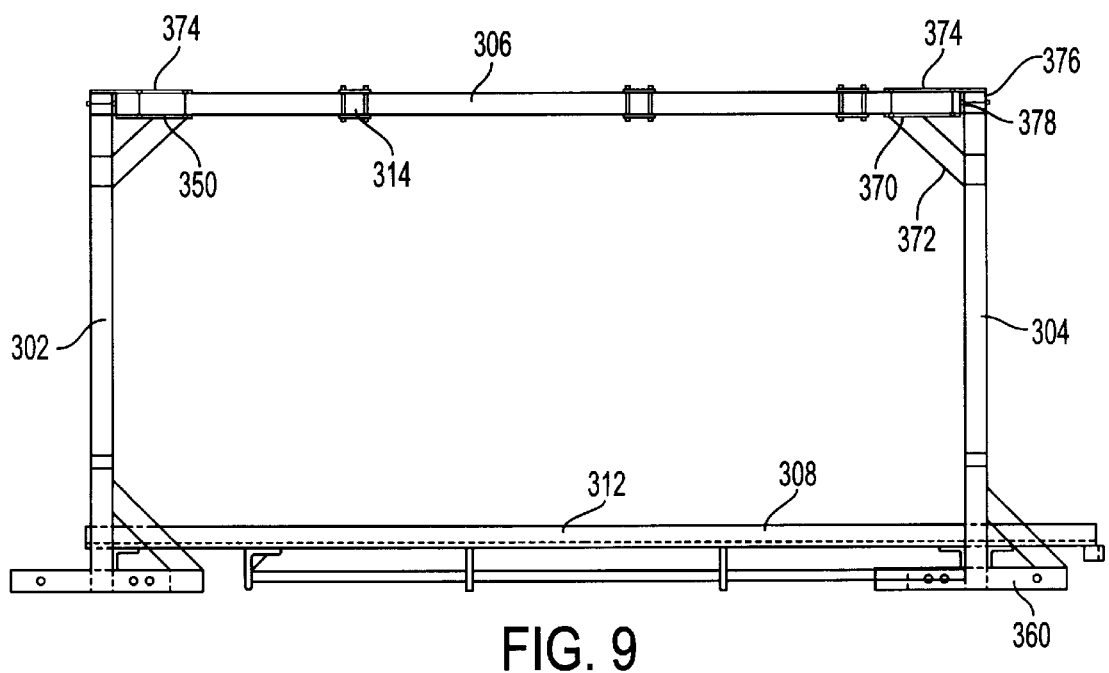
FIG. 9 is a side elevational view of the main frame of FIG. 8.
Figure 10:
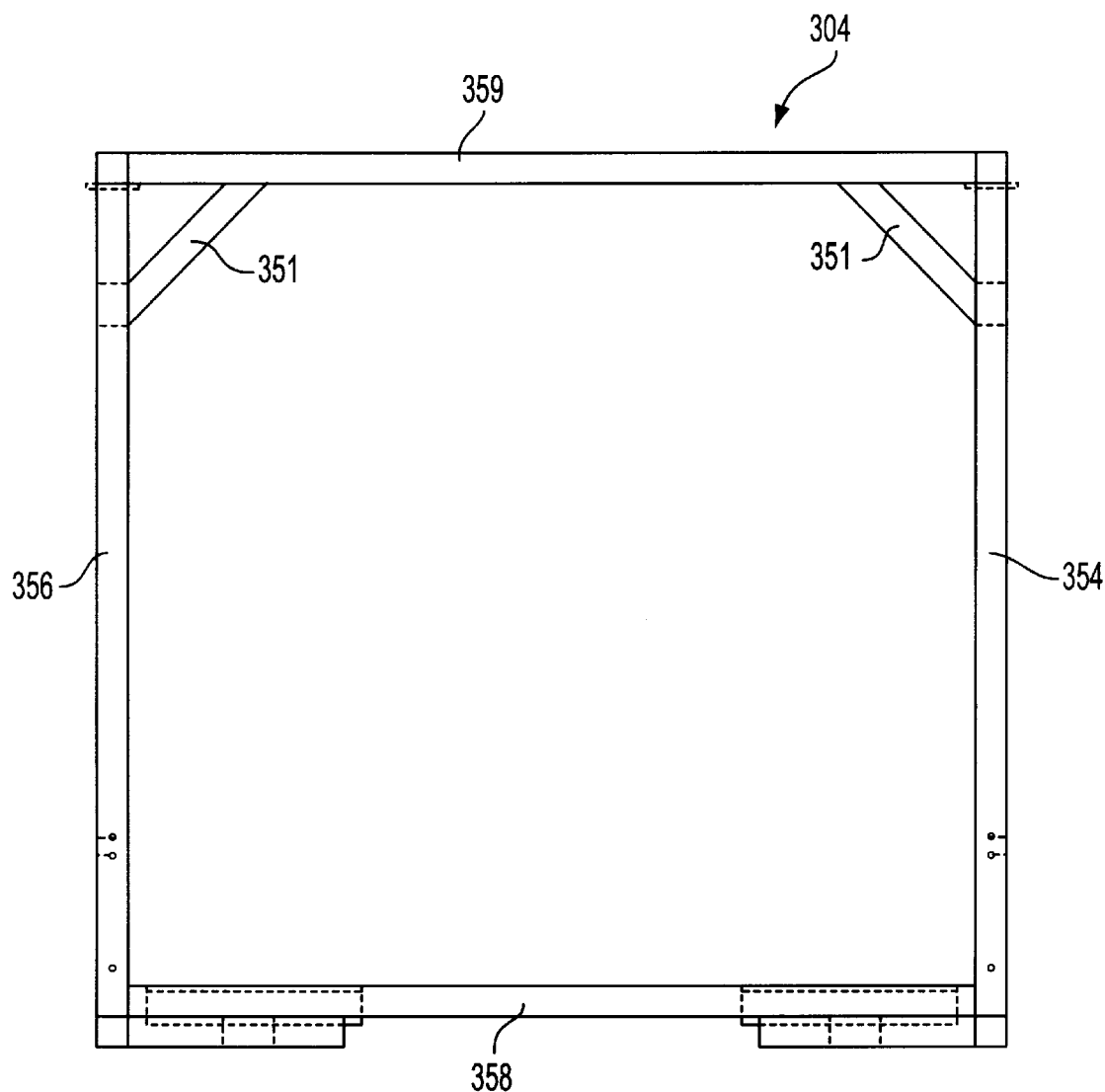
FIG. 10 is a front elevational view of a forward frame member of the main frame of FIG. 8.
Figure 11:
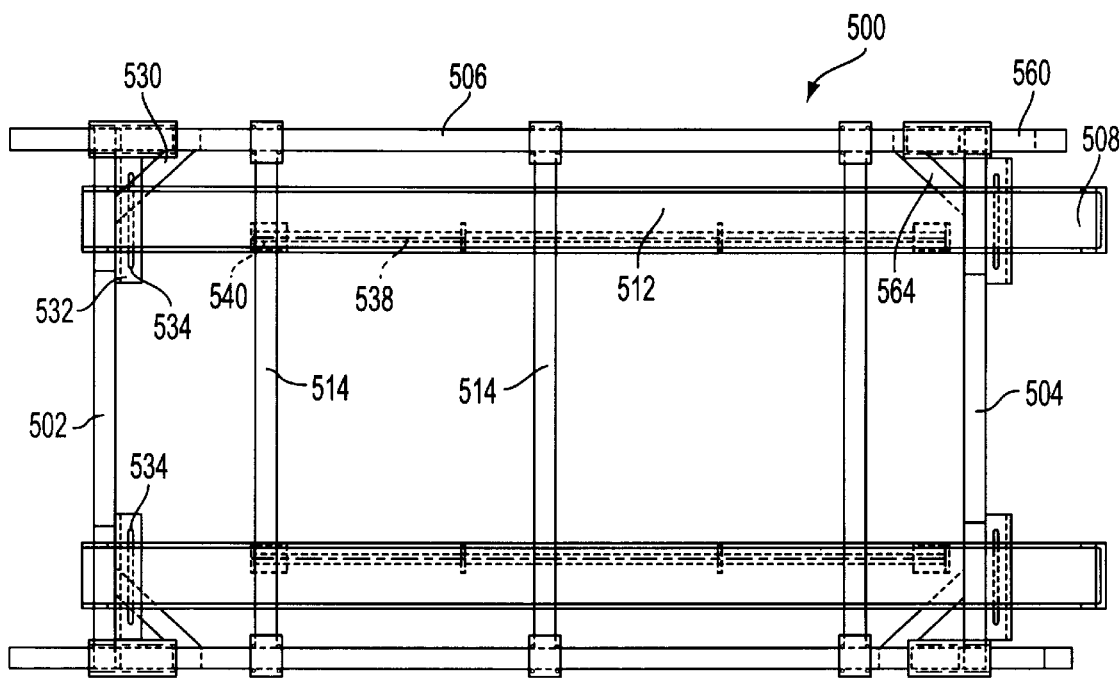
FIG. 11 is a top plan view of a large main frame of the present invention.
Figure 12:
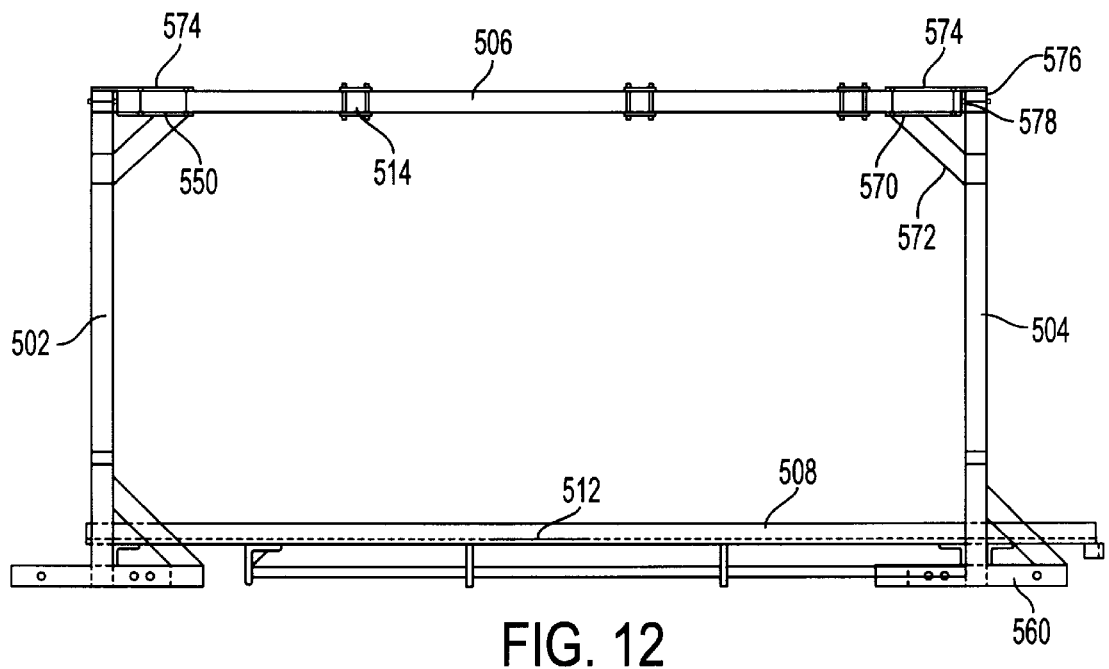
FIG. 12 is a side elevational view of the main frame of FIG. 11.
Figure 13:
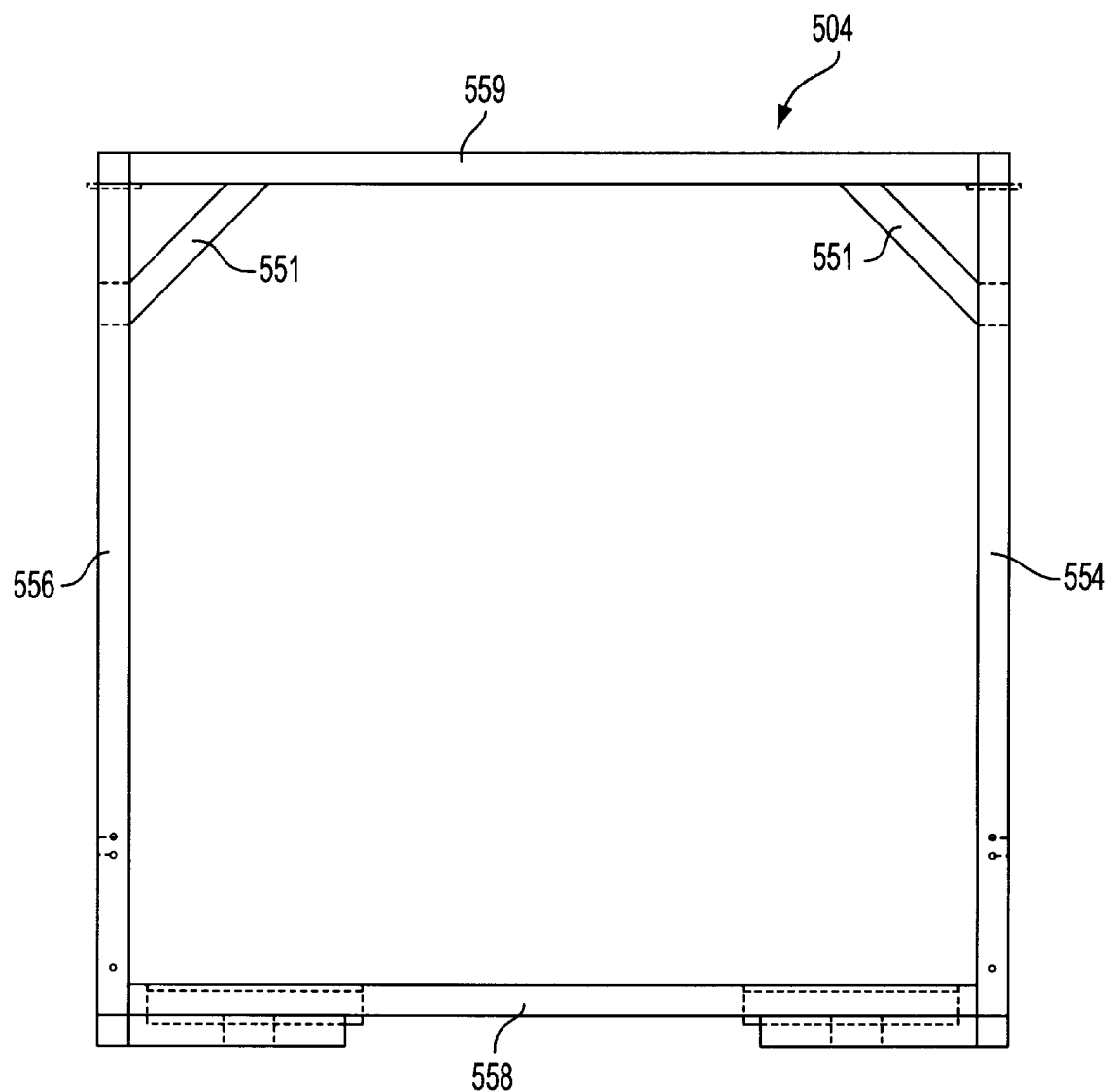
FIG. 13 is a front view of a forward frame member of the main frame of FIG. 11.

Also as shown in FIGS. 8 and 11, the flanges 332, 532 supporting the vehicle supports are disposed on the rearward facing surfaces of the lower transverse members for both the medium and large forward frame members.

For all of the main frames, the transverse, longitudinal, and vertical members are preferably constructed from rectangular steel tube.

Check Load Frame

Figure 14:
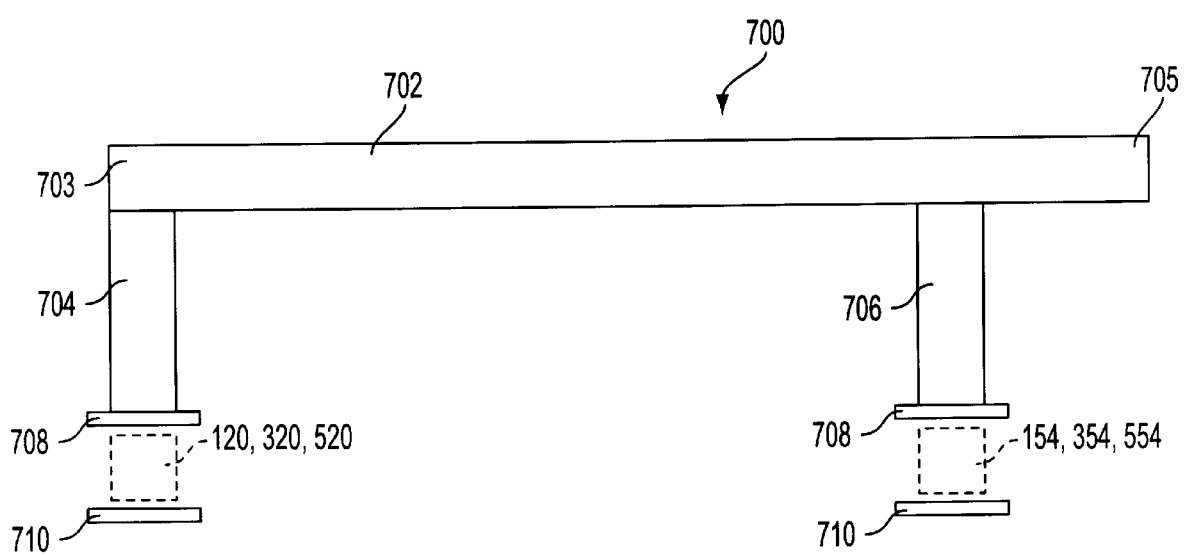
FIG. 14 is a top plan view of a check load frame of the present invention.

As shown in FIG. 14, a check load frame 700 providing support for check load fixtures, described below, is provided. The check load frame 700 comprises a longitudinal member 702 constructed preferably from rectangular steel tube and preferably having a length at least equal to the vehicle under test. As configured, the longitudinal member 702 is longer than the longitudinal members 106, 306, 506 of the main frames 100, 300, 500. A first support member 704 is fixed, preferably by welding, to the forward end 703 of the longitudinal member 702 and extends perpendicularly therefrom. A second support member 706 laterally spaced from the opposed end 705 of the longitudinal member 702 is fixed, preferably by welding, thereto and extends perpendicularly therefrom. A plate 708 is fixed to each opposing end of the support members, preferably by welding. The plates 708 define a plurality of holes around the periphery of the plate. A second plate 710 is provided for each of the support members 704, 706. The second plate 710 also defines a plurality of holes positioned identically to the holes in the first plate thereby providing a mounting bracket. As configured, the first support member 704 abuts one of the vertical members 120, 122, 320, 322, 520 or 522 of the forward frame members 102, 302 or 305, respectively and is fixed thereto by one of the second plates 710 and mechanical fasteners. The second support member 706 abuts one of the vertical members 154, 156, 354, 356, 554 or 556 of the rearward frame members 104, 304, 504, respectively and is fixed thereto by the other second plate 710 and mechanical fasteners. Conventional mechanical fasteners are used to mount the check load frame to the main frame.

Inside Base Frames

Figure 15:
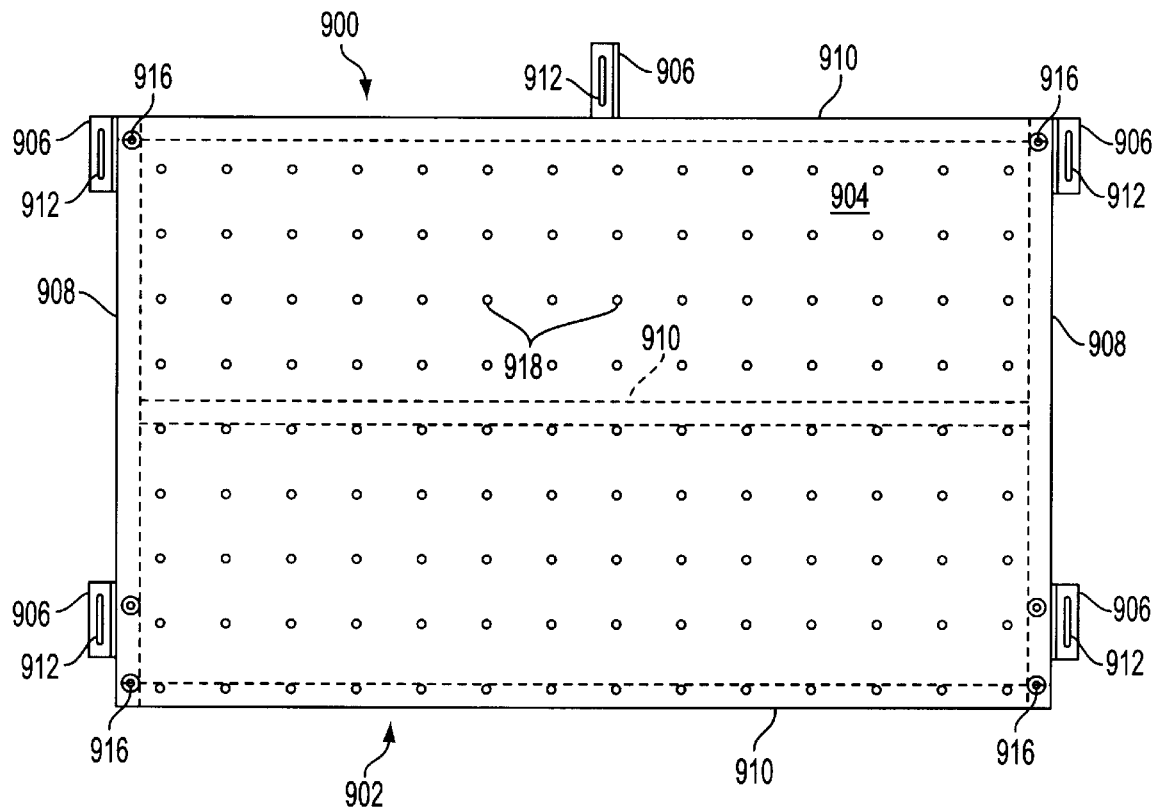
FIG. 15 is a top plan view of an inside base frame of the present invention.
Figure 16:
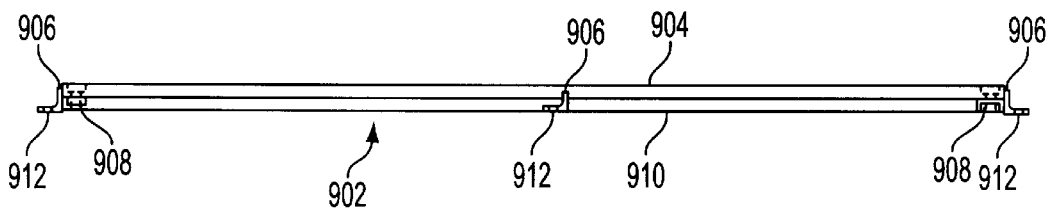
FIG. 16 is a side elevational view of the inside base frame of FIG. 15.

The closure system test apparatus also includes an interior base frame 900. The interior base frame 900, one embodiment of which is shown in FIGS. 15 and 16, is disposed fixedly to the interior of the vehicle under test and provides the foundation upon which interior actuation modules are attached. Generally, the interior base frame 900 includes a support frame 902, a base plate 904 attached to the support frame 902, and a plurality of flanges 906 also attached to the support frame 902. The plurality of flanges 906 provide the points of attachment, preferably by mechanical fasteners, to fix the interior base frame 900 to the interior of the vehicle under test.

More specifically, the support frame includes two transverse members 908 disposed on the bottom surface and along the longitudinal edges of the base plate 904. A plurality of longitudinal members 910, also disposed on the bottom surface of the base plate 904, abut the transverse members 908 at each of their opposed ends. Both the transverse members 908 and the longitudinal members 910 are constructed preferably from rectangular steel tubing. The transverse members 908 are disposed substantially parallel to each other in the transverse direction along the interior floor of the test vehicle. The top surface of the transverse members 908 each define at least one hole proximate to each end of each transverse member 908. The plurality of longitudinal members 910 are disposed substantially parallel to each other, along the longitudinal direction, proximate to the interior floor of the test vehicle such that the support frame members 908, 910 form a fixed rectangular frame 902.

Each opposing end of the longitudinal members 910 is attached to a face of a transverse member 908, preferably by welding. Any interior members of the plurality of longitudinal members 910 is disposed substantially equidistantly from the longitudinal members 910 disposed along the edges of the base plate 904. The top surfaces of the support frame members 908, 910 are all substantially within a single plane such that the frame 902 provides a surface to support the base plate 904.

The base plate 904 is sized and shaped to fit within the interior space of a vehicle under test. A rectangular configuration has proven suitable. The base plate 904 also defines a first plurality of holes 916 and second plurality of holes 918 therein. The first plurality of holes 916 in the base plate 904 are proximate to the four corners of the plate 904 such that each hole is aligned with one of the four holes defined by the two transverse members 908. Each of the first plurality of holes 916 in the base plate 904 is wider at the top of the hole than at the bottom of the hole in a manner suitable for recessing the head of a mechanical fastener. The base plate 904 is attached to the support frame 902 by passing a mechanical fastener through each of the first plurality of holes 916 in the base plate 904 and the corresponding hole in the transverse frame member 908 such that the top portion of the mechanical fastener does not extend above the top surface of the base plate 904.

In the embodiment shown in FIG. 15, the second plurality of holes 918 are arranged in rows and columns. One skilled in the art will recognize readily that there are innumerable configurations for the number and arrangement of the second plurality of holes 918 in the base plate 904. Specifically, the second plurality of holes 918 defined by the base plate 904, as shown in the embodiment of FIG. 15, comprise 126 holes arranged in 14 columns and 9 rows such that the distances between adjacent rows are all substantially equal, the distances between adjacent columns are all substantially equal, and the inter-row distance is substantially equal to the inter-column distance. The second plurality of holes 918 thus forms a two-dimensional square lattice pattern of holes which substantially spans the surface of the base plate 904.

As is most easily seen in FIG. 16, the flanges 906 have L-shaped cross-sections. A linear slot 912, which extends in the transverse direction, is disposed through each of the flanges 906. Preferably, a first and second flange 906 are fixed, preferably by welding, to each transverse member 908 such that the bottom surfaces of the flanges 906 are substantially within the plane defined by the bottom surface of the transverse frame members 908, and the flanges 906 extend outwardly from the support frame 902. A first flange 906 is fixed to the end of each transverse frame member 908 such that one end of the flange is substantially in the plane defined by the end of the support frame member 908 and the flange 906 extends transversely therefrom. The second flanges 906 are fixed to the ends of the transverse frame members 908 opposed to the first flanges 906, but the second flanges are displaced in the transverse direction such that there are gaps between the end of the second flanges 906 and the corresponding end of the transverse frame members 908.

A third flange 906 is fixed, preferably by welding, to the outer face of the first longitudinal frame member 910 which is most proximate to the first flanges 906 such that the third flange 906 extends substantially perpendicularly therefrom. The bottom surface of the third flange 906 is substantially in the plane of the bottom surface of the longitudinal support member 910. The third flange 906 is preferably substantially centered along the longitudinal frame member 910.

The interior base frame 900 is fixed to the interior floor of the test vehicle by passing mechanical fasteners through the linear slots 912 in the flanges 906 and corresponding holes in the floor of the vehicle under test. The second plurality of holes in the base plate 904 are suitable for accommodating a variety of interior test components and interior actuators. The length and width of the interior base frame are suitable for the size of the vehicle under test.

Transverse 180 Degree Outside Door Arm Frame

Figure 17:
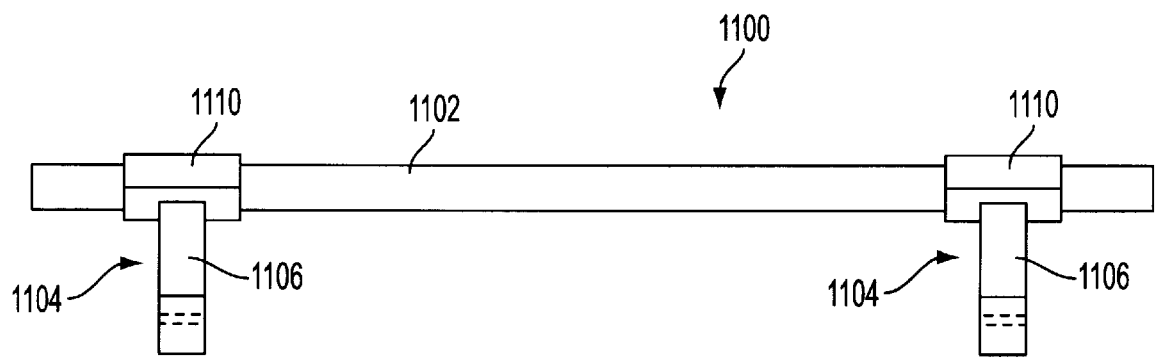
FIG. 17 is a top plan view of an outside door arm frame of the present invention.
Figure 18:
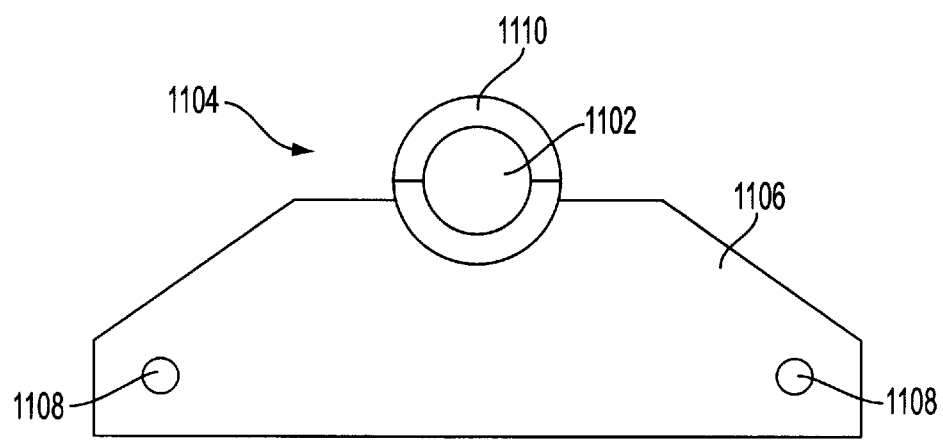
FIG. 18 is a s id e elevational view of the outside door arm frame of FIG. 17.

A transverse 180 degree outside door arm frame 1100 provides a lower support for a 180 degree outside door arm actuator, described below. The transverse frame 1100 can be positioned rearwardly of the rearward frame member or forwardly of the forward frame member. As shown in FIGS. 17 and 18, the transverse frame 1100 comprises a cylindrical steel tube 1102 disposed upon two mounts 1104 positioned at each opposed end of the cylindrical tube 1102. More particularly, the mounts 1104 comprise a plate 1106 having two holes 1108 therethrough and a cylindrical bracket 1110 fixed, preferably by welding, on the upper edge of the plate. The cylindrical bracket 1110 includes two mating semi-circular members that, upon assembly, define a bore therethrough. The two semi-circular members are adapted to be connected to the cylindrical tube by separating the halves, positioning the halves about the tube, and clamping the halves to the tube by any suitable means. Specifically, the semi-circular members incorporates screws that pass through one semi-circular member and tighten upon threads tapped into the opposing semi-circular member. The cylindrical brackets 1110 are fixed to the plates 1106 such that the bore of the cylindrical brackets 1110 is oriented perpendicularly to the plate 1106.

The mounts 1104 are fixed by mechanical fasteners passing through the holes 1108 to the outwardly facing, vertical surfaces of the horizontal segment of the "T"-shaped support assemblies 160, 360 or 560 such that the cylindrical brackets 1110 are disposed upwardly and aligned laterally with each other. The cylindrical tube 1102 is secured to the mounts 1104. As described below, the transverse mount 1100 provides the lower bearing mount for the 180 degree outside door arm actuator.

Moving Gears

Detachable moving gears 1300 are provided for transporting the main frames 100, 300, 500 including any attached modules and/or vehicles under test. Preferably, the moving gears 1300 are provided in two sizes. A small moving gear is adapted for use with the small main frame, and the large moving gear is adapted for use with the medium and large main frames. The size of the moving gears 1300 is dictated by the expected loads. In general, as shown in the FIG. 19, the moving gears 1300 comprise a conventional crank jack 1302 having an extensible piston or screw 1304. The piston 1304 is extended by the rotation of a crank 1306. In the broadest concept of the moving gears, however, any suitable device providing the required lift including, for example, a hydraulic lift, could be substituted. The crank piston or screw 1304 is attached at its free end to a caster plate 1308. A conventional dual wheel caster 1310 is attached to the caster plate 1308. More particularly, the caster plate 1308 defines spaced holes therethrough in a substantially rectangular configuration. The holes provide a mounting point for the caster 1310 through which mechanical fasteners 1312 pass thereby attaching the caster 1310 to the crank jack 1302.

Figure 19:
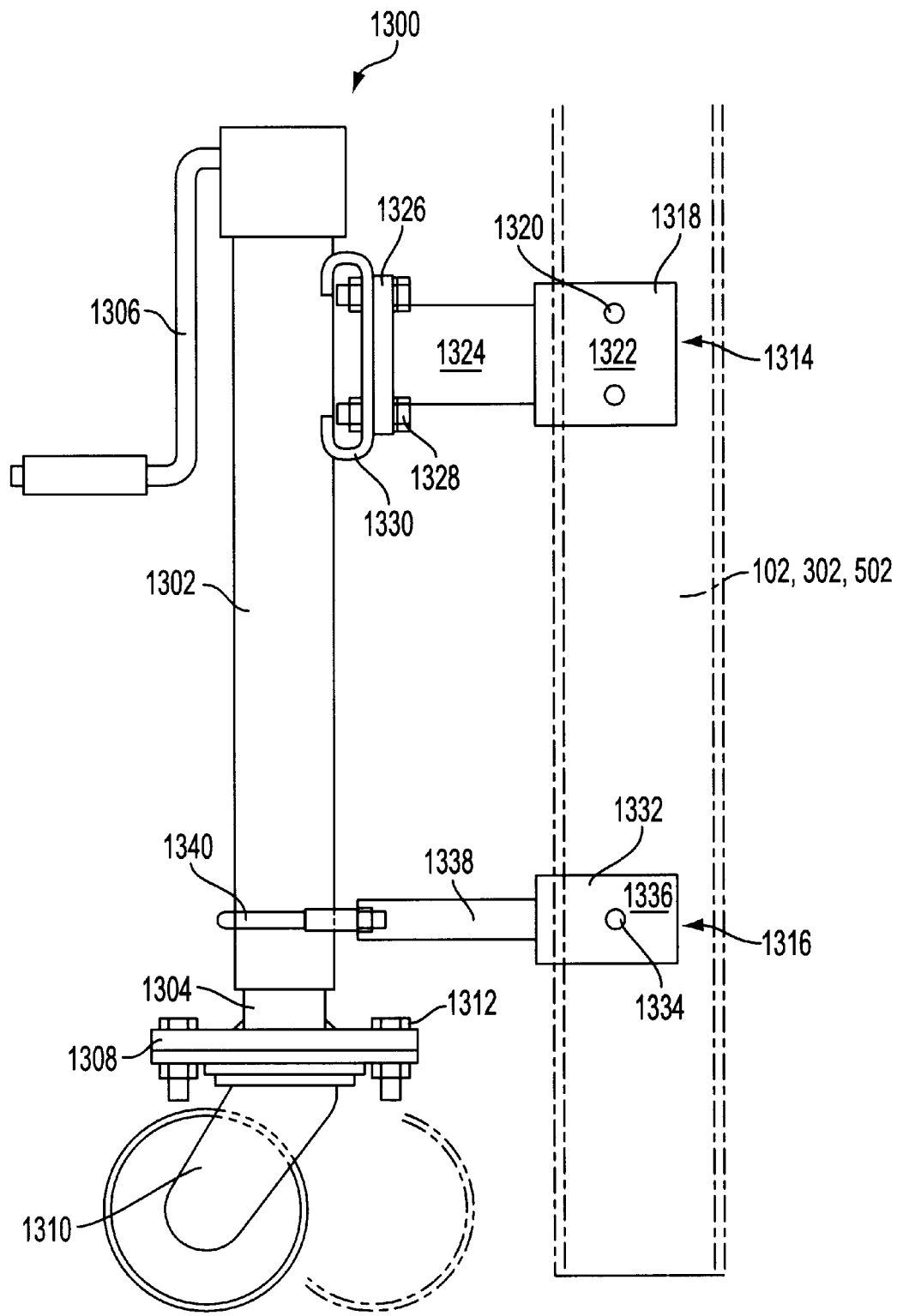
FIG. 19 is a first embodiment of a moving gear of the present invention.

In a first embodiment of the moving gear, as shown in FIG. 19, the crank jack 1302 is mountable to a main frame by an upper mount weldment 1314 and a lower mount weldment 1316. The upper mount weldment 1314 comprises a C-channel member 1318 defining a pair of holes 1320 extending through both parallel portions 1322 of the C-channel member 1318. Moreover, the parallel portions 1322 of the C-channel member 1318 are spaced apart wider than the width of the vertical members of the forward and rearward frames 102, 302, 502, 104, 304, 504. A rectangular steel tube 1324 is fixed to the C-channel member 1318 and extends therefrom in a direction opposed to the parallel portions 1322 of the C-channel member 1318. A mounting plate 1326 is fixed to the rectangular steel tube 1324 and defines a plurality of holes through which mechanical fasteners 1328 attach the upper mount weldment 1314 to the crank jack 1302. More particularly, the crank jack 1302 includes a mounting bracket 1330 fixed thereto to which the upper mount weldment 1314 is attached such that the upper mount weldment 1314 extends substantially perpendicularly from the crank jack 1302.

Similarly, the moving gear 1300 includes a lower mount weldment 1316 comprising a C-channel member 1332 defining a hole 1334 extending through both parallel portions 1336 of the C-channel member 1332. Moreover, the parallel portions 1336 of the C-channel member 1332 are spaced apart wider than the width of the vertical members of the forward and rearward frames 102, 104, 302, 304, 502, 504. A rectangular steel tube 1338 is fixed to the C-channel member 1332 and extends therefrom in a direction opposed to the parallel portions 1336 of the C-channel member 1332. A muffler clamp 1340 is fixed at the opposing end of the rectangular steel tube 1338. The muffler clamp 1340 clamps the lower mount 1316 to the crank jack 1302. As configured, the upper mount 1314 and the lower mount 1316 extend perpendicularly in the same plane from the crank jack 1302 such that the parallel portions 1322, 1336 of the C-channel members 1318, 1332, when attached to the main frame, are positioned about the vertical members of the rearward and forward frames. This embodiment of the moving gear 1300 is configured to be attached to the forward and rearward frame members in the same plane as the rectangular configurations of the forward and rearward frame members. Mechanical fasteners (not shown), suitable for removal, pass through the holes of the C-channel members 1318, 1332 and fix the moving gear 1300 to the main frame at each lower corner of the main frame.

To move the main frame, the crank jack handle 1306 is rotated thereby raising or lowering the main frame by extension or retraction of the crank piston 1304. Generally, the crank piston 1304 must extend through a travel sufficient to raise the main frame for transport on the dual casters 1310. Preferably, the crank jack 1302 should provide at least three quarters of an inch of travel.

Figure 20:
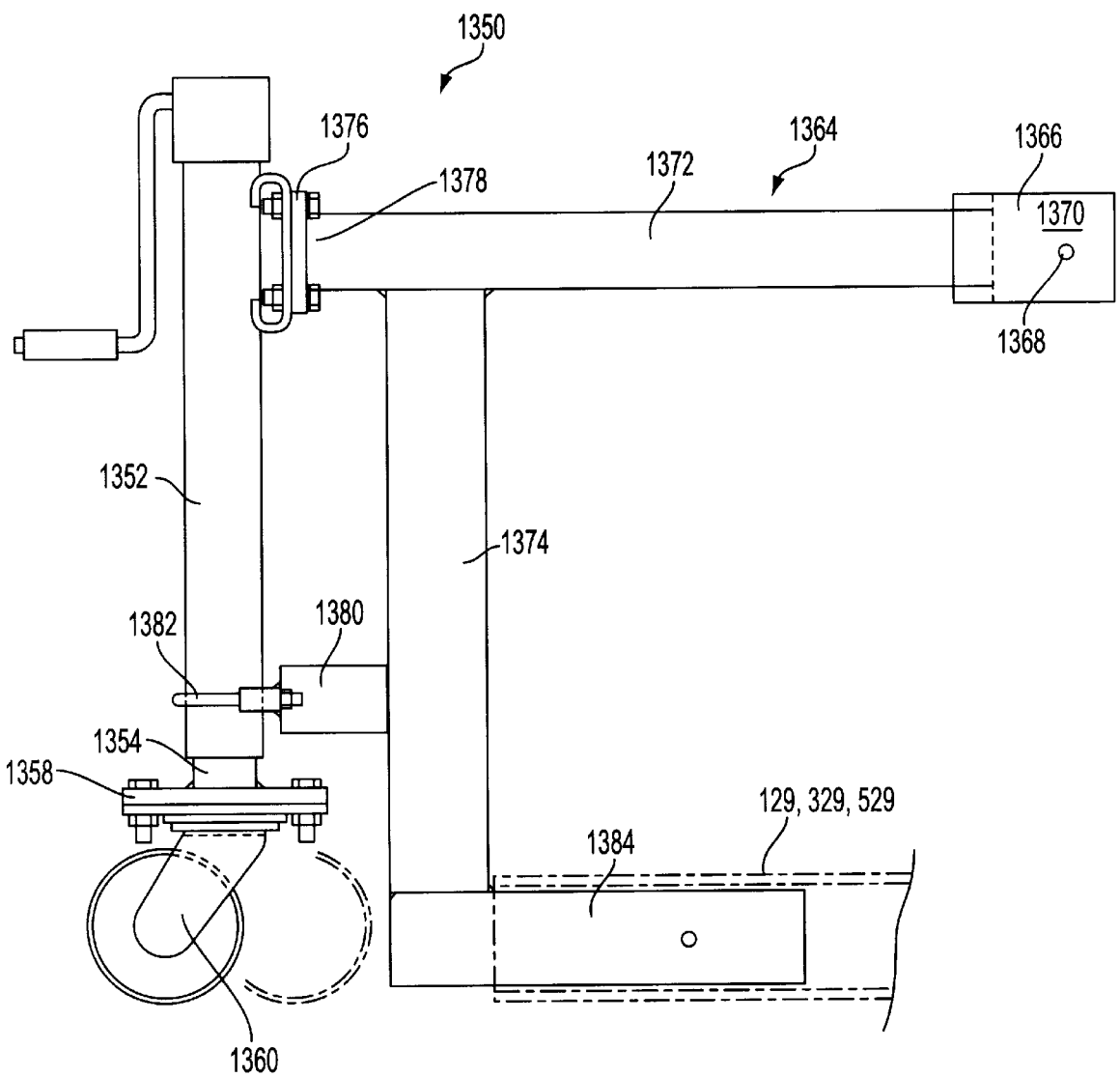
FIG. 20 is a second embodiment of a moving gear of the present invention.

As shown in FIG. 20, a second embodiment of the moving gear 1350 is designed to be attached to the rearward and forward frame members perpendicular to the rectangular configurations of the forward and rearward frames. In the second embodiment, the moving gear 1350 comprises, as in the first embodiment, a crank jack 1352, a caster plate 1358 fixed at a free end of an extensible piston or screw 1354, a dual wheel caster 1360 attached to the caster plate 1358, and a moving gear mount weldment 1364.

The moving gear mount weldment 1364 comprises a C-channel member 1366 defining a single hole 1368 through both parallel portions 1370 of the C-channel member 1366. The parallel portions 1370 of the C-channel member 1366 are spaced sufficiently wide to be mountable to the vertical members of the rearward and forward frame members. A first rectangular steel tube 1372 is fixed to the C-channel member 1366 and is positioned generally horizontally. The rectangular steel tube 1372 is sufficiently long to extend the length of the horizontal segment 129, 329, 529 of the "T"-shaped support assembly 160, 360, 560 fixed to the forward and rearward frame members. A second rectangular steel tube member 1374 is fixed perpendicularly, preferably by welding, to the first rectangular steel tube member 1372 and is spaced laterally from the ends of the first rectangular steel tube member 1372. The second rectangular steel tube member 1374 is generally parallel to the crank jack 1352. A mounting bracket 1376, identical to the mounting bracket 1326 of the first embodiment, is fixed to the end 1378 of the first rectangular steel tube member 1372. A third rectangular steel tube member 1380 is fixed to the second rectangular steel tube member 1374, preferably by welding, and extends perpendicularly therefrom. The first rectangular steel tube member 1372 and the third rectangular steel tube member 1380 are generally parallel and coplanar. A muffler clamp 1382 is fixed to the opposed end of the third rectangular steel tube member 1380. Finally, a fourth rectangular steel tube member 1384 is fixed to the opposed end of the second rectangular steel tube member 1374. The fourth rectangular steel tube member 1384 extends perpendicularly from the second rectangular steel tube member 1374 and is generally parallel and coplanar with the first rectangular steel tube member 1372. The fourth rectangular steel tube member 1384, however, extends in a direction opposite that of the third rectangular steel tube member 1380. Moreover, the fourth rectangular steel tube member 1384 is dimensionally smaller than the inside dimensions of the horizontal segment 129, 329, 529 of the "T"-shaped support assembly of the main frame. As configured, the fourth rectangular steel tube member 1384 is insertable into the horizontal segment 129, 329, 529 of the "T"-shaped support assembly of the main frame. The weldment 1364 is sized such that when the fourth rectangular steel tube member 1384 is completely inserted into the support assembly, the C-channel member 1366 of the first rectangular steel tube member 1372 is positioned about the vertical arm of the rearward or forward frame members. The C-channel member 1366 is secured to the main frame by mechanical fasteners. As with the first embodiment, the crank jack 1352 should provide sufficient travel to lift the main frame for transport. Preferably, the travel should be approximately three quarters of an inch.

DOOR ACTUATION MODULES
Vertically Hinged Door Actuators
Outside Door Actuator—90 Degree Rotation The outside door, 90 degree actuators 2700 are configured to cycle doors mounted for rotation about a vertical axis (as compared with horizontally mounted doors like decklids and tailgates) through approximately a 90 degree rotation. The 90 degree outside door actuators 2700, generally, comprise an outside door arm 2703, a powered driver 2731, support fixtures and brackets, bearings and bearing mounts, and interface members disposed between the door arm 2703 and the vehicle door specifically designed for an opening or closing function.

Figure 21:
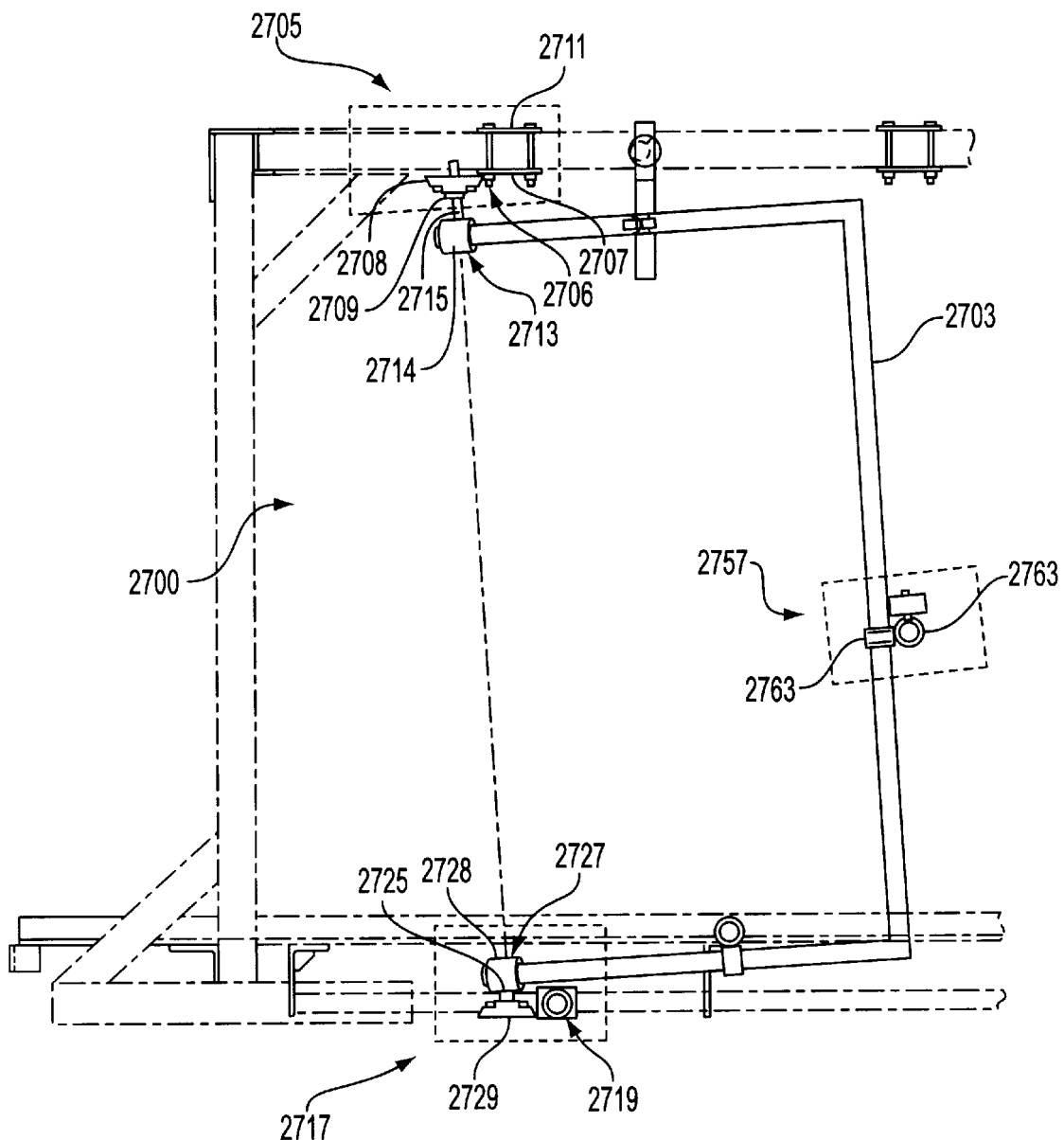
FIG. 21 is an outside door actuator having 90 degree rotation in accordance with the present invention.

As best viewed in FIG. 21, an outside pivot arm 2703 is provided. The pivot arm 2703 comprises two horizontal members disposed on opposing ends of a vertical member extending therefrom in the same plane at right angles. The members are attached, preferably by welding, by any suitable method. As configured, the outside pivot arm 2703 forms a block C-shape. Preferably, a stiffener member (not shown) is disposed in each of the inside corners of the pivot arm 2703, and the pivot arm 2703 is constructed from steel tubing.

The pivot arm 2703 is mountable to the main frames by an assembly of brackets and bearings. An upper bearing assembly 2705 is selectively connectable to the upper horizontal arm of the pivot arm 2703 and is selectively connectable to the main frame and provides an upper pivot point for the pivot arm 2703. Similarly, a lower bearing assembly 2717 is selectively connectable to the lower horizontal arm of the pivot arm 2703 and is selectively connectable to the main frame and provides a lower pivot point for the pivot arm 2703. More particularly, as shown in FIG. 21, the upper bearing assembly 2705 comprises an upper bearing mount 2706 preferably constructed from steel plate having a mounting portion 2707 and a bearing portion 2708. The mounting portion 2707 defines a plurality of mounting holes therethrough. The plurality of holes are spaced laterally at a distance greater than the width of a transverse member of a main frame, as described in more detail below, to which the bearing assembly 2705 is to be attached. The holes provide a passage through which mechanical fasteners pass that, upon assembly, secure the upper bearing assembly 2705 to a main frame. Preferably, the upper bearing mount 2706 includes four equally spaced holes. The bearing portion 2708 of the mount 2706 extending from the mounting portion 2707 provides a surface upon which a bearing 2709 is mounted. Any conventional bearing adapted for the expected axial loads and cycle frequency may be incorporated. A clamp pad 2711, dimensionally similar to the mounting portion 2707 of the upper bearing mount 2706, is provided. The clamp pad 2711 also defines a plurality of holes therethrough spaced identically as the mounting portion 2707 of the upper bearing mount 2706 such that, upon assembly, the holes of both members align.

The upper bearing assembly 2705 also comprises an upper pivot bracket 2713. The upper pivot bracket 2713 comprises a pin 2715 having an end suitably adapted for insertion and attachment to the bearing 2709. In the presently preferred embodiment, threads are provided on the bearing end of the pin 2715. The opposing end of the pin 2715 is attached to a cylindrical bracket 2714. Specifically, the cylindrical bracket 2714 defines a hole through a lateral side of the bracket 2714 into which the pin 2715 is inserted. The pin 2715 is secured to the bracket 2714 by welding. More particularly, the cylindrical bracket 2714 includes two mating semi-circular members that, upon assembly, define a bore therethrough. The two semi-circular members are adapted to be connected to the upper horizontal arm of the pivot arm 2703 by separating the halves, positioning the halves about the upper horizontal arm of the pivot arm 2703, and clamping the halves to the pivot arm 2703 by any suitable means. Specifically, the semi-circular members of the upper pivot bracket 2713 incorporate screws that pass through one semi-circular member and tighten upon threads tapped into the opposing semi-circular member. (The cylindrical brackets are used throughout the CST apparatus. Except for the relative size of the various brackets incorporated into the CST apparatus, the brackets are constructed and arranged similarly. Any reference to cylindrical bracket incorporates by references the preceding description.)

The upper bearing assembly 2705 is configured as follows. The upper pivot bracket 2713 is secured to the upper horizontal arm of the pivot arm 2703 such that the pin 2715 extends substantially vertically and upwardly therefrom. The lateral position of the upper pivot bracket 2713 along the upper horizontal arm of the pivot arm 2703 is dictated by the size of the door to be rotated. The pin 2715 is secured to the bearing 2709, and thereafter, the upper bearing mount 2706 is mounted to a main frame, typically though not necessarily to a transverse member forward of a pivot point of the door under test such that the upper bearing mount 2706 extends rearwardly, by clamping the upper bearing mount 2706 and clamp pad 2711 about a member of the main frame.

Figure 22:
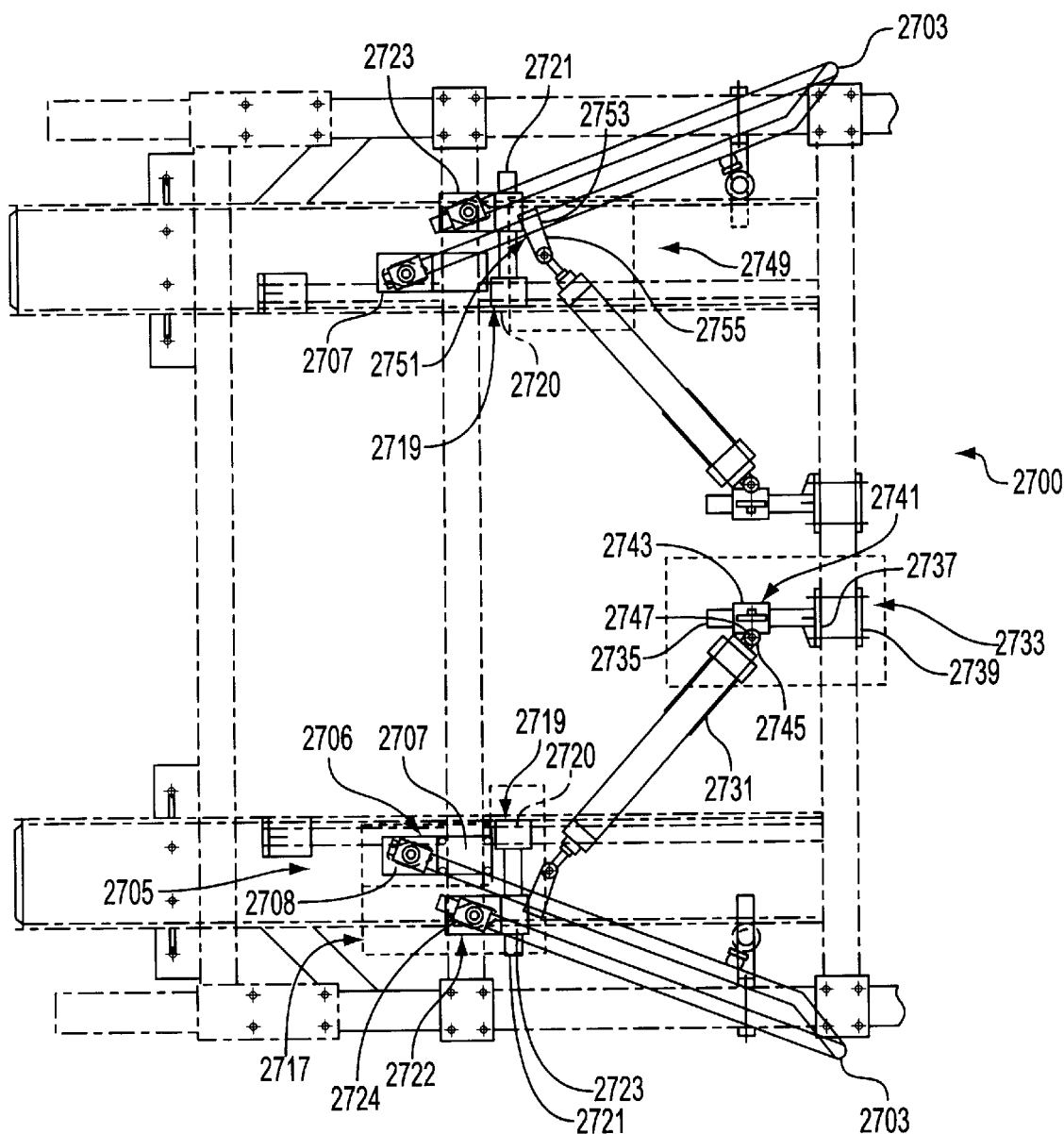
FIG. 22 is a top plan view of the outside door actuator of FIG. 21. of the present invention.

Similarly, a lower bearing assembly 2717 is provided. The lower bearing assembly 2717 comprises in part a support bracket 2719. As shown in FIG. 22, the support bracket 2719 includes a cylindrical bracket 2720 similar to the cylindrical bracket described above. Specifically, the cylindrical bracket 2720 includes two mating, semi-circular members defining a bore therethrough when mated. The cylindrical bracket 2720 is adapted to be selectively connectable to the longitudinal member disposed below the vehicle support of a main frame. A tubular member 2721 is welded or otherwise fixed to the cylindrical member 2720 and extends perpendicularly therefrom. The lower bearing assembly 2717 also includes a lower bearing mount 2722 having a mounting portion 2723 and a bearing portion 2724 preferably constructed from steel plate. The mounting portion 2723 comprises a cylindrical bracket as defined above adapted for connection to the tubular member 2721 of the support bracket 2719. The bearing portion 2724, a steel plate, is fixed to the mounting portion 2723 and extends therefrom such that the bearing portion 2724 is positioned horizontally and provides a surface upon which a bearing 2725 is mounted. Any conventional bearing adapted for the expected axial loads and cycle frequency may be incorporated.

The lower bearing assembly 2717 also comprises a lower pivot bracket 2727. The lower pivot bracket 2727 comprises a pin 2729 having an end suitably adapted for insertion and attachment to the bearing 2725. The opposing end of the pin 2729 is attached to a cylindrical bracket 2728. Specifically, the cylindrical bracket 2728 defines a hole through a lateral side of the bracket 2728 into which the pin 2729 is inserted. The pin 2729 is secured to the bracket 2728 by welding. More particularly, the cylindrical bracket 2728 includes two mating semi-circular members that, upon assembly, define a bore therethrough. The two semi-circular members are adapted to be connected to the lower horizontal arm of the pivot arm 2703 by separating the halves, positioning the halves about the lower horizontal arm of the pivot arm 2703, and clamping the halves to the pivot arm 2703 by any suitable means. Specifically, the semi-circular members of the lower pivot bracket 2727 incorporate screws that pass through one semi-circular member and tighten upon threads tapped into the opposing semi-circular member.

The lower bearing assembly 2717 is configured as follows. The lower pivot bracket 2727 is secured to the lower horizontal arm of the pivot arm 2703 such that the pin 2729 extends substantially vertically and downwardly therefrom. The lateral position of the lower pivot bracket 2727 along the lower horizontal arm of the pivot arm 2703 is dictated by the size of the door to be rotated. The support bracket 2719 is clamped to the longitudinal members disposed below the vehicle supports of a main frame such that the tubular member 2721 extends transversely and outwardly to the main frame. The lower bearing mount 2722 is clamped to the tubular member 2721 such that the bearing portion 2724 is positioned substantially horizontally. The pin 2729 of the lower pivot bracket 2727 is inserted into the bearing 2725.

Figure 23:
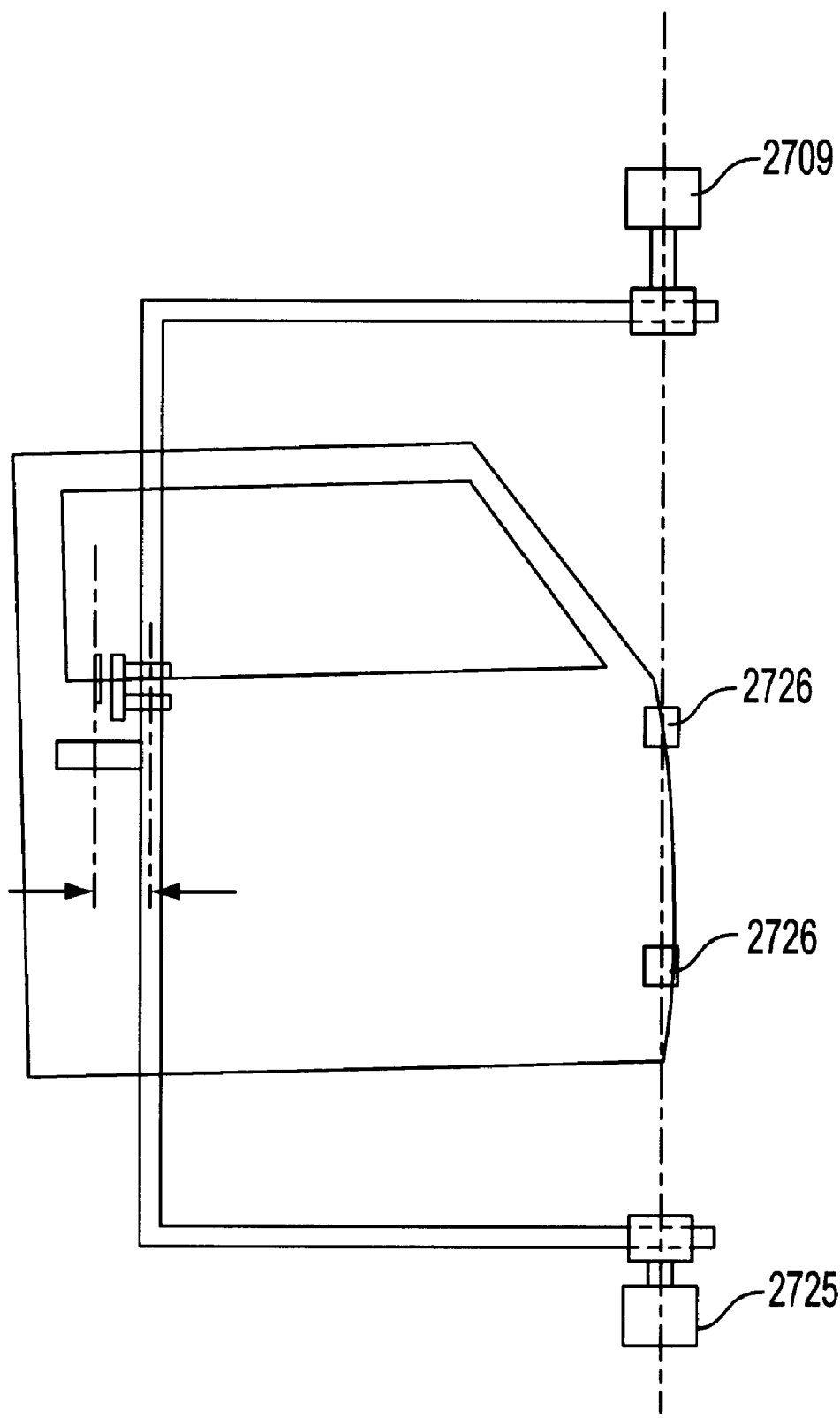
FIG. 23 is a side elevational view of the outside door arm of FIG. 21 showing alignment of an axis of door rotation.

As shown in FIG. 23, the upper and lower bearings 2709, 2725 must be coaxial with the axis of rotation of the door under test defined between the door hinges 2726. As constructed and arranged, the outside door 90 degree actuators 2700 provide adjustability in the horizontal planes of both upper and lower bearing assemblies 2705, 2717 to assure proper and independent alignment of each bearing assembly. Specifically, the upper bearing assembly 2705 can be positioned laterally along the transverse member of the main frame by securing the upper bearing mount 2706 to the proper position on the transverse member. Once the lateral position of the bearing 2709 is secured, the transverse member can be shifted longitudinally and secured once the upper bearing 2709 is coaxial with the axis of rotation of the door under test. Similarly, the lower bearing assembly 2717 can be positioned laterally by moving and securing the lower bearing mount 2722 along the tubular member 2721 of the support bracket 2719. The lower bearing assembly 2717 can be positioned longitudinally by moving and securing the support bracket 2719 along the longitudinal member of the main frame.

As also shown in FIG. 23, the vertical segment of the outside door arm 2703 should be positioned laterally from the door handle nearer the axis of rotation to provide proper alignment for any outside door handle actuator attached to the outside door arm 2703.

As shown in FIG. 22, The outside arm actuator 2700 also includes mounting assemblies for the arm driver 2731. A first mounting assembly 2733 for pivotal support of a rear portion of the actuator driver 2731 comprises a tubular member 2735 welded or otherwise attached to a plate 2737 such that the tubular member 2735 extends substantially perpendicular from the plate 2737. The plate 2737 defines a plurality of holes therethrough spaced at a distance wider than the frame member to which the first mounting assembly 2733 is to be attached. Preferably, the plate 2737 defines four holes therethrough spaced in a square configuration. A clamp pad 2739, dimensionally similar to the plate 2737 of the first mounting assembly 2733, is provided. The clamp pad 2739 also defines a plurality of holes therethrough spaced identically as the plate 2737 of the first mounting assembly 2733 such that, upon assembly, the holes of both members align. The first mounting assembly 2733 further comprises a cylindrical mounting bracket 2741 having a cylindrical bracket 2743, as described above, and a mounting plate 2745 extending therefrom. The cylindrical bracket 2743 comprises two mating, semi-circular members defining a bore therethrough adapted to clamp to the tubular member 2735 of the first mounting assembly 2733. The mounting plate 2745 extends from the cylindrical bracket 2743 and defines a hole therethrough through which an eye bolt 2747 is secured. The eye bolt 2747 provides a point of pivotal attachment for the rearward portion of the arm driver 2731.

A second mounting assembly 2749 for pivotal support of a forward portion of the actuator driver 2731 comprises a cylindrical mounting bracket 2751 having a cylindrical bracket 2753, as described above, and a mounting plate 2755 extending therefrom. The cylindrical bracket 2753 comprises two mating, semi-circular members defining a bore therethrough adapted to clamp to the upper horizontal member of the pivot arm 2703. The mounting plate 2755 extends from the cylindrical bracket 2753 and defines a hole therethrough through which the forward portion of the arm driver 2731 can be attached pivotally by conventional means.

Figure 24:
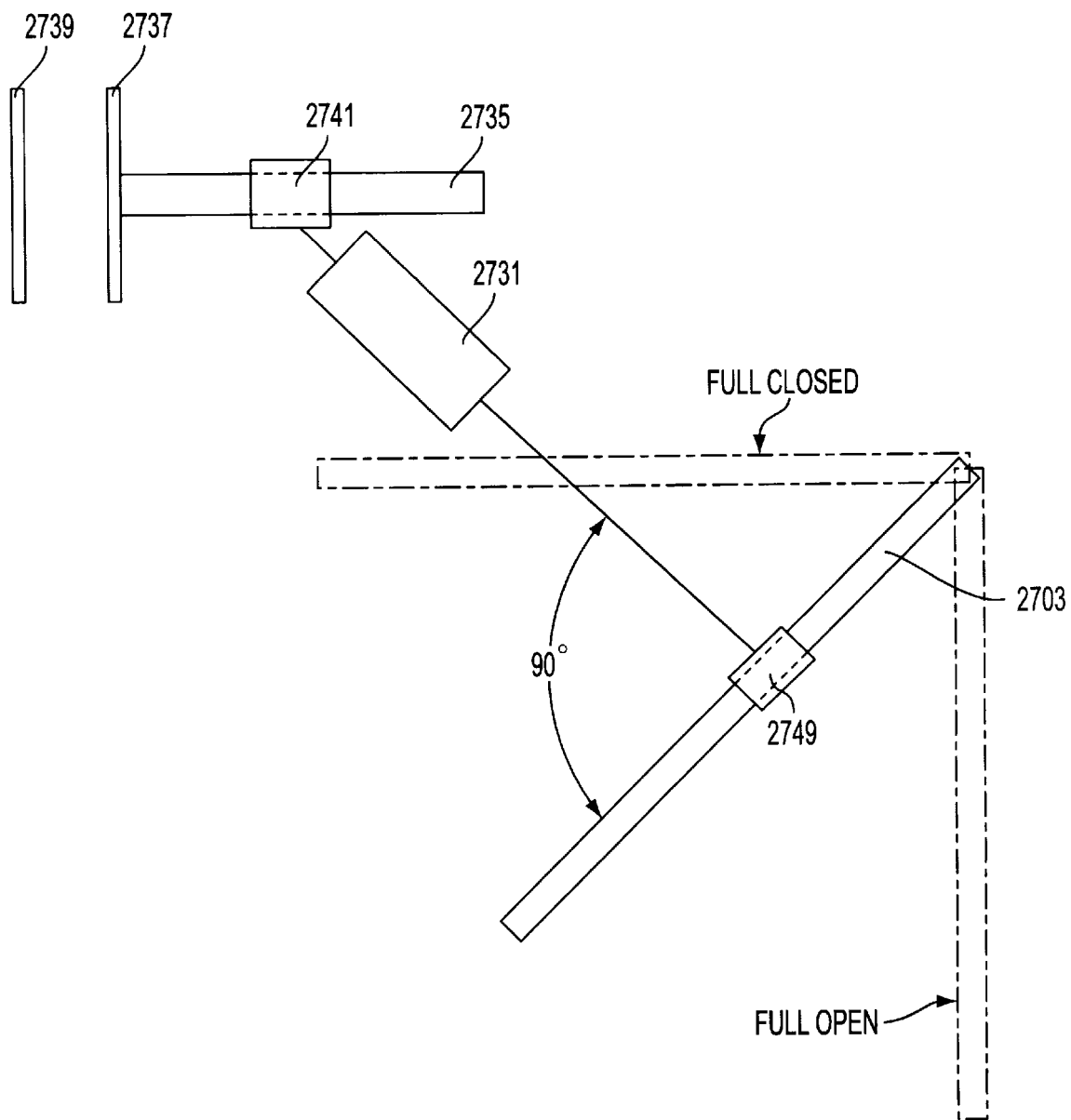
FIG. 24 is a diagrammatic view of an actuator of the outside door arm of FIG. 21.

The first and second mounting assemblies 2733, 2749 are configured and positioned as follows. As shown in FIG. 24, the outside door arm 2703 is positioned at a mid cycle position. Fully opened and fully closed positions are shown by broken lines. For example, if the door under test is to be cycled through 90 degrees, then the outside door arm 2703 is first positioned at 45 degrees relative to a closed door under test. The second mounting assembly 2749 is secured to the pivot arm 2703 of the outside door actuator 2700 at a position on the arm 2703 that will provide the degree of opening or closing leverage required for the particular door under test. Thereafter, the first mounting assembly 2733 is mounted to a transverse member of a mainframe such that the tubular member 2735 extends rearwardly therefrom and intersects with a line that extends perpendicularly from the pivot arm 2703 at the mid cycle position. The cylindrical mounting bracket 2741 of the first mounting assembly 2733 is secured to the tubular member 2735 such that the pivot point is on the extended perpendicular line.

Once the first and second mounting brackets 2733, 2749 are secured, the arm driver 2731 is secured to the mounting brackets 2733, 2749. The 90 degree door actuator assembly 2700 is adapted for use with a linear driver 2731. Any conventional driver or actuator having a stroke sufficient to completely cycle the door may be used. If simulation of human door opening or closing is to be achieved more precisely, however, the arm driver 2731 is preferably an electric linear actuator. A suitable electric arm driver is the Industrial Devices Corporation H3301 electric linear motion controller or equivalent.

Figure 25:
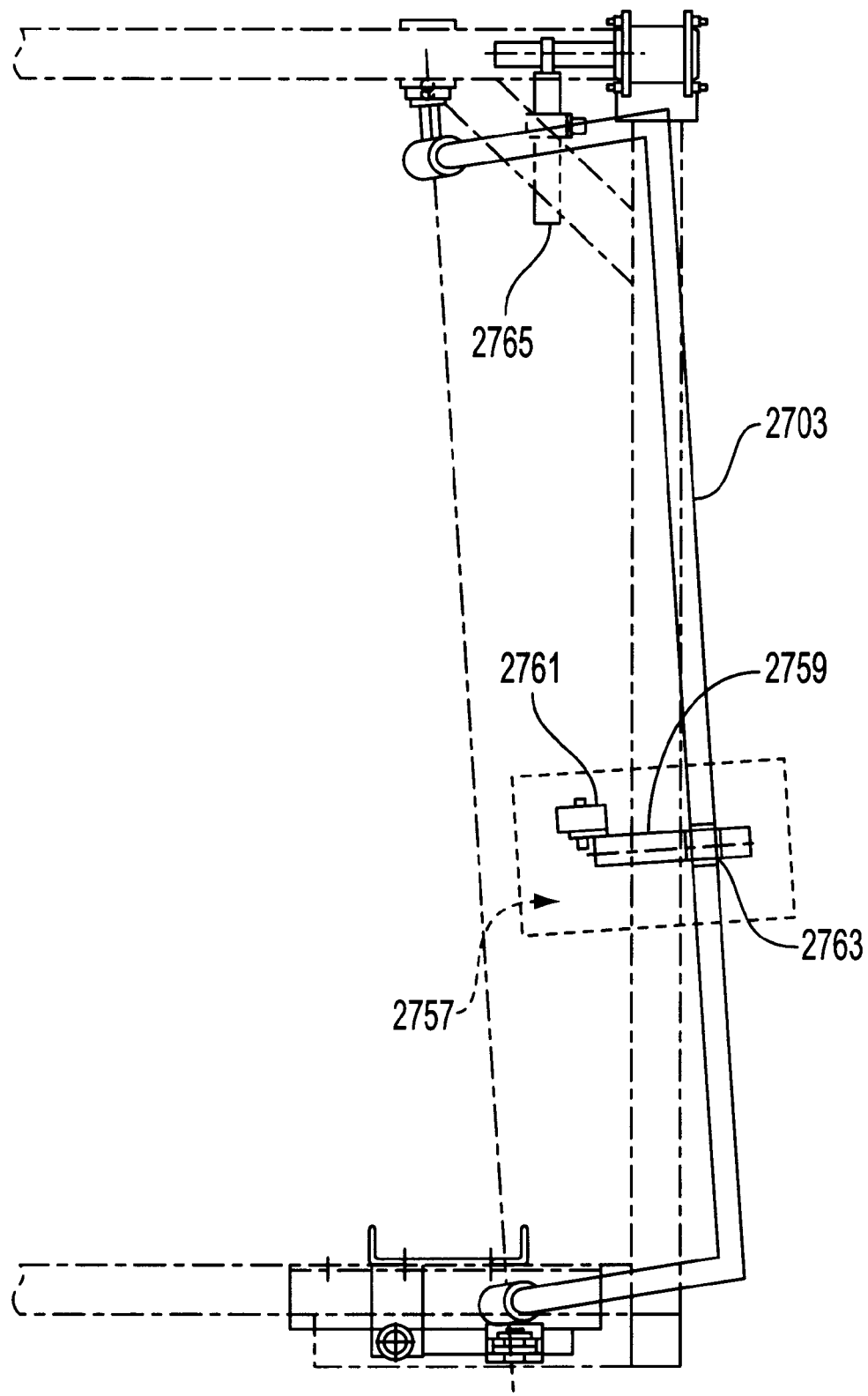
FIG. 25 is a side elevational view of an interface member of the outside door actuator of FIG. 21.

As shown in FIGS. 25–28, the 90 degree outside door arm actuator 2700 also includes interface assemblies 2757, 2767 disposed on the outside door arm 2703 for engaging and opening or closing the door under test. As shown in FIG. 25, the closing interface assembly 2757 comprises a roller arm 2759, preferably constructed from steel tube, and a roller 2761 rotatably attached at one end. More particularly, the roller arm 2759 defines a hole through opposed surfaces of the tube positioned cross-axially in one end of the roller arm 2759. The roller 2761 is mounted rotatably to the arm 2759 by a mechanical fastener passing through the hole. The roller 2761 should have a diameter sufficiently large such that the roller 2761 extends past the end of the arm 2759. Preferably, the roller 2761 should be reasonably pliable; a suitable roller is a DURASOFT roller #DR-754-20 or equivalent.

The roller arm 2759 is attached to the outside door arm 2703 by two cylindrical brackets 2763 welded together such that the bores of each bracket 2763 are aligned perpendicularly. The cylindrical brackets 2763 are constructed as previously described. The roller arm 2759 is clamped within one of the cylindrical brackets 2763, and the other cylindrical bracket 2763 is secured to the outside door arm 2703 such that the roller arm 2759 extends towards the door under test. The roller arm 2759 is positioned relative to the door arm 2703 and a bumper 2765 is extended from the main frame and engages the door arm 2703 when the door arm 2703 is closed such that the roller 2761 is displaced from the door under test. The door arm 2703 should be controlled so that the door arm 2703 does not crash into a fully closed and latched door under test. The bumper 2765 provides a final fail safe to prevent such impact.

Figure 26:
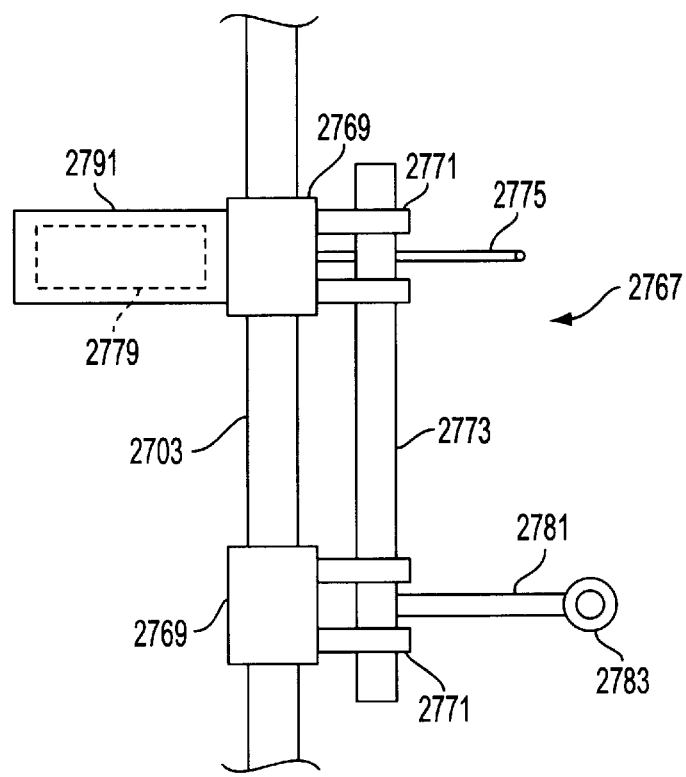
FIG. 26 is a side elevational view of an interface assembly of the present invention.
Figure 27:
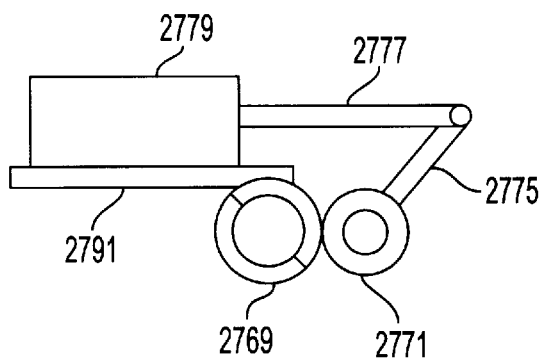
FIG. 27 is a top plane view of the interface assembly of FIG. 26.
Figure 28:
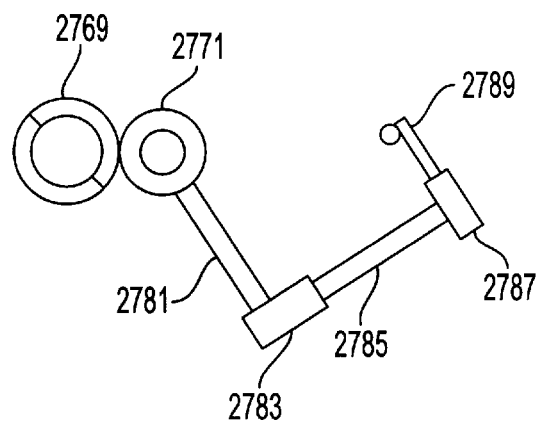
FIG. 28 is a bottom plane view of the interface assembly of FIG. 26.

As shown in FIGS. 26–28, an opening interface assembly 2767 for the outside door arm 2703 is adapted for attachment to the vertical member of the outside door arm 2703. It provides a mechanism for selectively engaging a door and opening the door as the outside door arm 2703 rotates in an opening direction. Specifically, the opening interface assembly 2767 comprises a pair of cylindrical brackets 2769 similar in construction to the previously defined cylindrical brackets. The cylindrical brackets 2769 include two mating semi-circular members defining a bore therethrough when positioned in the mating configuration. The cylindrical bracket 2769 is adapted to clamp to the vertical arm of the outside door arm 2703. A pair of bracket and bearing assemblies 2771 is attached, preferably by welding, to each of the cylindrical brackets 2769. More particularly, the pairs of cylindrical bearing brackets 2771 are welded on an outside surface of the cylindrical brackets 2769 and are positioned coaxially to each other. A shaft 2773 is rotatably mounted within the bearing brackets 2771 such that each of the bearings is aligned coaxially. A piston engaging arm 2775 is attached to the shaft 2773 between the pairs of bearings forming the upper bracket end bearing assembly 2771. The piston engaging arm 2775 defines a mounting hole at its free end for attachment to a piston 2777 of an air cylinder 2779. Similarly, a first door engaging arm 2781 is attached, preferably by welding to the shaft 2773 between the second pair of bearings 2771. A cylindrical bracket 2783 identical to the previously described brackets is attached, preferably by welding to the free end of the first door engaging arm 2781. A second door engaging arm 2785 is clamped within the bracket 2783 of the first door engaging arm 2781 and extends perpendicularly therefrom. A cylindrical bracket 2787, again of the previously described design, is fixed, preferably by welding, to the free end of the second door engaging arm 2785. A third door engaging arm 2789 is clamped within the cylindrical bracket 2787 of the second door engaging arm 2785. As configured, each of the door engaging arms are substantially perpendicular to its adjoining arm, and the first and third door engaging arms 2781, 2789 are substantially parallel. All of the door engaging arms are substantially coplanar. Thus, rotation of the piston engaging arm 2775 causes the shaft 2773 to rotate about the bracket and bearing assemblies 2771 thereby causing the door engaging arms to rotate. A cylinder mounting plate 2791 is attached, preferably by welding to the upper cylindrical bracket 2769. An air cylinder 2779 is fixed to the plate 2791 such that its piston 2777 extends towards the piston engaging arm 2775. The free end of the air cylinder piston 2777 is attached pivotally to the piston engaging arm 2775. One skilled in the art will recognize readily that any actuator could be substituted for the air cylinder 2779 including electric cylinders and hydraulic cylinders.

The outside door actuators 2700 are provided preferably in three sizes; each being constructed and arranged identically except for the relative dimensions of the door arms and the output of the drivers. A small 90 degree outside door actuator 2700 should be adapted for use with small and compact vehicles. A medium 90 degree outside door actuator 2700 should be adapted for use with large vehicles, and a large 90 degree outside door actuator 2700 should be adapted for use with full-size vans.

Once the outside door actuator is aligned properly, as described above, and a door cycle has commenced (assuming the beginning of the cycle starts from a closed position and the door latch has been released), the cylinder 2779 of the opening interface assembly 2767 retracts its extensible piston 2777 to rotate the shaft 2773 in a counterclockwise direction. Thereafter, the engaging arm 2789 engages and hooks onto the door under test. At this stage, the driver 2731 extends its piston to rotate the door arm 2703 and, consequently, the door under test to a full open position. At the end of the opening cycle, the opening interface assembly releases the door by retraction of the piston 2777. Thereafter, the driver 2731 retracts its piston and rotates the door arm 2703 in a closing direction. The roller 2761 of the closing interface assembly engages the door and closes the door under test. The speed and/or acceleration of the retraction of the piston is controlled to simulate human closure of the door. Once the door under test reaches the desired closing speed, the driver 2731 slows down before impact with the door. Because the roller 2761 is not attached to the door under test, however, the door under test continues to rotate to closure.

Outside Door Actuator—180 Degree Rotation

An outside door, 180 degree actuator 2900 is configured to cycle doors mounted for rotation about a vertical axis through approximately a 180 degree rotation such as a rear van door. The 180 degree outside door actuator 2900, generally, comprises an outside door arm 2903, a powered driver 2943, support fixtures and brackets, bearings and bearing mounts, and interface members disposed between the door arm 2903 and the vertical door under test that are specifically designed for an opening or closing function.

Figure 29:
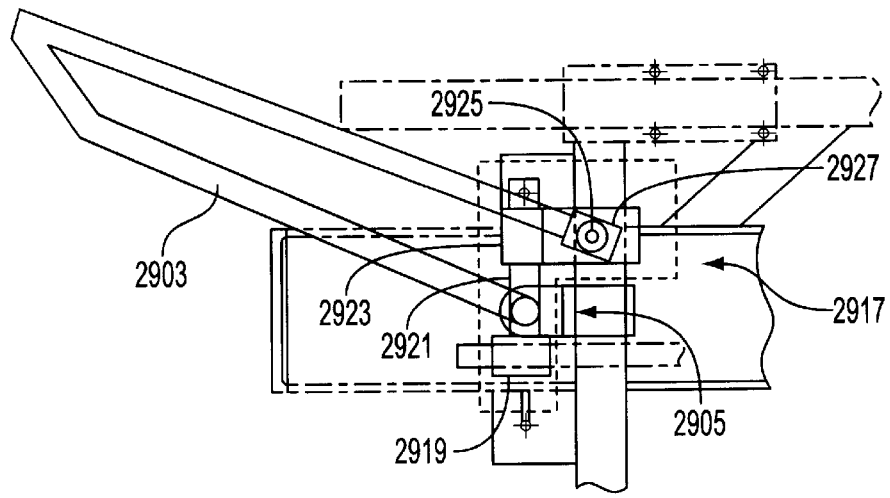
FIG. 29 is a perspective view of an outside door actuator having 180 degree rotation in accordance with the present invention.
Figure 30:
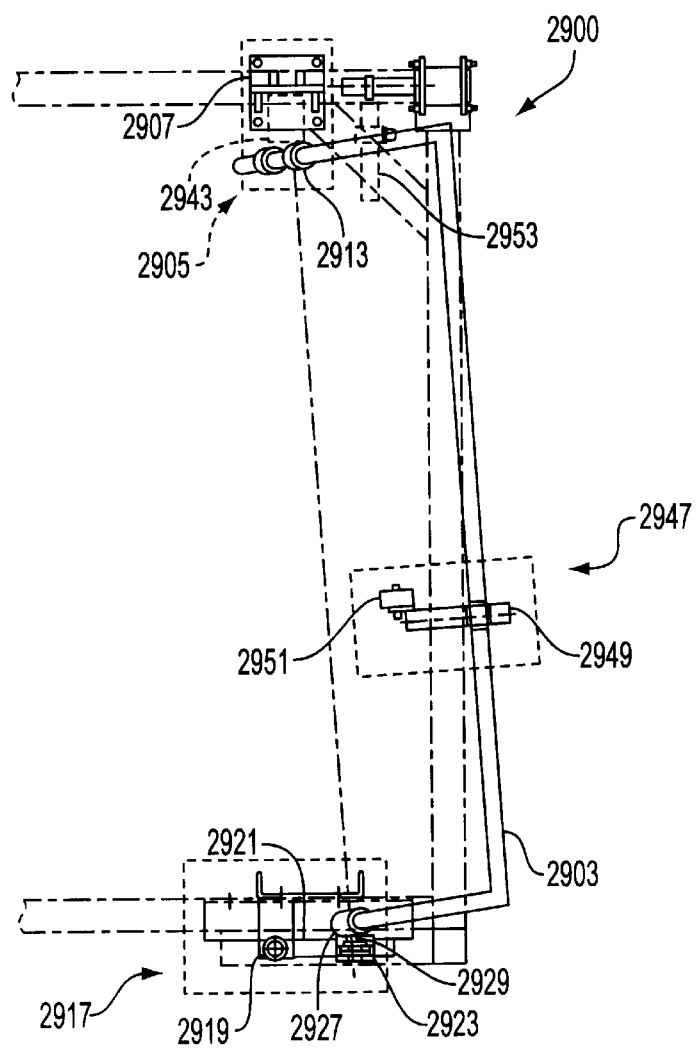
FIG. 30 is a side elevational view of the outside door arm of FIG. 29.

As best viewed in FIGS. 29 and 30, an outside pivot arm 2903 is provided. The pivot arm 2903 comprises two horizontal members disposed on opposing ends of a vertical member extending therefrom in the same plane at right angles. The members are attached, preferably by welding, by any suitable means. As configured, the outside pivot arm 2903 forms a block C-shape. Preferably, a stiffener member (not shown) is disposed in each of the inside corners of the pivot arm 2903, and the pivot arm 2903 is constructed from steel tubing.

The pivot arm 2903 is mountable to the main frame by an assembly of brackets and bearings. An actuator mounting assembly 2905 is selectively connectable to the upper horizontal arm of the pivot arm 2903 and is selectively connectable to the main frame, providing an upper pivot point for the pivot arm 2903. Similarly, a lower bearing assembly 2917 is selectively connectable to the lower horizontal arm of the pivot arm 2903 and is selectively connectable to the main frame providing a lower pivot point for the pivot arm 2903.

Figure 31:
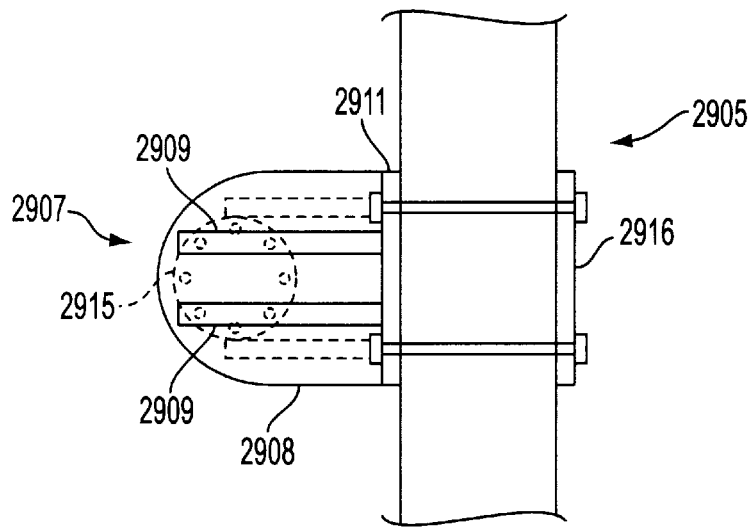
FIG. 31 is a top plane view of the actuator of the outside door actuator of FIG. 29.
Figures 32, 33:
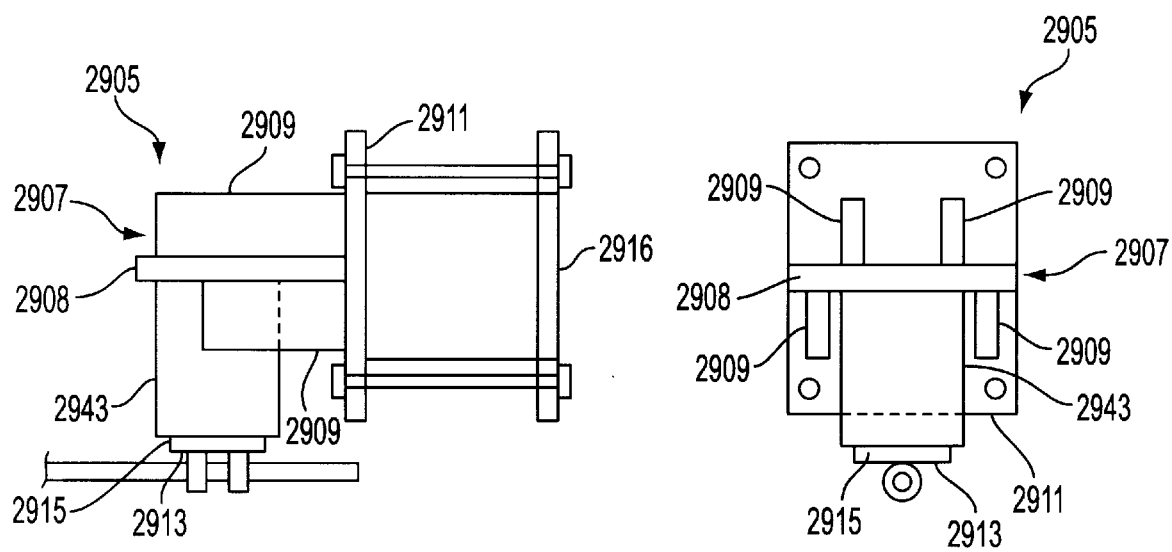
FIG. 32 is a side elevational view of the outside door actuator of FIG. 29.
FIG. 33 is a side elevational view of the outside door actuator of FIG. 29.

More particularly, as shown in FIGS. 31–33, the actuator mounting assembly 2905 includes an upper motor bracket 2907 comprising a set of longitudinal support members 2909 fixed, preferably by welding, to top and bottom portions of a base plate 2911. A support plate 2908 is fixed, preferably by welding, to the base plate 2911 and extends horizontally therefrom such that the plate 2908 is disposed between the upper and lower supports 2909. The longitudinal supports 2909 are fixed to the upper and lower surfaces of the support plate 2908, preferably by welding. The lower longitudinal supports 2909 are spaced laterally further apart than the upper longitudinal supports 2909, thereby providing a space to mount an actuator 2943 between the lower supports 2909 on the bottom surface of the support plate 2908 as described below. As configured, the top supports 2909 are disposed on the inside of the bottom supports 2909.

The height of the base plate 2911 is defined such that a plurality of mounting holes can be spaced vertically at a distance greater than the height of the horizontal member of the frame to which the actuator mounting assembly 2905 is attached. A mounting plate 2916 having a plurality of holes positioned identically to the holes of the base plate 2911 is disposed on the opposing side of the frame member. The upper actuator bracket 2907 is mounted to the frame member by mechanical fasteners that pass through the mounting holes of both plates.

As shown in FIG. 32, the actuator mounting assembly 2905 also comprises a lower bracket 2913. The bracket 2913 includes a plate 2915 that is configured for connecting to a rotary actuator 2943 and defines a plurality of mounting holes as required by the actuator 2943. Two cylindrical brackets are fixed, preferably by welding, to the bottom surface of the plate 2915 such that the brackets are disposed symmetrically about the center of the plate 2915 and parallel to each other. Each of the cylindrical brackets are constructed as the previously described cylindrical brackets. The brackets are adapted to be positioned about and clamped to the upper horizontal arm of the pivot arm 2903 by any suitable means, thereby securing the lower bracket 2913 to the outside pivot arm 2903.

The actuator mounting assembly 2905 is configured as follows. The upper motor bracket 2907 is secured to the horizontal member or longitudinal member of the frame, as required by any particular test, by positioning the base plate 2911 and mounting plate 2916 about the frame member and clamping the plates to the member by any suitable means. Preferably, the mounting bracket 2907 and mounting plate 2916 are oriented about the horizontal frame member such that the bracket 2907 extends rearwardly of the rearward frame member and forwardly of the forward frame member. As previously described, mechanical fasteners pass through the mounting plate 2916 and tighten upon the base plate 2911, thereby securing the upper motor bracket 2907 to the horizontal member of the frame. The mounting assembly 2905 can be similarly mounted to the longitudinal member of the main frame. An outer housing of a bidirectional arm actuator 2943, preferably an electric rotary actuator, is fastened to the bottom of the support plate 2908 by any conventional means, securing the actuator 2943 to the plate 2908. The lower bracket plate 2915 is secured to an inner housing of the arm actuator 2943, preferably by screws that pass through the mounting holes defined in the plate 2915 and tighten upon threads tapped into the inner housing of the actuator 2943. The inner housing/plate interface provides the upper pivot for the door arm 2903. Finally, as previously described, the lower bracket 2913 is secured to the pivot arm 2903 by the cylindrical brackets disposed on the bottom of the plate 2915.

One skilled in the art will recognize that the actuator 2943 could be either a linear actuator or a rotary actuator. Rotary actuators, however, have proven to provide the greatest angle of opening and are, therefore, preferred when 180 degree cycling is required. Additionally, one skilled in the art will recognize that any form of actuator could be incorporated including electric, hydraulic, or pneumonic actuators. Electric actuators are preferred, however, because they are less susceptible to temperature variations and provide a suitable platform by which velocity profiles of the actuator can be controlled. Velocity profile control of the door arm 2903 is necessary to achieve simulation of human closure of vehicle doors.

A lower bearing assembly 2917 is provided. The lower bearing assembly 2917 comprises in part a support bracket 2919, which includes a cylindrical bracket constructed and arranged as previously described cylindrical brackets. Specifically, the cylindrical bracket includes two mating, semi-circular members defining a bore therethrough when mated. The cylindrical bracket is adapted to be selectively connectable to the longitudinal member disposed below the vehicle support of a main frame. A tubular member 2921 is welded or otherwise fixed to the cylindrical bracket and extends perpendicularly therefrom. The lower bearing assembly 2917 also includes a lower bearing mount 2923 having a mounting portion and a bearing portion preferably constructed from steel plate. The mounting portion comprises a cylindrical bracket as defined above adapted for connection to the tubular member 2921 of the support bracket 2919. The bearing portion, a steel plate, is fixed to the mounting portion and extends therefrom such that the bearing portion is positioned horizontally and provides a surface upon which a bearing 2925 is mounted. Any conventional bearing 2925 adapted for the expected axial loads and cycle frequency may be incorporated.

The lower bearing assembly 2917 also comprises a lower pivot bracket 2927. The lower pivot bracket 2927 comprises a pin 2929 having an end suitably adapted for insertion and attachment to the bearing 2925. The opposing end of the pin 2929 is attached to a cylindrical bracket constructed and arranged as previously described cylindrical brackets. Specifically, the cylindrical bracket defines a hole through a lateral side of the bracket into which the pin 2929 is inserted. The pin 2929 is secured to the bracket by welding. The cylindrical bracket can be positioned about and clamped to the lower horizontal member of the pivot arm 2903 by any suitable means, securing the pivot bracket 2927 to the pivot arm 2903.

The lower bearing assembly 2917 is configured as follows. The lower pivot bracket 2927 is secured to the lower horizontal arm of the pivot arm 2903 such that the pin 2929 extends substantially vertically and downwardly therefrom. The lateral position of the lower pivot bracket 2927 along the lower horizontal arm of the pivot arm 2903 is dictated by the size of the door to be rotated. The support bracket 2919 is clamped to the longitudinal members disposed below the vehicle supports of a main frame such that the tubular member 2921 extends transversely and outwardly to the main frame when the upper mounting bracket 2907 is mounted to the longitudinal member of the main frame. Alternatively, when the upper mounting bracket 2907 is mounted to the rearward or forward frame members, the support bracket 2919 is clamped to the transverse outside door arm frame. The lower bearing mount 2923 is clamped to the tubular member 2921 such that the bearing portion is positioned substantially horizontally. The pin 2929 of the lower pivot bracket 2927 is inserted into the bearing 2925.

As shown in FIG. 30, the upper and lower door arm pivots must be coaxial with the axis of rotation of the door under test. As constructed and arranged, the outside door 180 degree actuator 2900 provides adjustability in the horizontal planes of both the actuator mounting assembly 2905 and the lower bearing assembly 2917 to assure proper and independent alignment of each door arm pivot. Specifically, the actuator mounting assembly 2905 can be positioned laterally along the horizontal member of the rearward or forward frame member or the longitudinal member by securing the upper motor bracket 2907 to the proper position on the main frame. If required, once the lateral position of the upper pivot is secured, the position of the vehicle under test can be shifted longitudinally along the vehicle supports and laterally by adjustment of the vehicle supports and then secured once the upper pivot is coaxial with the axis of rotation of the door under test. Similarly, the lower bearing assembly 2917 can be positioned laterally by moving and securing the lower bearing mount 2923 along the tubular member 2921 of the support bracket 2919. The lower bearing assembly 2917 can be positioned longitudinally along the longitudinal member of the main frame by moving and securing the support bracket 2919 along the longitudinal member of the main frame. If the bearing assembly 2917 is mounted to the transverse outside door arm frame, the bearing assembly 2917 can be similarly positioned laterally.

The vertical segment of the outside door arm 2903 should be positioned laterally from the door handle nearer the axis of rotation to provide proper alignment for any outside door handle actuator attached to the outside door arm 2903.

The 180 degree outside door arm actuator 2900 also includes interface assemblies 2947, 2955 disposed on the outside door arm 2903 for engaging and opening or closing the door under test. As shown in FIG. 30, the closing interface assembly 2947 comprises a roller arm 2949, preferably constructed from steel tube, and a roller 2951 rotatably mounted to one end of the arm 2949. The end defines holes through opposed surfaces of the tube positioned cross-axially in end of the roller arm 2949. The roller 2951 is mounted rotatably to the arm 2949 by a mechanical fastener passing through the holes. The roller 2951 should have a diameter sufficiently large such that the roller 2951 extends past the end of the arm 2949. Preferably, the roller 2951 should be reasonably pliable; a suitable roller 2951 is a DURASOFT roller #DR-754-20 or equivalent.

The roller arm 2949 is attached to the outside door arm 2903 by two cylindrical brackets welded together such that the bores of each bracket are aligned perpendicularly. The cylindrical brackets are constructed as previously described. The roller arm 2949 is clamped within one of the cylindrical brackets, and the other cylindrical bracket is secured to the outside door arm 2903 such that the roller arm 2949 extends towards the door under test.

A bumper 2953 is fixed to the main frame and extends therefrom such that the bumper 2953 engages the door arm 2903 when the door arm 2903 is closed thereby positioning the roller 2951 away from the door under test. The door arm 2903 should be controlled, as described in more detail below, so that the door arm 2903 does not crash into a fully closed and latched door under test. The bumper 2953 provides a final fail safe to prevent such impact.

Figure 34:
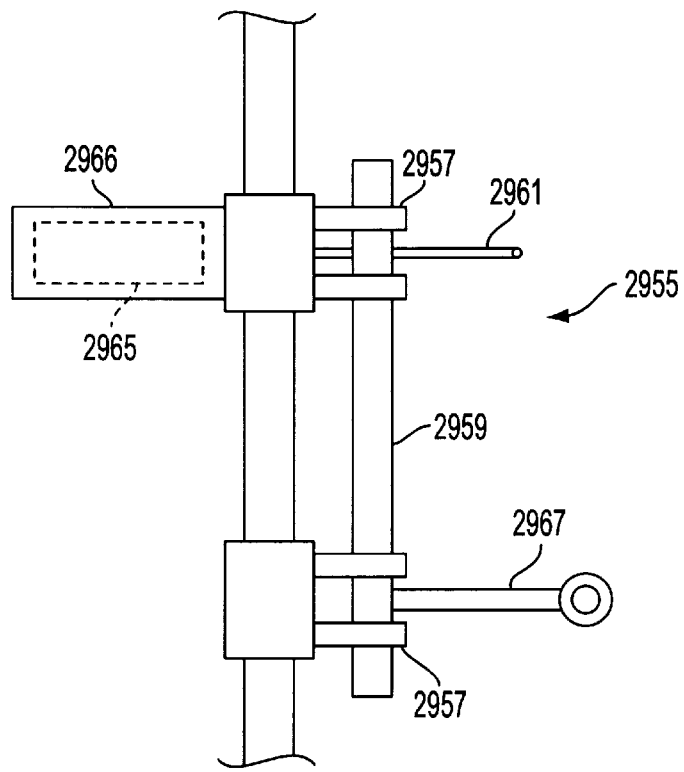
FIG. 34 is a side elevational view of an interface assembly of the door arm actuator of FIG. 29.
Figure 35:
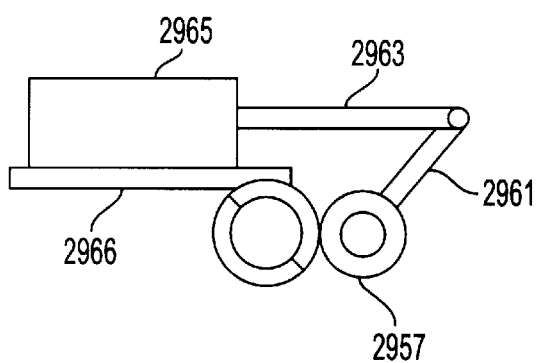
FIG. 35 is a top plane view of the interface assembly of FIG. 34.
Figure 36:
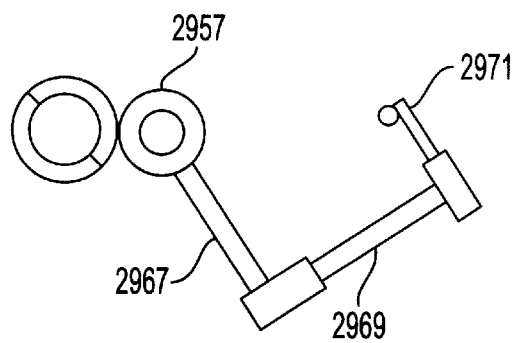
FIG. 36 is a bottom plane view of the interface assembly of FIG. 34.

As shown in FIGS. 34–36, an opening interface assembly 2955 for the outside door arm 2903 is adapted for attachment to the vertical member of the outside door arm 2903. It provides a mechanism for selectively engaging a door and opening the door as the outside door arm 2903 rotates in an opening direction. Specifically, the opening interface assembly 2955 comprises a pair of cylindrical brackets similar in construction to the previously defined cylindrical brackets. The cylindrical brackets include two mating semi-circular members defining a bore therethrough when positioned in the mating configuration. The cylindrical bracket is adapted to clamp to the vertical arm of the outside door arm 2903. A pair of bracket and bearing assemblies 2957 is attached, preferably by welding, to each of the cylindrical brackets. More particularly, the pairs of cylindrical bearing brackets 2957 are welded on an outside surface of the cylindrical brackets and are positioned coaxially to each other. A shaft 2959 is rotatably mounted within the bearings such that each of the bearings is aligned coaxially. A piston engaging arm 2961 is attached to the shaft 2959 between the pairs of bearings forming the upper bracket end bearing assembly 2957. The piston engaging arm 2961 defines a mounting hole at its free end for attachment to a piston 2963 of an air cylinder 2965.

Similarly, a first door engaging arm 2967 is attached, preferably by welding to the shaft 2959 between the second pair of bearings forming the lower bracket end bearing assembly 2957. A cylindrical bracket identical to the previously described brackets is attached, preferably by welding to the free end of the first door engaging arm 2967. A second door engaging arm 2969 is clamped within the bracket of the first door engaging arm 2967 and extends perpendicularly therefrom. A cylindrical bracket, again of the previously described design, is fixed, preferably by welding, to the free end of the second door engaging arm 2969. A third door engaging arm 2971 is clamped within the cylindrical bracket of the second door engaging arm 2969. As configured, each of the door engaging arms are substantially perpendicular to its adjoining arm, and the first and third door engaging arms 2967, 2971 are substantially parallel. All of the door engaging arms are substantially co-planar. Thus, rotation of the piston engaging arm 2961 causes the shaft 2959 to rotate about the bracket and bearing assemblies 2957 thereby causing the door engaging arms to rotate. A cylinder mounting plate 2966 is attached, preferably by welding to the upper cylindrical bracket. An air cylinder 2965 is fixed to the plate 2966 such that its piston 2963 extends towards the piston engaging arm 2961. The free end of the air cylinder piston 2963 is attached pivotally to the piston engaging arm 2961. One skilled in the art will recognize readily that any actuator could be substituted for the air cylinder 2965 including electric cylinders and hydraulic cylinders.

The outside door actuators 2900 are provided preferably in three sizes; each being constructed and arranged identically except for the relative dimensions of the door arms 2903 and the output of the drivers 2943. A small 180 degree outside door actuator 2900 should be adapted for use with small and compact vehicles. A medium 180 degree outside door actuator 2900 should be adapted for use with large vehicles, and a large 180 degree outside door actuator 2900 should be adapted for use with full-size vans.

Once the 180 degree, outside door actuator is aligned properly, as described above, and a door cycle has commenced (assuming the beginning of the cycle starts from a closed position and the door latch has been released), the cylinder 2965 of the opening interface assembly 2955 retracts its extensible piston 2963 to rotate the shaft 2959 in a counterclockwise direction. Thereafter, the engaging arm 2971 engages and hooks onto the door under test. At this stage, the driver 2943 rotates the door arm 2903 and, consequently, the door under test to a full open position. At the end of the opening cycle, the opening interface assembly releases the door by retraction of the piston 2963. Thereafter, the driver 2943 rotates the door arm 2903 in a closing direction. The roller 2951 of the closing interface assembly engages the door and closes the door under test. The speed and/or acceleration of the driver 2943 is controlled to simulate human closure of the door. Once the door under test reaches the desired closing speed, the driver 2943 slows down before causing the arm 2903 to impact the door. Because the roller 2951 is not attached to the door under test, however, the door under test continues to rotate to closure.

Inside Door Actuator—90 Degree Rotation

The inside door 90-degree actuators 3100 are configured to cycle doors mounted for rotation about a vertical axis through approximately 90 degrees. The 90-degree inside door actuators 3100 cycle doors under test from a position inside the vehicle under test. The 90-degree inside door actuators 3100, generally, comprise a linkage mechanism 3102, a powered driver 3104 for rotating the linkage mechanism 3102, support fixtures and brackets, bearings and bearing mounts, and interface members disposed on the linkage assembly specifically designed for an opening or closing function.

Figure 37:
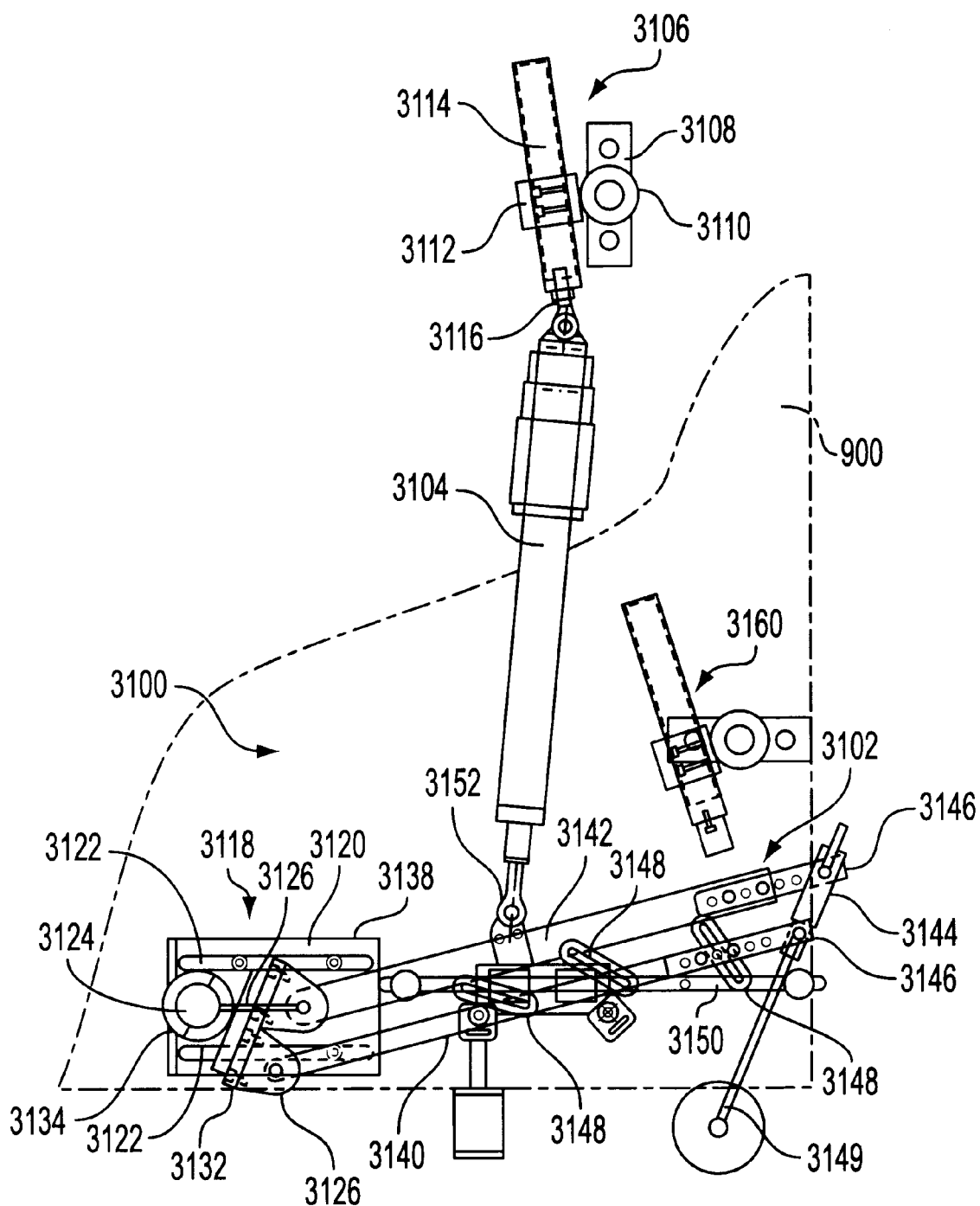
FIG. 37 is a top plane view of the inside door actuator having 90 degree rotation in accordance with the present invention.
Figure 38:
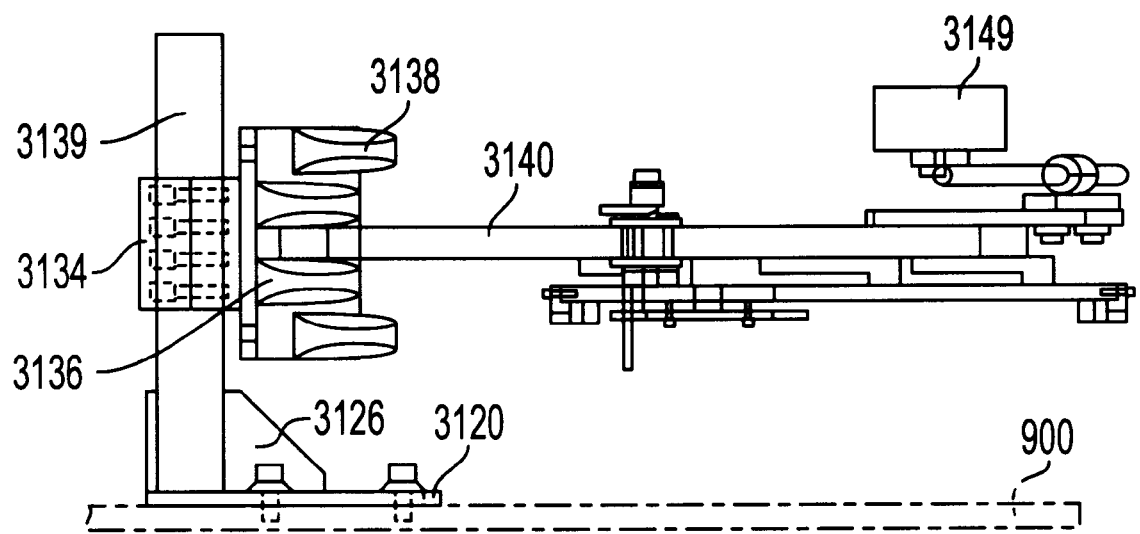
FIG. 38 is a side elevational view of the door actuator of FIG. 37.

As shown in FIGS. 37–38, a rear driver mount 3106 is provided. The driver mount 3106 comprises a plate 3108 defining a plurality of holes therethrough. The plurality of holes provides a convenient place for attaching the plate 3108 to an inside base frame 900 by mechanical fasteners. A tubular member 3110 is fixed, preferably by welding to the plate 3108 such that the tubular member 3110 extends perpendicularly from the plate 3108. A pair of cylindrical brackets 3112 constructed and arranged as previously described are joined together, preferably by welding, such that the longitudinal axes of the brackets are disposed perpendicularly relative to each other. One of the cylindrical brackets is clamped to the tubular member 3110 of the driver mount 3106 such that axis of the other bracket is positioned perpendicular to the tubular member 3110. A second tubular member 3114 is secured in the second cylindrical bracket such that the second tubular member 3114 extends perpendicularly relative to the first tubular member 3110. As configured, the relative height and lateral position of the second tubular member 3114 of the driver mount 3106 can be changed by shifting the positions of the cylindrical clamps along the first tubular member 3110 and the second tubular member 3114 within the cylindrical clamps, respectively. Finally, a rod end 3116 is fixed to one end of the second tubular member 3114 to provide an attachment mechanism for attaching the driver mount 3106 to a driver 3104.

The actuator driver 3104 is fixed pivotally to the rod end 3116 by conventional means. Preferably, the driver 3104 is an electric linear actuator having an extensible piston. One skilled in the art will recognize readily that other drivers, including hydraulic cylinders or air cylinders, could be incorporated herein. However, electric linear actuators are most suitably adapted for control of the door actuator 3100. Simulation of human closure of vehicle doors requires that the door actuators follow a velocity profile indicative of human door closure. Electric actuators are best suited for such control. By comparison, hydraulic and air actuators are less responsive to precise control and are subject to varied outputs as temperature varies.

A bearing mount assembly 3118 is configured for attachment to the inside base frame 900 and is adapted to position the linkage assembly 3102 in proper position relative to the door under test. More particularly, the bearing mount assembly 3118 comprises a base plate 3120. The base plate 3120 defines two parallel slots 3122 disposed along the edges of the plate 3120. The slots 3122 provide a convenient place to attach the plate 3120 to an inside base frame 900. Moreover, the slots provide the ability to position the base plate 3120 laterally along the inside base frame 900 by sliding the plate 3120 relative to the mechanical fasteners passing through the slots 3122. A tubular member 3124 is fixed, preferably by welding to the plate 3120 such that the tubular member 3124 extends perpendicularly from the plate 3120. Preferably, a stiffener member 3126 is disposed, preferably attached by welding, between the member 3124 and the plate 3120.

A bearing mount 3130 is provided for pivotal attachment of bearings to the tubular member 3124. A plate 3132 is mounted to a cylindrical bracket 3134 (constructed and arranged as described above) clamped to the tubular member 3124. The plate 3132 can be selectively pivoted about an axis perpendicular to the tubular member 3124. Conventional means are used to secure the plate 3132 in the selected angular position. A first pair of bearings 3136 and a second pair of bearings 3138 are disposed on the plate 3132. Any bearing suitable for the expected loads and frequency of rotation may be incorporated in this assembly. A McGill TBC-25 bearing or equivalent may be used.

A first linkage member 3140 and a second linkage member 3142 are rotatably mounted at one end to the bearings 3136, 3138 such that the members 3140, 3142 extend therefrom. A cam bracket 3144 is attached to the other ends of the linkage members 3140, 3142 such that the members 3140, 3142 are positioned parallel to each other and are confined to maintain such parallel relationship as they rotate. More particularly, a cam follower 3146 is rotatably mounted to each end of the members 3140, 3142. In turn, the cam followers 3146 rolls within the cam bracket 3144. A suitable cam follower is the RBC # H-24-LW. As configured, the linkage members 3140, 3142 are confined to parallel rotation.

A plurality of rail supports 3148 is disposed on the first linkage member 3140. Each of the rail supports 3148 defines a slot therethrough. Mechanical fasteners passing through the slots of the rail supports attach the rail supports 3148 to the first linkage member 3140. As configured, the rail supports can slide relative to their associated fastener until such fastener secures the supports 3148 to the member 3140. A linear slide 3150 is mounted to the rail supports 3148 such that the linear slide 3150 can be selectively positioned relative to the door under test. A roller and shaft assembly 3149 is slidably mounted to the cam bracket 3144.

A forward driver bracket 3152 is mounted to the second linkage member 3142. The forward bracket 3152 provides a point of pivotal attachment for the forward end of the driver 3104.

Figure 39:
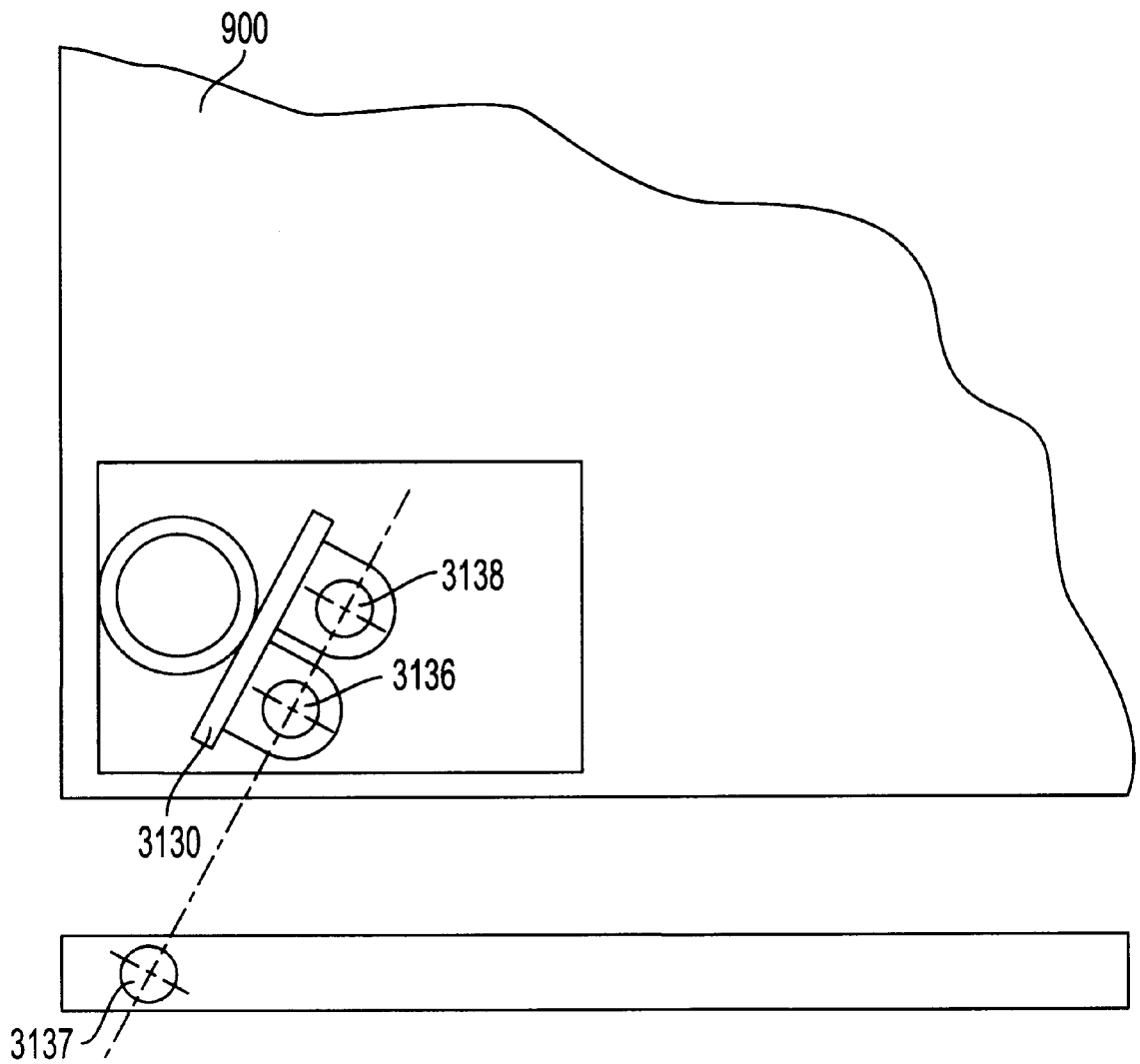
FIG. 39 is a diagram showing the proper alignment of the actuator of FIG. 37.
Figure 40:
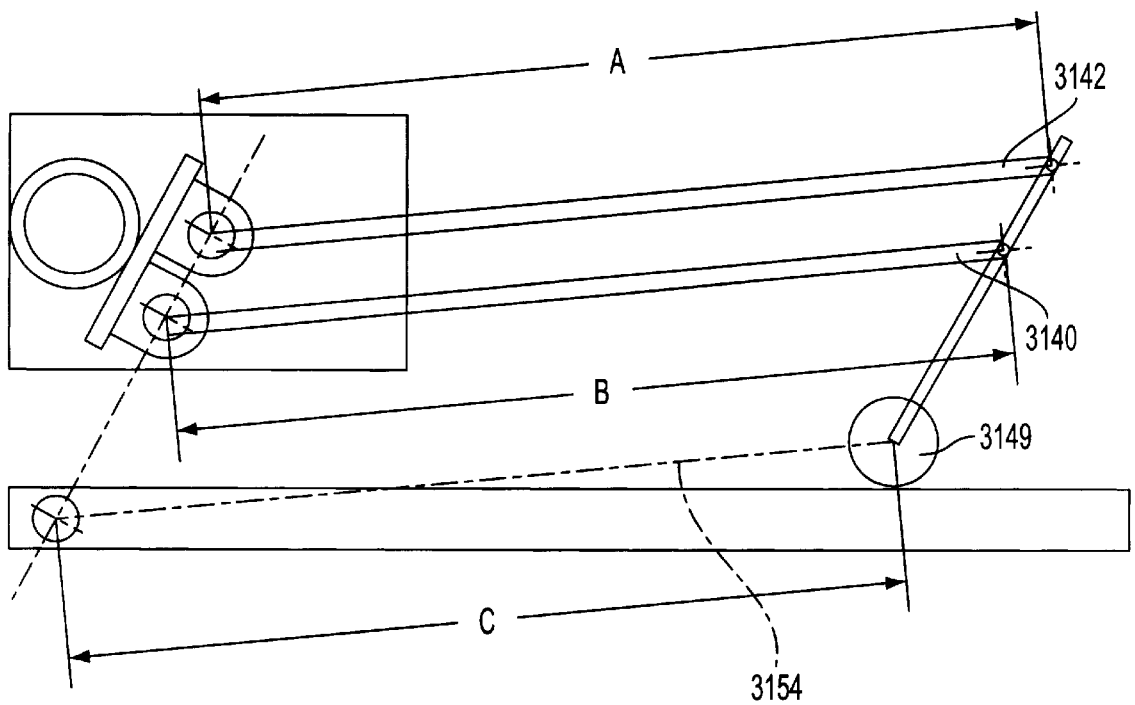
FIG. 40 is a diagram showing the proper alignment of the actuator of FIG. 37.
Figure 41:
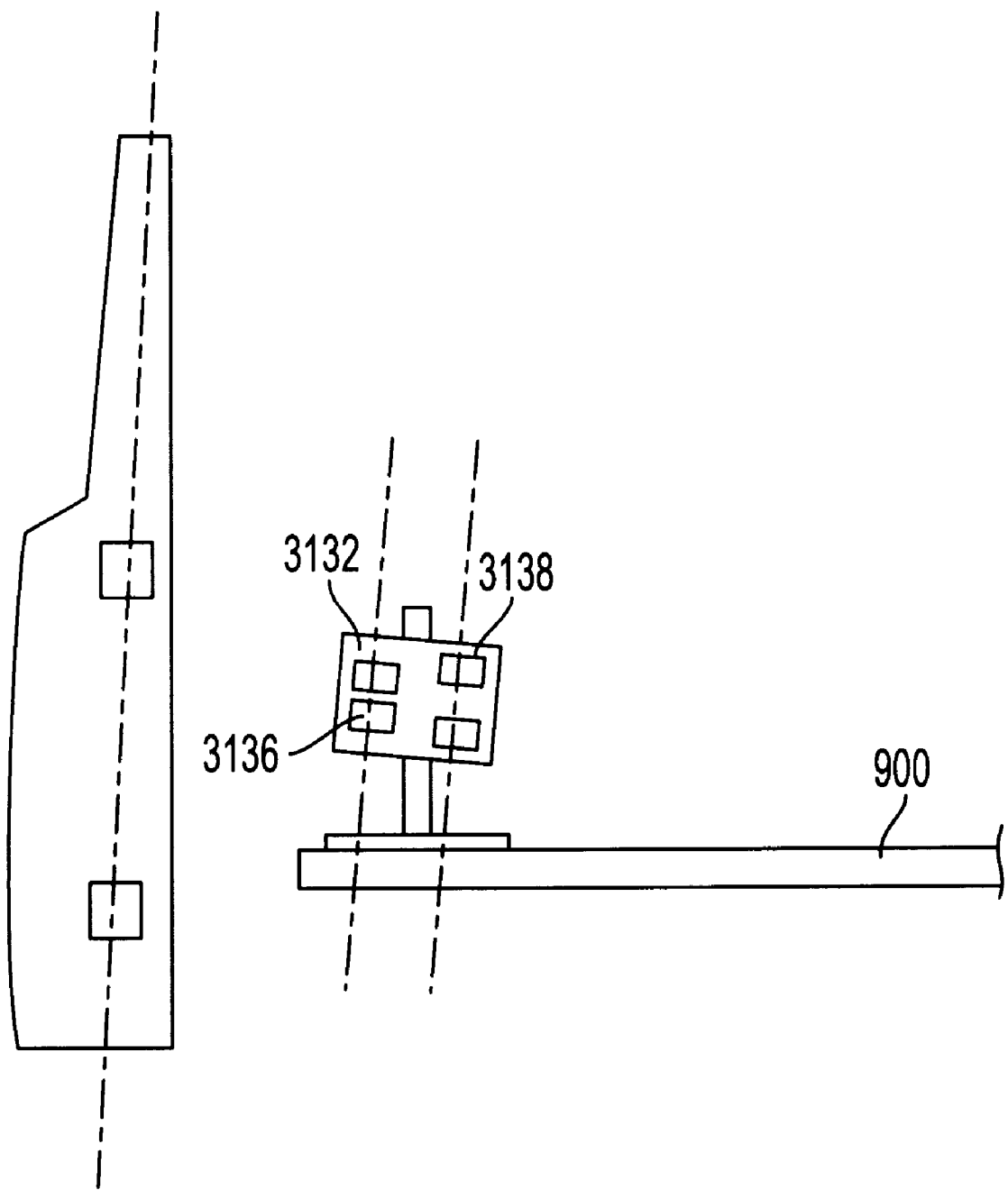
FIG. 41 is a diagram showing the proper alignment of the actuator of FIG. 37.
Figure 42:
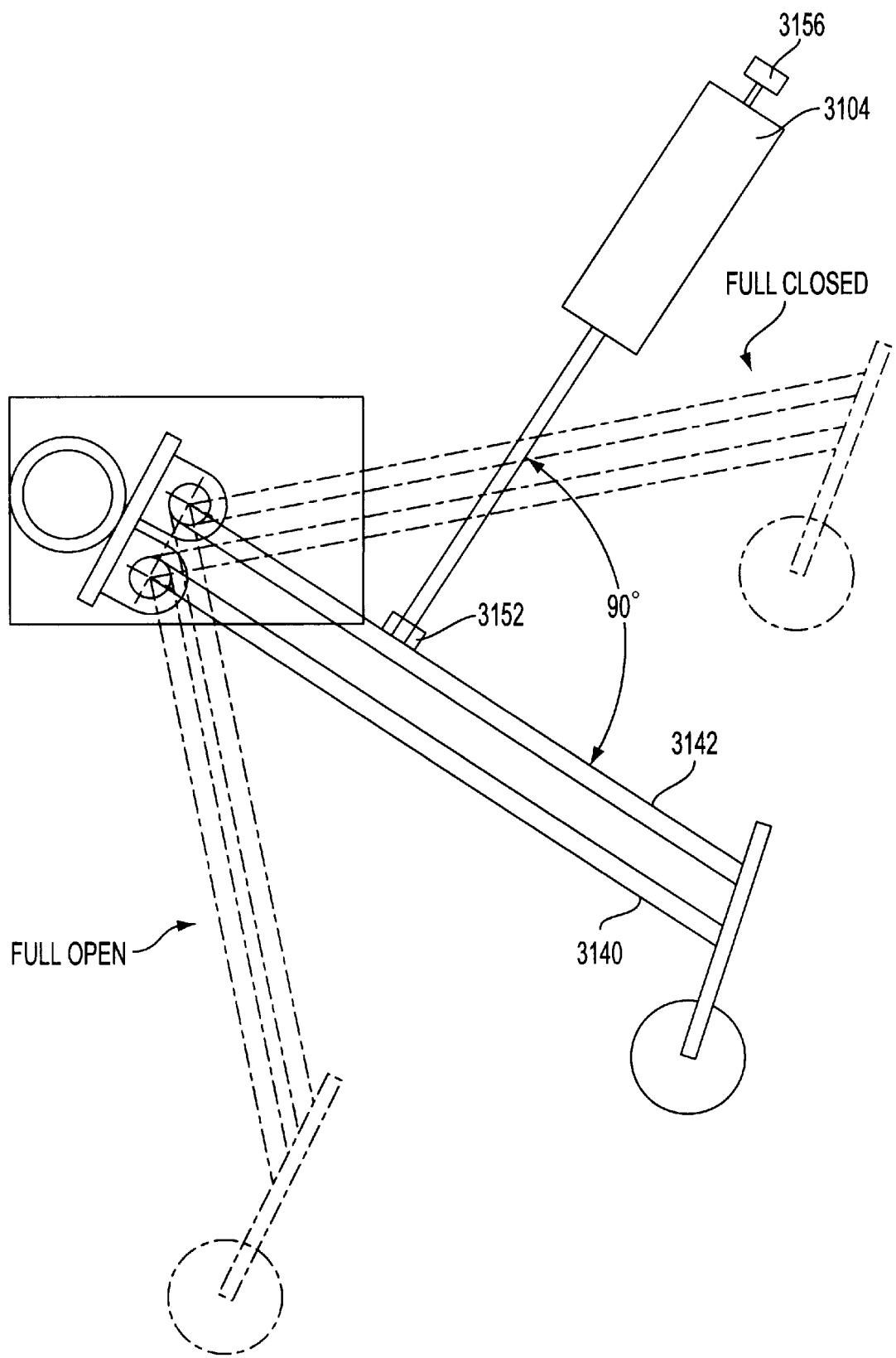
FIG. 42 is a diagram showing the proper alignment of the actuator of FIG. 37.
Figure 43:
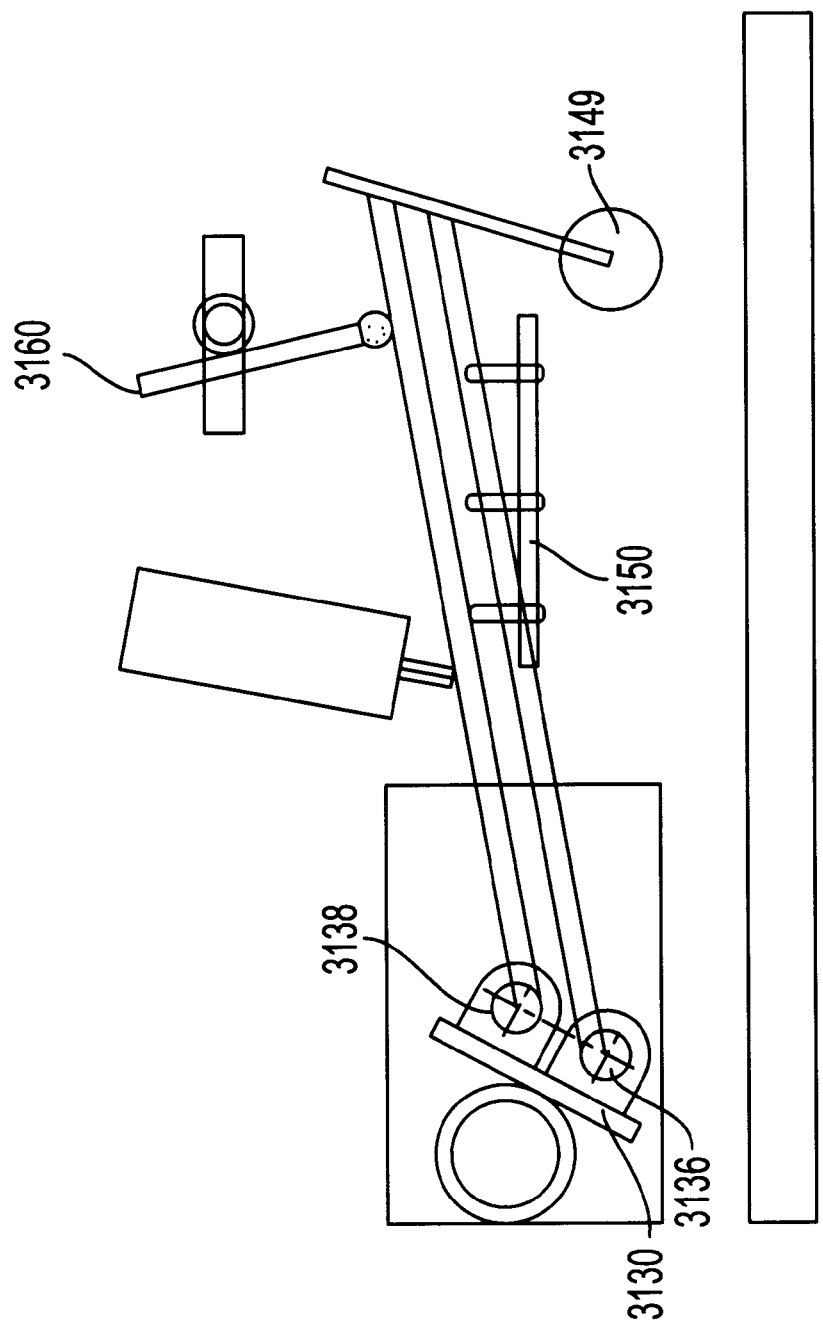
FIG. 43 is a diagram showing the proper alignment of the actuator of FIG. 37.

As shown in FIGS. 39–43, the actuator 3100 is configured as follows. As shown in FIG. 39, the bearing mount 3130 is positioned relative to the inside base frame 900 such that the centers of the bearings 3136, 3138 are co-linear with the door hinge 3137. As shown in FIG. 40. the roller and shaft assembly 3149 is positioned relative to a closed door under test such that an imaginary line 3154 extending between the axis of door rotation and the center of the roller 3149 is parallel with the first and second linkage members 3140, 3142. As configured, the members 3140, 3142 and the imaginary line 3154 will remain parallel in all positions of rotation and dimension A, B and C are equal. As shown in FIG. 41, the bearing plate 3132 is pivoted to a position wherein the axes of the bearings 3136, 3138 are parallel with the axis of door rotation. As configured, the roller 3149 will not change its position relative to the door under test—i.e., it will not roll up and down or fore and aft. As shown in FIG. 42, the door under test is positioned in its mid-cycle position. The linear actuator 3104 is pivotally mounted between the forward bracket 3152 and a rear mount 3156 such that the actuator 3104 is perpendicular to the members 3140, 3142. The forward mount 3152 is positioned laterally on the second linkage member 3142 to provide a sufficient lever arm to rotate the door under test. Finally, as shown in FIG. 43, the linear slide 3150 is positioned parallel to the door under test when the door is in a closed position. As configured, the linear slide 3150 remains a constant distance from the door under test in all positions of rotation of the linkage assembly 3102. Preferably, a bumper assembly 3160 is disposed behind the linkage members 3140, 3142 to prevent over-rotation of the members 3140, 3142.

As configured, the roller 3149 pushes the door under test in an opening direction as the actuator 3104 pushes the linkage members 3140, 3142 to rotation in an opening direction. To effect door closure, a strap and hook assembly 3162 is fixed to the linear slide 3150. A hook of the strap and hook assembly 3162 is attached to a door handle of the door under test. As the linkage members 3140, 3142 are rotated by the actuator 3104 in a closing direction, the strap and hook assembly pulls the door under test closed.

Inside Door Actuator—120 Degree Rotation

Figure 44:
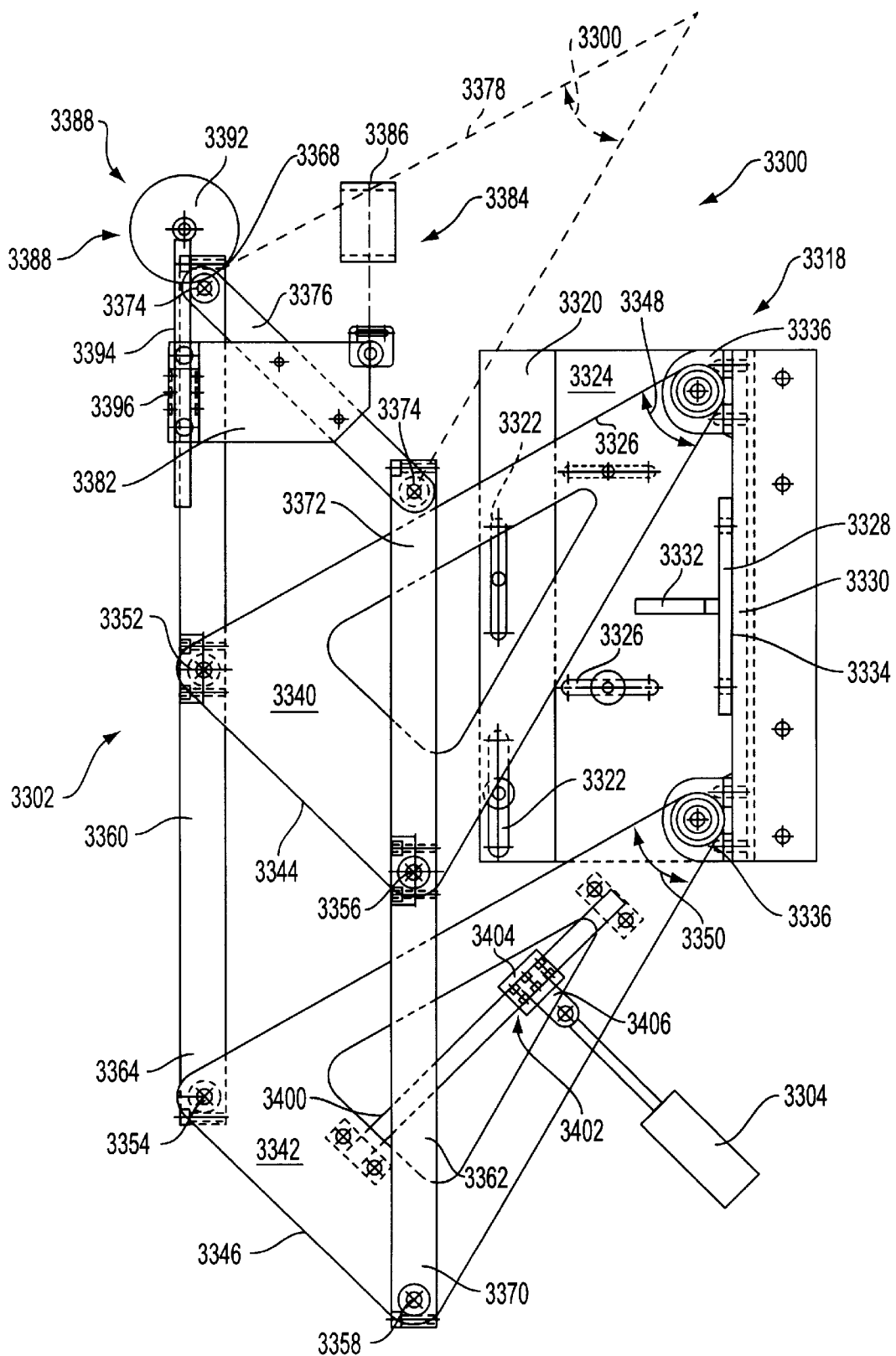
FIG. 44 is a top plan view of an inside door actuator having 120 degree rotation in accordance with the present invention.

The inside door 120-degree actuators 3300 are configured to cycle doors mounted for rotation about a vertical axis through approximately 120 degrees. As the name implies, the 120-degree inside door actuators 3300 cycle doors under test from a position internal to the vehicle under test. As shown in FIG. 44, the 120-degree inside door actuators 3300, generally, comprise a linkage mechanism 3302, a powered driver 3304 for rotating the linkage mechanism 3302, support fixtures and brackets, bearings and bearing mounts, and interface members disposed on the linkage assembly specifically designed for an opening or closing function.

Figure 45:
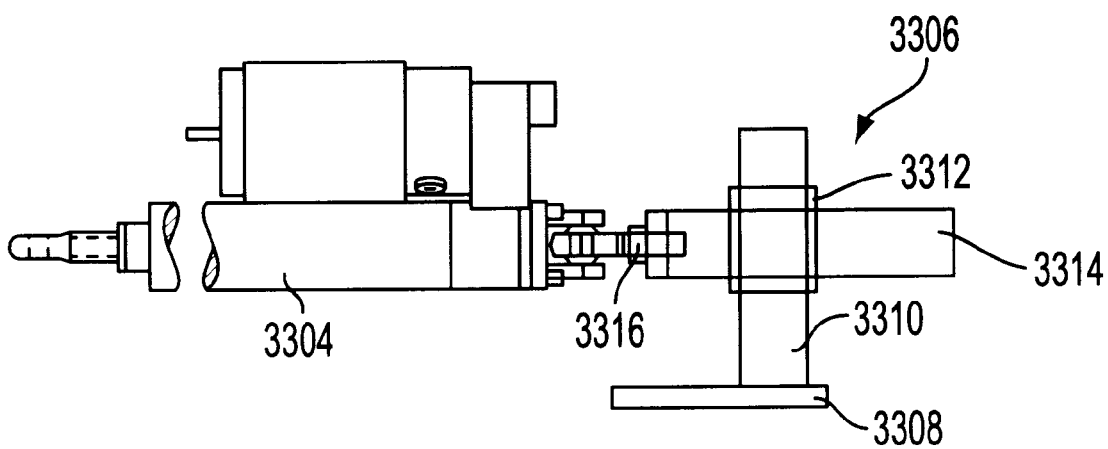
FIG. 45 is a rear cylinder mount of the actuator of FIG. 44.

As shown in FIG. 45, a driver mount 3306 is provided. The driver mount 3306 comprises a plate 3308 defining a plurality of holes therethrough. The plurality of holes provides a convenient place for attaching the plate 3308 to an inside base frame 900 by mechanical fasteners. A tubular member 3310 is fixed, preferably by welding, to the plate 3308 such that the tubular member 3310 extends perpendicularly from the plate 3308. A pair of cylindrical brackets 3312 constructed and arranged as previously described are joined together, preferably by welding, such that the longitudinal axes of the brackets are disposed perpendicularly relative to each other. One of the cylindrical brackets is clamped to the tubular member 3310 of the driver mount 3306 such that axis of the other bracket is positioned perpendicular to the tubular member 3310. A second tubular member 3314 is secured in the second cylindrical bracket such that the second tubular member 3314 extends perpendicularly relative to the first tubular member 3310. As configured, the relative height and lateral position of the second tubular member 3314 of the driver mount 3306 can be changed by shifting the positions of the cylindrical clamps along the first tubular member 3310 and the second tubular member 3314 within the cylindrical clamps, respectively. Finally, a rod end 3316 is fixed to one end of the second tubular member 3314 to provide an attachment mechanism for attaching the driver mount 3306 to a driver 3304.

The actuator driver 3304 is fixed pivotally to the rod end 3316 by conventional means. Preferably, the driver 3304 is an electric linear actuator having an extensible piston. One skilled in the art will recognize readily that other drivers, including hydraulic cylinders or air cylinders, could be incorporated herein. However, electric linear actuators are most suitably adapted for control of the door actuator 3300. Simulation of human closure of vehicle doors requires that the door actuators follow a velocity profile indicative of human door closure. Electric actuators are best suited for such control. By comparison, hydraulic and air actuators are less responsive to precise control and are subject to varied outputs as temperature varies.

As shown in FIG. 44, a pivot bearing mount assembly 3318 is configured for attachment to the inside base frame 900 and is adapted to position the linkage assembly 3302 of the door actuator 3300 in proper position relative to the door under test. More particularly, the pivot bearing mount assembly 3318 includes a first base plate 3320. The first base plate 3320 includes a plurality of linear slots 3322 for mounting the base plate 3320 to the inside base frame 900. The first base plate 3320 is mounted to the inside base frame by mechanical fasteners that pass through the slots 3322 and attach to the threaded holes of the inside base frame 900. The first base plate 3320 can be positioned laterally relative to the side of a vehicle under test by sliding the first base plate 3320 relative to the inside base frame 900 along the slots 3322. This direction of adjustment is conveniently called the "Y" adjustment.

A second base plate 3324 is slidably mounted to the first base plate 3320. Specifically, the second base plate 3324 defines a pair of slots 3326 extending perpendicularly to the slots 3322 of the first base plate 3320. Mechanical fasteners passing through the slots 3326 of the second base plate 3324 attach to threaded holes in the first base plate 3320. As configured, the second base plate 3324 can slide relative to the first base plate 3320 in a direction perpendicular to the slots 3322 of the first base plate 3320. This direction of adjustment is conveniently called the "X" adjustment. Thus, the pivot bearing mount assembly 3318 can be positioned in the "Y" direction relative to the width of the inside base frame 900 and positioned in the perpendicular "XI" direction relative to the length of the inside base frame 900 by moving the base plates 3320, 3324 in their respective slots 3322, 3326. Adjustment in the "Y" direction would move the pivot bearing mount assembly 3318 towards or away from the door under test. Adjustment in the "X" direction would move the pivot bearing mount assembly 3318 substantially parallel with the door under test.

A vertical plate member 3328 of the second base plate 3324 is fixed, preferably by welding, to a lateral edge 3330 of the second base plate 3324 displaced from the slots 3326 and extends perpendicularly therefrom. The vertical member 3328 has a width smaller than the width of the lateral edge 3330 of the second base plate 3324. A stiffener member 3332 is disposed, preferably fixed by welding, between the vertical member 3328 and the second base plate 3324 and extends perpendicularly from both the vertical member 3328 and the second base plate 3324. The vertical member 3328 defines a pair of vertical slots disposed near each vertical edge of the vertical member 3328. One of the pair of slots has a width greater than the other slot. A bearing mount 3334 comprised of L-shaped channel is pivotally mounted to the vertical member 3328 of the second base plate 3324. The bearing mount 3334 defines a plurality of holes at each lateral end for mounting a bearing assembly 3336. Disposed between the bearing mount holes are a plurality of holes spaced for alignment with the slots of the vertical member 3328. The bearing mount 3334 is fixed to the vertical member 3328 by mechanical fasteners passing through the holes of the bearing mount 3334 and the slots of the vertical member 3328. The slots of the vertical member 3328 are configured to allow the bearing mount 3334 to slide vertically relative to the vertical member 3328 and provide some degree of rotation of the bearing mount 3334 relative to the vertical member 3328. As configured, the bearing mount assembly 3318 can be positioned in three dimensional space relative to the inside base frame 900, and consequently the door under test, by the relative movement of the plates along the slots provided in each of the members. Bearings 3336 are mounted to each end of the bearing mount 3334. Any bearing suitable for the expected loads and frequency of cycling may be incorporated. A suitable bearing for this application is the Sealmaster TBC-8 or equivalent. The bearings 3336 are mounted such that their axes of rotation are perpendicular to the first base plate 3320.

As best viewed in FIG. 45, the linkage assembly 3302 comprises a pair of triangular members 3340, 3342. Both of the triangular members are constructed and arranged as identical isosceles triangles having bases 3344, 3346 and apex angles 3348, 3350 opposed to the bases 3344, 3346. Again, the dimensions of the bases and apex angles are the same for both triangular members 3340, 3342. The triangular member 3340 disposed nearest the door under test is labelled conveniently as the outside triangular member 3340, and the triangular member 3342 disposed farthest from the door under test is labelled conveniently as the inside triangular member 3342. As discussed below, each angle of the triangular members provides a pivot point for the linkage assembly 3302. As one skilled in the art will recognize readily upon further review of this description, the triangular members are conveniently constructed in a triangular shape and could, however, be constructed in any other geometric shape as long as three pivot points are maintained.

A bearing 3352 (or more precisely labeled as bearings 3354, 3356, 3358 as shown in the drawings) is disposed at each end of the bases 3344, 3346 of the triangular members 3340, 3342. Any bearing suitable for the expected loads and frequency of door cycling and having the capability to be attached to another linkage member may be used. A suitable bearing for this application is a Torrington DW6 bearing or equivalent. The apex angle portions 3348, 3350 of the triangular members 3340, 3342 are rotatably mounted to the bearings 3336 of the bearing mount assembly 3318. As configured, the triangular members 3340, 3342 are rotatable within the same plane.

A pair of straight linkage members 3360, 3362 are disposed on the triangular linkage members 3340, 3342. More particularly, a first straight linkage member 3360 is pivotally mounted to the bearings 3336 of the triangular linkage member 3340 such that one end 3364 of the first straight linkage member 3360 is pivotally mounted to the bearing 3354 of the base 3346 of the inside triangular member 3342 and such that the straight linkage member 3360 is pivotally mounted at an intermediate position to the bearing 3352 of the base 3344 of the outside triangular member 3340. As configured, the first straight linkage member 3360 includes the opposite end 3368 extending past the inside triangular member 3340. Additionally, the connection of the first straight linkage member 3360 to the triangular members 3340, 3342 fixes the relative position between the triangular members during all points of rotation. Similarly, a second straight linkage member 3362 is disposed pivotally on the triangular members 3340, 3342. Specifically, one end 3370 of the second straight linkage member 3362 is pivotally mounted to the bearing 3358 of the base 3346 of the inside triangular member 3342. The second straight linkage member 3362 is pivotally mounted at an intermediate position to the bearing 3356 of the base 3344 of the outside triangular member 3340. As configured, the second straight linkage member 3362 is disposed parallel in all positions of rotation relative to the first straight linkage member 3360. Similarly, the second straight linkage member 3362 includes an outside opposite end 3372 extending from the inside triangular member 3340. This configuration assures that the bases 3344, 3346 of the inside and outside triangular members 3340, 3342 maintain the same angular relationship to each other and that the relative distance between the bases 3344, 3346 of the triangular members 3340, 3342 remains constant for all points of rotation. Additionally, the straight linkage members 3360, 3362 remain parallel in all points of rotation.

A bearing 3374 is disposed in each outside end 3368, 3372 of the straight linkage members 3360, 3362. Again, any bearing suitable for the expected loads and frequency of cycling may be incorporated in this linkage. A Torrington DW-6 bearing or equivalent is suitable for this application. A linkage bar 3376 is pivotally disposed between the outside end bearings 3374. As configured, the linkage bar 3376 is parallel with the bases 3344, 3346 of the triangular linkage members 3340, 3342 and equal in width to the bases. In fact, the linkage bar 3376 forms a base of an imaginary isosceles triangle 3378 having an apex angle 3380 opposite the linkage bar 3376. The imaginary triangle 3378 is identical in size and angle with the triangular members 3340, 3342. The imaginary triangle 3378 and the triangular members 3340, 3342 are coplanar and have their respective apex angles positioned linearly from each other.

As configured, each triangle is rotatable about its respective apex angle. In fact, the actuator 3300 should be positioned on the inside base frame 900 relative to the door under test such that the apex angle 3380 of the imaginary triangle 3378 is coaxial with the axis of rotation of the door under test and such that the plane of the triangular members 3340, 3342 is perpendicular to the axis of door rotation. Such a configuration assures that the linkage bar 3376 follows the arc of rotation of the door under test. Consequently, any member extending from the linkage bar 3376 to engage the door under test will contact the door under test at one point only for all positions of rotation. The apex angle 3380 of the imaginary triangle 3378 is positioned coaxially with the axis of door rotation by sliding the base plates along their slots and rotating, if required, the bearing mount plate 3334.

A contact mount plate 3382 is fixed to the bar linkage 3376 by conventional means. The contact mount plate 3382 provides a convenient base to which opening or closing assemblies may be attached. Again, any member extending from the contact mount plate 3382 will contact the door under test in only one position for all points of rotation. A closing assembly 3384 for pulling the door closed is provided. The closing assembly 3384 comprises a strap (not shown) fixed to the contact plate 3382 by conventional means. At the opposed end of the strap, a hook 3386 for grabbing a pull cup of a door handle is disposed. As the actuator 3300 rotates in a closing direction, the closing assembly 3384 pulls the door under test closed. An opening assembly 3388 is also provided. The opening assembly 3388 comprises a shaft and roller assembly 3390. A roller 3392 is disposed rotatably to an end of a shaft 3394 by conventional means. A suitable roller for this application is a Durasoft DR-754-20 or equivalent. The shaft 3394 is mountable to the contact mount plate 3382 by clamps 3396 fixed to the contact mount plate 3382. Such a configuration provides flexibility in positioning the roller 3392 relative to the door under test.

As described above, an electric linear actuator 3304 drives the triangular members 3340, 3342 to rotate in either an opening or closing direction. In that regard, a tubular member 3400 is disposed on the inside triangular member 3342 such that the tubular member 3400 is substantially coextensive with a line extending perpendicularly from the base 3346 of the inside triangular member 3342 and intersecting the apex angle 3350 of the inside triangular member 3342. The tubular member 3400 is fixed to the triangular member 3342 by conventional means. A forward cylinder mount 3402 is mountable selectively to any position along the tubular member 3400. The forward cylinder mount 3402 comprises a cylindrical bracket 3404 constructed and arranged as those previously described. A mount plate 3406 is fixed, preferably by welding, to a lateral side of the cylindrical bracket 3404 and extends perpendicularly from the axis of the cylindrical bracket 3404. The plate 3406 provides a point of pivotal attachment for the electric actuator 3304.

The actuator 3304 is attached as follows. The triangular members 3340, 3342 are positioned in a mid-cycle position—i.e., at a position corresponding to a door half way opened. The forward cylinder mount 3402 is secured to the tubular member 3400 of the inside triangular member 3342 at a position that will provide the necessary lever arm in combination with the load applied by the linear driver 3304 to rotate the door under test. With the triangular members 3340, 3342 in the mid-cycle position, the linear actuator 3304 is pivotally mounted to the forward cylinder mount 3402 and is extended perpendicularly from the tubular member 3400. The rear of the linear actuator 3304 is thereafter pivotally mounted to the cylinder mount 3306, and the cylinder mount 3306 is fixed to the inside base frame 900.

In operation, assuming the door under test is initially in a fully closed position, the door under test is first unlatched (any mechanism that can unlatch the door, including those described below, may be incorporated). Once the system receives confirmation that the door is unlatched, the linear actuator 3304 extends its piston to rotate the linkage assembly 3302 in an opening direction. The roller 3392 engages the door under test and pushes it open. Again, because of the arrangement of the linkage members as described above, the roller 3392 contacts the door under test at a single point for the entire rotation of the door. Once the door reaches its fully opened position, the electric linear actuator 3304 retracts its piston and rotates the linkage assembly 3302 in a closing direction. In turn, the strap and hook assembly pulls the door closed.

Inside Door Actuator—180 Degree Rotation

The inside door, 180-degree actuators 3500 are configured to cycle doors mounted for rotation about a vertical axis through approximately 180 degrees. The 180-degree inside actuators 3500 are adapted particularly to rotate, for example, rear and side van doors. The actuators 3500 cycle doors under test from a position inside the vehicle under test. The 180-degree inside door actuator 3500 comprises generally a linkage assembly 3502, a power driver 3504 for rotating the linkage assembly 3502, support fixtures and brackets, bearings and bearing mounts, and interface members disposed on the linkage assembly 3502 specifically adapted for a opening or closing function.

Figure 46:
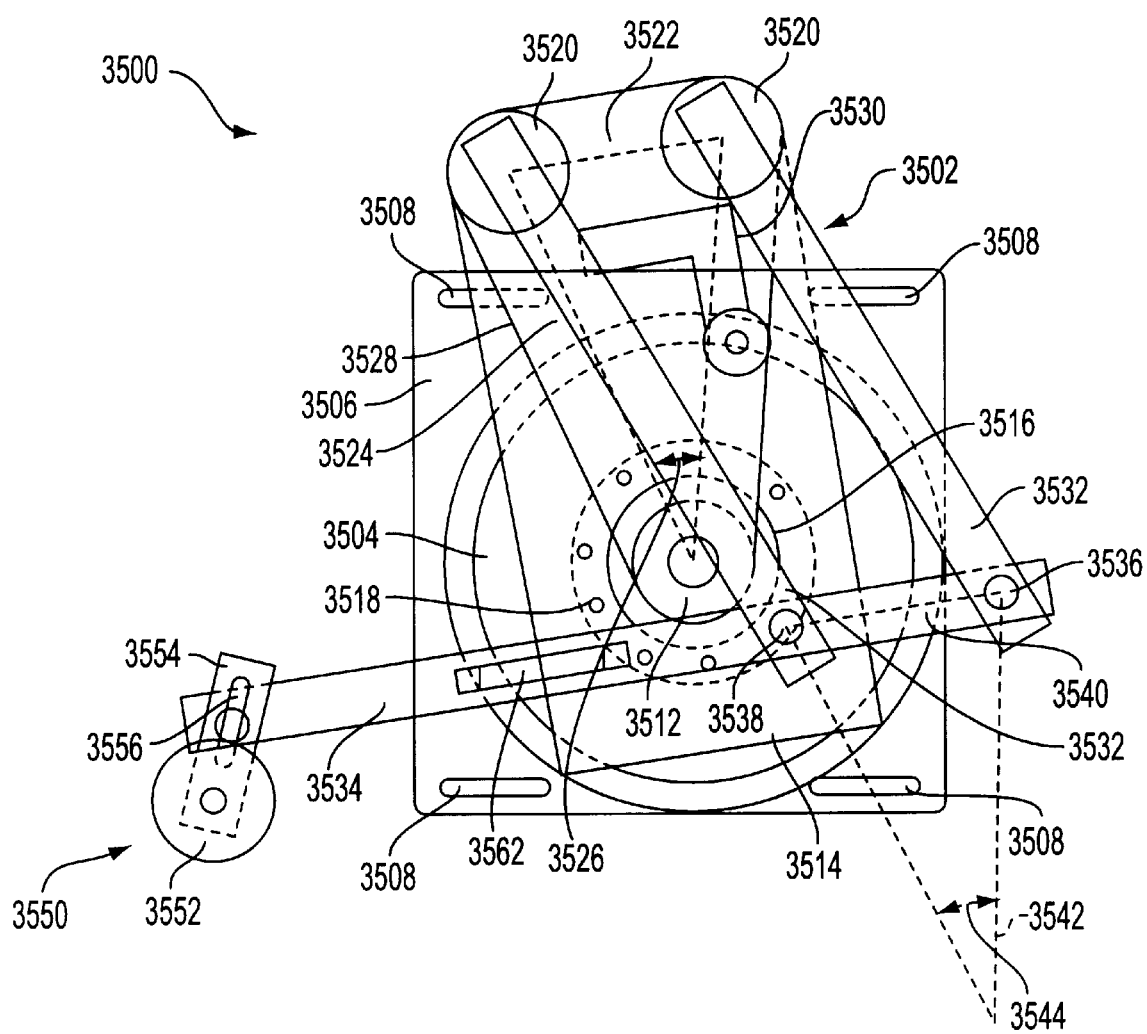
FIG. 46 is a top plan view of an inside door actuator having 180 degree rotation in accordance with the present invention.

As shown in FIG. 46, a driver base plate 3506 is provided. The driver base plate defines 3506 a plurality of holes through the plate 3506 providing points of attachment for a driver 3504 to the base plate 3506. The plurality of holes is, of course, arranged to align with mounting points on the driver 3504 selected for this actuator 3500. The driver base plate 3506 also defines a plurality of slots 3508 through the plate 3506 in each of the corners of the plate 3506. The plurality of slots 3508 provides the points of attachment of the driver base plate 3506 to an inside base frame 900. Specifically, mechanical fasteners pass through the slots 3508 and attach to the inside base frame 900 fixing the driver base plate 3506 to the inside base frame 900 when secured. The slots 3508 also allow lateral positioning of the driver base plate 3506 relative to the inside base frame 900.

The actuator driver 3504 is fixed to the driver base plate 3506 by conventional means. Preferably, the driver 3504 is a reversible electric rotary motor. One skilled in the art will recognized readily that other drivers could be incorporated herein. However, rotary motors generally provide the greatest effective degree of rotation. Moreover, electric rotary motors are most suitably adapted for control of the door actuator 3500. Simulation of human closure of vehicle doors requires that the door actuators follow a velocity profile indicative of human door closure. Electric actuators are best suited for such control. Hydraulic and pneumatic actuators are less responsive and are subject to varied outputs as temperature varies.

A sprocket and shaft assembly 3510 is fixed to the center of the electric rotary motor 3504 and aligns coaxially with the rotational axis of the motor. The sprocket and shaft assembly 3510 extends from the center of the motor 3504 such that the plane of the sprocket 3512 is parallel with the plane of the driver base plate 3506. The sprocket 3512, however, is fixed and does not rotate under the influence of the motor 3504.

Figure 47:
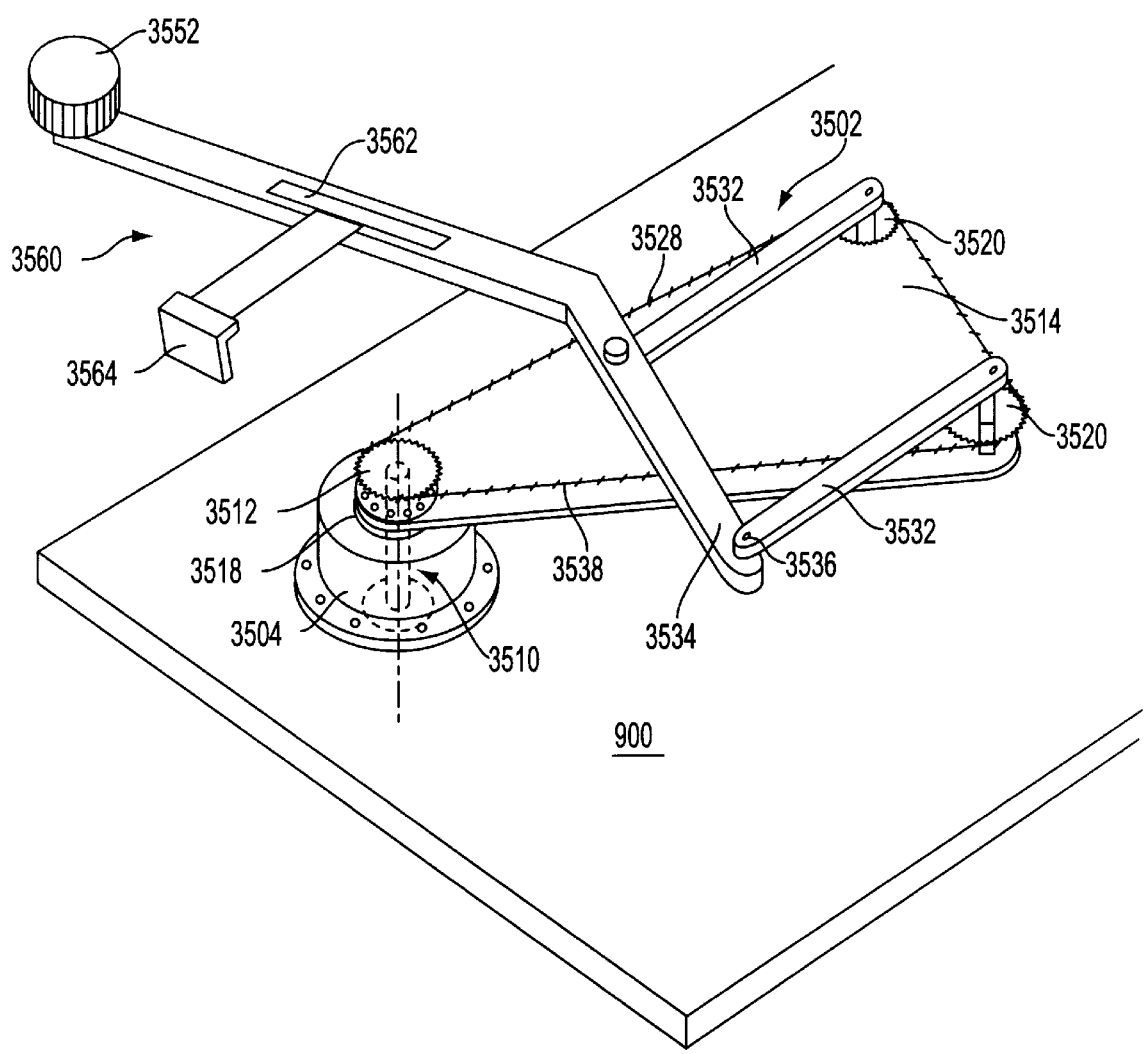
FIG. 47 is a perspective view of the actuator of FIG. 46.

As best viewed in FIGS. 46 and 47, the linkage assembly 3502 comprises a rotating plate 3514 adapted to be connected to the electric rotary motor 3504. At one end of the rotating plate 3514, a centrally located hole 3516 is defined through which the sprocket 3512, rotationally fixed relative to the axis of the electric motor 3504, passes. A plurality of holes 3518 is defined around the periphery of the hole 3516 and provides points of attachment of the rotating plate 3514 to the electric motor 3504. The position of the holes 3518 is, of course, defined by the requirements of the driver selected for this actuator.

At the other end of the rotating plate 3514, a pair of freely rotating sprockets 3520 is provided. Each of the sprockets 3520 is attached to the rotating base plate 3514 by conventional means such that each sprocket 3520 is coplanar with each other and both are coplanar with the sprocket 3512 disposed coaxially with the motor axis. As configured, each sprocket 3520, 3512 defines a point of an isosceles triangle 3524; the centers of the freely rotating sprockets 3520 define the base 3522 of the isosceles triangle 3524, and the center of the fixed sprocket 3512 is positioned at the apex angle 3526 of the isosceles triangle 3524 opposite the base 3522.

A chain 3528 is disposed around the sprockets 3520, 3512 and substantially outlines the isosceles triangle 3524. Preferably, a chain tensioner 3530 is disposed in engaging relationship with the chain 3528 and keeps the chain 3528 under proper tension. As configured, the rotating plate 3514 rotates in response to the rotation of the electric rotary motor 3504. Since the fixed sprocket 3512 is fixed and unable to rotate, the chain 3528 remains fixed as well. The pair of freely rotating sprockets 3520 rotates in an orbit about the center of the motor 3504. Because the freely rotating sprockets 3520 are free to rotate about their respective axes, however, the freely rotating sprockets 3520 roll along the fixed chain 3528. Thus, the freely rotating sprockets 3520 both orbit about the motor center and rotate about their respective axes.

As one skilled in the art will recognize readily, the chain 3528 and tensioner 3530 could be replaced with a bar linkage. In that regard, any assembly that provides both the overall orbital rotation of the freely rotating sprockets 3520 (i.e., the base of the isosceles triangle) and the local rotation of the sprockets 3520 can be incorporated in this actuator.

A parallel linkage member 3532 is fixed to each of the freely rotating sprockets 3520 such that the pair of parallel linkage members 3532 extends in parallel relationship from each of the freely rotating sprockets 3520. As configured, each of the parallel linkage members 3532 rotates about the center of its respective sprocket 3520 as the sprockets 3520 roll along the fixed chain 3528 as the rotating plate 3514 rotates. Additionally, the parallel linkage members 3532 rotate about the center of the motor 3504 as the sprockets 3520 orbit about the motor center. A door-engaging linkage member 3534 is fixed to the ends of the parallel linkage members 3532 opposite the freely rotating sprockets 3520. More particularly, such ends of the parallel linkage members 3532 are mounted pivotally to the door engaging linkage member 3534. A roller bearing 3536 suitable for the expected loads and frequency of cycling is fixed to one end of the engaging linkage member 3534. A second roller bearing 3538 is fixed to the engaging linkage member 3534 spaced laterally from the first roller bearing 3536 such that the distance between the roller bearings 3536, 3538 equals the distance between the freely rotating sprockets 3520. The ends of the parallel linkage members 3532 are rotatably mounted to the roller bearings 3536, 3538 such that the parallel linkage members 3532 remain parallel in all positions of rotation. The parallel linkage members 3532 are mounted to the roller bearings 3536, 3538 by conventional means.

Preferably, the parallel linkage members 3532 are not coplanar. One of the parallel linkage members 3532 is mounted above the door engaging linkage member 3534, while the other is mounted below the engaging linkage member 3534. Such a configuration allows the maximum rotation of the linkage assembly 3502.

As all of the door actuation modules are configured, the 180-degree inside door actuator 3500 must be mounted in proper relationship to the axis of rotation of the door under test. Specifically, the roller bearings 3536, 3538 of the door engaging linkage member 3534 define a base 3540 of a second isosceles triangle 3542. The second isosceles triangle 3542 is identical in size and shape with the first isosceles triangle 3524. Thus, the second isosceles triangle 3542 includes an apex angle 3544 of an identical size but laterally spaced from the first apex angle 3526. The point of the second isosceles triangle 3542 defining the apex angle 3544 must be coaxial with the axis of rotation of the door under test. Moreover, the plane containing the isosceles triangles 3524, 3542 must be perpendicular to the axis of rotation of the door under test. The isosceles triangles 3524, 3542 can be positioned perpendicularly to the axis of door rotation by shims (not shown) disposed between the motor base plate 3506 and the inside base frame 900.

As configured, the second isosceles triangle 3542 rotates about the axis of door rotation such that each point on the base 3540 (i.e., the section of the door engaging linkage member between the roller bearings) traces out an arc. Similarly, the base 3522 of the first isosceles triangle 3524 (i.e., the space between the freely rotating sprockets) traces out an identical, though laterally displaced, arc as the motor rotates. In other words, the base 3522 of the first isosceles triangle 3524 rotates about the motor 3504 in an arc identical but displaced to the arc of rotation of the base 3540 of the second isosceles triangle 3542. Thus, once the actuator 3500 is aligned properly with the door axis of rotation, all points on the door-engaging linkage member 3534 rotate coaxially with the door under test. Consequently, any contact between the door-engaging linkage member and the door under test does not shift as the door is rotated. This configuration allows the door actuator 3500 to engage a door under test at a single location on the door for all points of door rotation and prevents relative motion between the door under test and the door-engaging linkage member 3534.

As shown in FIG. 46, the door-engaging linkage member 3534 extends laterally from the roller bearings 3536, 3538. This additional length provides suitable points for attaching door interface assemblies. As one skilled in the art will recognize readily, the 180-degree inside door actuator 3500 can be adapted to open or close vertically hinged doors from an inside position. A door opening assembly 3550 comprises a roller 3552 mounted rotatably to one end of an arm 3554. Any roller that can engage a door without imparting damage thereto may be incorporated. A four inch roller is preferred for this application. The other end of the arm 3554 defines a slot 3556 through which a mechanical fastener passes and fixes the roller arm 3554 to the door-engaging linkage member 3534. The slot 3556 provides both linear and rotational positioning of the roller 3552 relative to the door-engaging linkage member 3534. As the door-engaging linkage member 3534 rotates, the roller 3552 engages the door under test and pushes it open.

Several door closing assemblies are provided. As shown in FIG. 47, a first door closing device 3560 comprises a strap and hook assembly that hooks onto a door handle of the door under test. One end of the strap is fixed to the door-engaging linkage member 3534 by a clamp plate 3562. The strap is disposed between the clamp 3562 and the door-engaging linkage member 3534 and is fixed thereto by clamping the plate 3562 secured by mechanical fasteners. The other end of the strap is connected to a hook 3564 suitable for grabbing a door handle. As the door-engaging linkage member 3534 rotates in a closing direction, the strap and hook assembly pulls the door under test closed.

Figure 48:
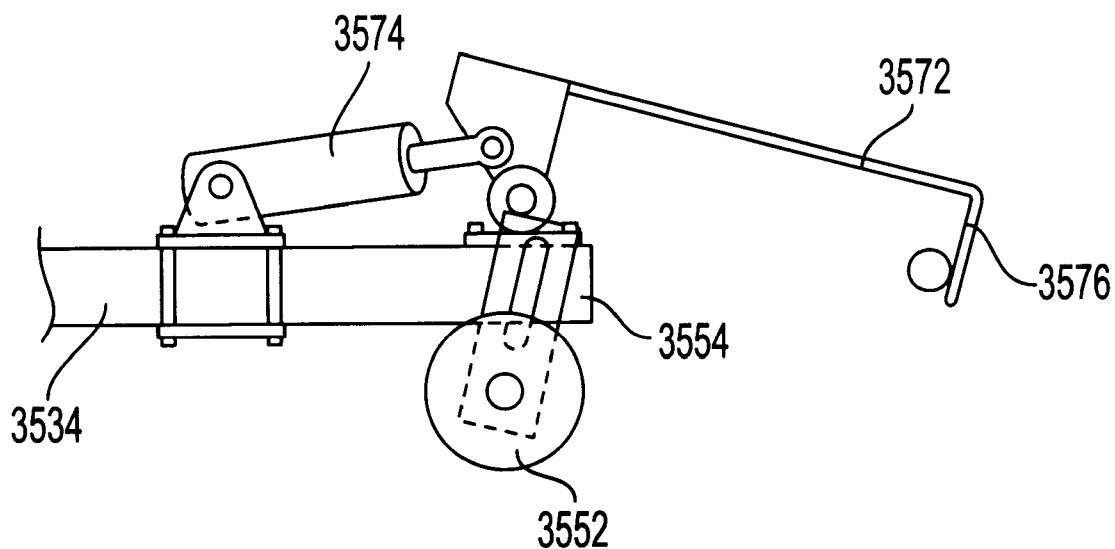
FIG. 48 is a closing interface assembly of the actuator of FIG. 46.

As shown in FIG. 48, a second door closing device 3570 is provided for doors lacking convenient places for attaching the hook 3564. The second door closing device 3570 comprises a pivotally mounted arm 3572 disposed on the door-engaging linkage member 3534. The pivotally mounted arm 3572 is attached to the linkage member 3534 by conventional means. An air cylinder 3574 having an extensible piston also mounted to the door engaging linkage member 3534 by conventional means is operatively connected to the pivotally mounted arm 3572. As the piston of the air cylinder 3574 is extended or retracted, the pivotally mounted arm 3572 rotates into or out of engagement with the door under test. Specifically, as the piston of the air cylinder 3574 is extended, an L-shaped portion 3576 of the arm 3572 rotates into position behind the edge of the door under test. When the door-engaging linkage member 3534 rotates in a closing direction, the L-shaped portion 3576 of the arm 3572 pulls the door to closure. Once the door is fully closed, the piston of the air cylinder 3574 retracts and thereby rotates the arm 3572 out of engagement with the door under test.

Thus, a complete cycle of the 180-degree inside door actuator 3500 can be described as follows. Assuming the door under test is initially in a fully closed position, the door under test is first unlatched (any mechanism that can unlatch the door, including those described below, may be incorporated). Once the system receives confirmation that the door is unlatched, the motor 3504 begins rotating in an opening direction (depending upon the relative position of the actuator 3500 to the door under test, the direction of rotation may be counterclockwise or clockwise). As stated above, the fixed sprocket 3512 and chain 3528 remain fixed and do not rotate. By comparison, however, the electric motor 3504 rotates the rotating plate 3514 in an opening direction. Such rotation causes the freely rotating sprockets 3520 to roll along the fixed chain 3528 as described above. By virtue of their connection the freely rotating sprockets 3520, the parallel linkage members 3532 rotate about the axes of their associated sprocket. Additionally, since the plate 3514 to which the parallel members 3532 are connected orbits about the motor axis, the parallel members 3532 also rotate about the motor axis. Thus, with this configuration, the two isosceles triangles 3524, 3542 formed by the linkage assembly 3502 rotate in parallel but displaced arcs. As described above, this configuration causes the door-engaging rotation that is coaxial with the door's rotation. The roller 3552 of the door-engaging linkage assembly 3534 contacts the door under test at a single point and pushes the door in an opening direction as the rotating plate 3514 is rotated in an opening direction.

Thereafter, one of the door closing assemblies engages the door under test as described above. The electric motor 3504 reverses and begins rotating in a closing direction and the door under test is pulled closed.

Horizontally Hinged Actuators
Assisted Hood Actuator

Figure 49:
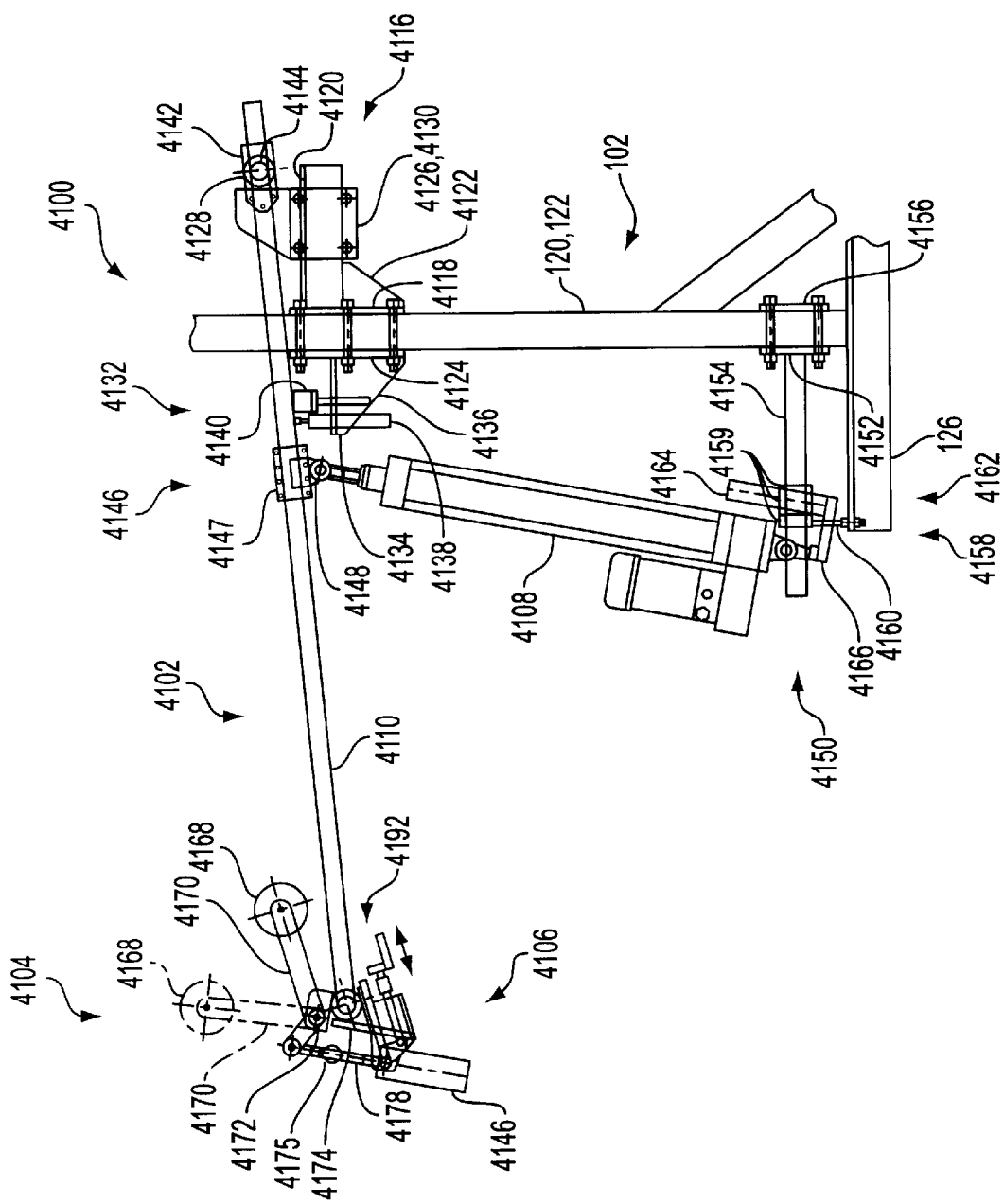
FIG. 49 is an assisted hood actuator of the present invention.
Figure 50:
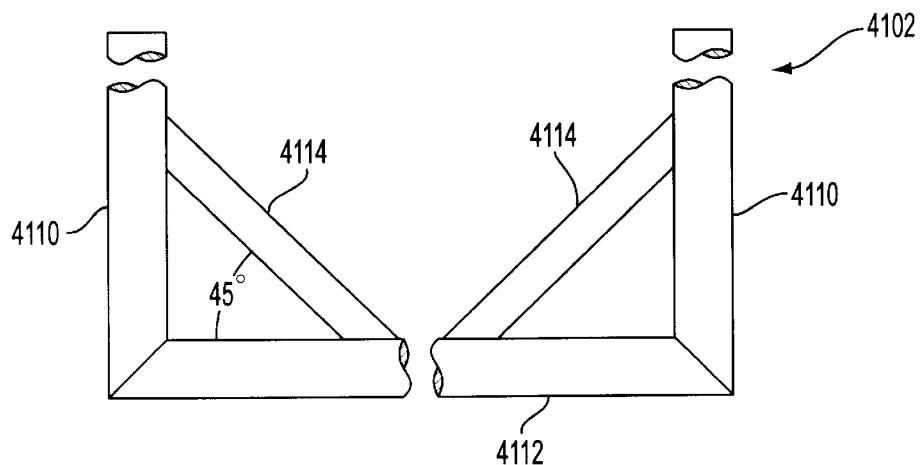
FIG. 50 is a C-shaped lift arm of the actuator of FIG. 49.

As shown in FIG. 49, an assisted hood actuator 4100 is provided for cycling assisted hoods of vehicles under test that are biased or supported in an open position by springs or cylinders. The assisted hood actuator 4100 comprises generally a C-shaped lift arm 4102, a slam mechanism 4104 for closing the hood, a lift hand assembly 4106 for lifting the hood, various supports and brackets, a driver 4108 operatively engaged to the lift arm 4102, and dampers and bumpers. More particularly, the assisted hood lift arm 4102 comprises two parallel members 4110, preferably constructed from stainless steel tubing, fixed, preferably by welding, to opposed ends of an intermediate member 4112, also preferably constructed from stainless steel tubing, constructed and arranged in a square C-shape. (See FIG. 50 for a more detailed view.) Preferably, a stiffener member 4114 is disposed, preferably at 45°, in each of the corners of the C-shaped hood lift arm 4102. The hood lift arm 4102 is constructed to be wider than the width of a vehicle under test.

The hood lift arm 4102 is mounted pivotally to a small 100, medium 300, or large 500 main frame for rotation about a horizontal axis such that the parallel members 4110 of the lift arm 4102 extend outwardly from the main frame 100, 300, 500. The following detailed description refers particularly to the small mainframe 100, although it could have equally referred to the medium 300 or large 500 mainframes. In addition, this detailed description focuses primarily on the embodiment in which the assisted hood actuator 4100 is mounted to the front of the mainframe 100 although another embodiment comprises the assisted hood actuator 4100 mounted to the rear of the mainframe 100.

Specifically, a bearing plate mount 4116 comprising a first plate 4118 having a plurality of holes therethrough arranged along each lateral side of the plate 4118 is provided for each side of the main frame 100. A rectangular steel tube 4120 is fixed, preferably by welding, to one surface of the first plate 4118 and extends perpendicularly therefrom. A stiffener member 4122 is attached, preferably by welding between the rectangular steel tube 4120 and the first plate 4118. A second plate 4124 also having holes arranged in an identical pattern to the first plate 4118 is also provided. The bearing plate mount 4116 is positioned in abutting relation to each vertical member 120, 122 of a main frame 100 and is fixed thereto by mechanical fasteners which pass through the holes of the first 4118 and second 4124 plates. The bearing plate mounts 4116 are fixed to the main frame such that the rectangular steel tubes 4120 extend rearwardly.

Similarly, a bearing mount plate 4126 is provided for each bearing plate mount 4116 and is adapted to be attached to the rectangular steel tube 4120 of the bearing plate mount 4116. Specifically, the bearing mount plate 4126 defines two sets of holes. The first set is arranged in a square configuration spaced sufficiently apart to be wider than the width of the rectangular steel tube 4120 of the bearing plate mount 4116. The second set of holes is positioned laterally from the first set of holes and are configured to align with a conventional bearing assembly 4128. A second plate 4130 also having a set of holes positioned identically as the first set of holes of the bearing mount plate 4126 is also provided. A bearing mount plate 4126 is fixed to each of the rectangular steel tubes 4120 of the bearing plate mounts 4116 such that the second set of holes are disposed above the rectangular steel tube 4120 and is clamped in place by mechanical fasteners passing through the holes of the first 4126 and second 4130 plates. A bearing assembly 4128 suitable for the expected loads and frequency of cycling is fixed to each bearing mount plate 4126 at the second set of holes. A suitable bearing 4128 is the SEALMASTER Number FB-16T or equivalent. The bearing plate mount 4116, bearing mount plate 4126 and bearing assembly 4128 are positioned on both vertical members 154, 156, or 120, 122 of either the rearward 104 or forward 102 frame such that the bearings 4128 are coaxial with the axis of rotation of the hood under test.

Figure 51:
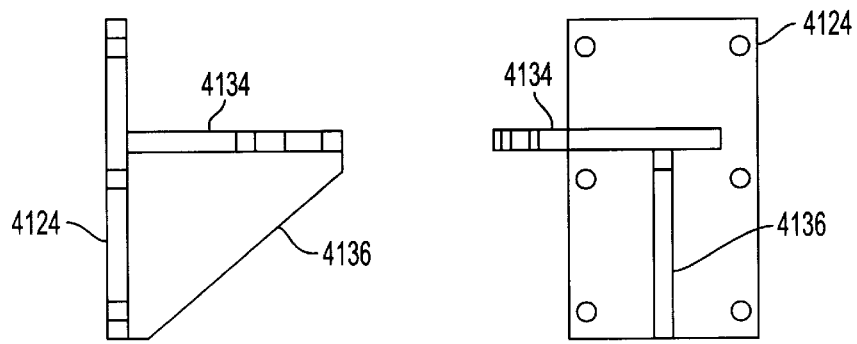
FIG. 51 is a mount plate of the actuator of FIG. 49.

A check mount assembly 4132 comprising a plate 4124 having a plurality of holes aligned along the lateral edges of the plate 4124 is attached co each side 120, 122 of the main frame 100. Preferably, the holes of the plate 4124 are positioned identically to the mounting holes of the bearing plate mount 4118, and, thus, the plate is suitable for cooperation with the bearing plate mount 4116 to clamp both members to the vertical member 120, 122 of the main frame 100. As is best viewed in FIG. 51, a second plate 4134 is fixed, preferably by welding, perpendicularly to the first plate 4124 and extends horizontally therefrom. Preferably, a stiffener member 4136 is disposed between the first plate 4124 and the second plate 4134. The second plate 4134 defines a pair of holes for mounting a damper 4138 and bumper 4140, as explained in more detail below. As configured, the second plate 4134 of the check mount assembly 4132 is substantially parallel with the steel tube member 4120 of the bearing plate mount 4116 but extends in an opposite direction.

As discussed above, the hood lift arm 4102 is configured to pivot horizontally between the vertical members 154, 156 or 120, 122 of either the rearward 104 or forward 102 frame. A cylindrical bracket 4142 and pin 4144 assembly is provided. The assembly comprises a cylindrical bracket 4142, similarly constructed and arranged as previously described brackets, and a pin 4144 fixed to the bracket 4142. Specifically, the cylindrical bracket 4142 has a bore adapted to clamp to the parallel members 4110 of the hood lift arm 4102. A bearing pin 4144 is fixed, preferably by welding, to the lateral surface of the cylindrical bracket 4142 such that the axis of the bore of the bracket 4142 is perpendicular to the axis of the bearing pin 4144. A bracket and pin assembly is attached to each parallel member 4110 of the hood lift arm 4102 such that the pins 4144 are coaxial but extend outwardly. The pins 4144 are inserted into the bearings 4128.

An upper cylinder mount 4146 is fixed to each parallel member 4110 of the hood lift arm 4102 forward of the bearing assemblies 4128. Specifically, the upper cylinder mount 4146 comprises a cylindrical bracket 4147, as previously described with other modules, and a mounting plate 4148 fixed, preferably by welding, thereto. The mounting plate 4148 defines a hole in the plate. The upper cylinder mount assembly 4146 is fixed to the hood lift arm 4102 such that the mount plate 4148 extends downwardly and the axis of the hole is positioned perpendicularly to the parallel members 4110 of the hood lift arm 4102.

The assisted hood lift actuator 4100 further comprises a lower cylinder mount assembly 4150. Specifically, the assembly comprises a plate 4152 having a plurality of holes, preferably arranged in a square configuration, adapted for mounting on a vertical member 154, 156 or 120, 122 of either the rearward 104 or forward 102 frame. The holes of the plate 4152 are spaced wider than the width of the vertical member 120, 122 of the frame 102. A steel tube 4154 is fixed, preferably by welding, to the plate 4152 and extends perpendicularly therefrom. Preferably, the steel tube 4154 is constructed from stainless steel. A second plate 4156 having a set of holes arranged identically to the first plate 4152 is also provided. The tube and plate assembly 4150 is fixed to a vertical member 154, 156 or 120, 122 of either the rearward 104 or forward 102 frame by mechanical fasteners passing through aligned holes of the first 4152 and second 4156 plate. The plate and tube assembly 4150 is fixed to the frame such that the tube 4154 extends outwardly from the main frame 100. A lower tube support 4158 comprising a cylindrical bracket 4149, as described above, is configured to clamp to the steel tube 4154 of the tube and plate assembly 4150. A threaded rod 4160 is fixed, preferably by welding, to a side of the cylindrical bracket 4149 such that the threaded rod 4160 extends perpendicularly to the bore of the cylindrical bracket 4149. The threaded rod 4160 is attached to the horizontal member of the T-shaped support assembly 126 and extends vertically therefrom such that the bore of the cylindrical bracket 4149 is coaxial with the tube 4154. The cylindrical bracket 4149 is clamped to the tube 4154 thereby providing a second support for the tube 4154.

The lower cylinder support 4158 further comprises a pair of cylindrical brackets 4149 welded together such that the bores of the brackets 4149 are spaced angularly approximately 80°. (See FIG. 49.) One of the brackets 4149 of the pair is clamped to the tube 4154 of the tube and plate assembly 4150 such that the axis of the second bracket 4149 inclines toward the main frame 100. Finally, a lower cylinder mount 4162, adapted to be clamped within the cylindrical bracket 4149 and preferably constructed from steel tube 4164, is clamped within the second cylindrical bracket 4149 of the pair of cylindrical brackets 4149. Specifically, the lower cylinder mount 4162 comprises a plate 4166 having a hole therethrough for mounting the other end of the driver 4108. A steel tube 4164, preferably constructed from stainless steel, is fixed, preferably by welding, to the plate 4166 and is spaced laterally from the hole. As configured, the tube 4164 of the lower cylinder mount 4162 is clamped in the second cylindrical bracket 4149 of the pair of brackets 4149 such that the plate 4166 of the lower cylinder mount 4162 is positioned below the horizontal tube 4154 of the tube and plate assembly 4150.

The slam mechanism 4104 for closing the hood is disposed on the intermediate segment 4112 of the hood lift arm 4102 and is adapted to close the hood when the hood lift arm 4102 is rotated in a closing direction. The lift hand assembly 4106 is also disposed on the intermediate member 4112 of the hood lift arm 4102 and is adapted to lift the hood when the hood lift arm 4102 is rotated in an opening direction. More particularly, as shown in FIG. 49, the slam mechanism 4104 comprises a roller 4168 rotatably mounted at an end of one arm of a bell crank 4170. Any pliable roller 4168 suitable for contacting a hood of a vehicle under test without imparting damage to the hood may be used. A FAIRLANE # DR-754-20 or equivalent is suitable for this application. The bell crank 4170 having two arms angularly spaced is pivotally mounted to a bearing assembly 4172 at a point of intersection between the two arms of the bell crank 4170. A suitable bearing assembly 4172 is a TORRINGTON # KP-6 or equivalent. A cylindrical bracket 4173, as described above, is fixed to the bearing assembly 4172 such that the axis of the bore of the bracket 4173 is parallel to the axis of rotation of the bell crank 4170. An air cylinder mounting plate 4174 is fixed to the cylindrical bracket 4173. A driver 4176 having an extensible piston or screw 4178, preferably an air cylinder, is mounted to the mounting plate 4174 such that the extensible piston 4178 is substantially parallel with the mounting plate 4174 and extended towards the second arm of the bell crank 4170. The piston 4178 of the air cylinder 4176 is pivotally mounted to the end of the second arm of the bell crank 4170.

The slam mechanism 4104 is mounted to the hood lift arm 4102 such that upon activation of the air cylinder 4176 the bell crank 4170 is rotated towards the hood and the roller 4168 engages a top surface of the hood.

Figures 52A, 52B:
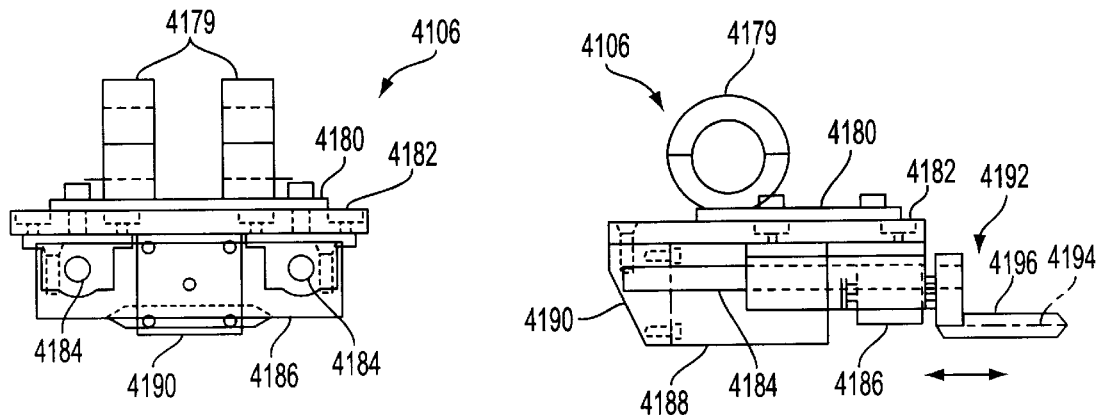
FIG. 52 is a lift hand of the actuator of FIG. 49.
Figure 53:
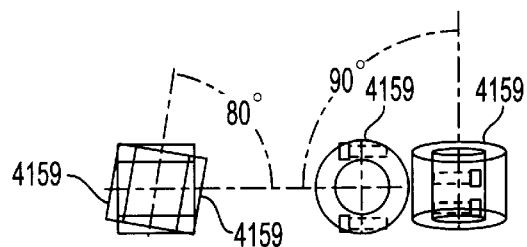
FIG. 53 is a cylindrical bracket of the actuator of FIG. 49.

The lift hand assembly 4106, which is best viewed in FIG. 52, comprises a pair of cylindrical brackets 4179, as described above, aligned coaxially and fixed, preferably by welding, to a mount plate 4180. The mount plate 4180 is fixed to a support plate 4182. A pair of linear bearings having shafts 4184 slidably mounted therein are disposed on the support plate 4182 such that the shafts 4184 are positioned parallel and spaced laterally from each other. A conventional coupler 4186 is mounted to the shafts 4184 such that the coupler 4186 is movable fore and aft as the shafts 4184 slide within the linear bearing. A driver 4188 having an extensible piston, preferably an air cylinder, is mounted parallel and between the shafts 4184 of the linear bearings such that the piston of the cylinder 4188 extends parallel in the same direction as the shafts 4184. The cylinder 4188 is mounted to a cylinder mount 4190 fixed to the support plate 4182. The end of the extensible piston is fixed to the coupler 4186. A lift hand 4192 having a substantially L-shaped configuration providing a substantially horizontal surface 4194 parallel with the mount 4180 and support 4182 plates is mounted to the opposite side of the coupler 4186. A bumper 4196 is fixed to the surface of the lift plate 4194. Upon activation of the cylinder 4188, the lift plate 4194 extends or retracts as required. A suitable cylinder 4188 is provided by SMC # NCQ2B40-50. The lift hand assembly 4106 is fixed to the lift hood arm 4102 such that the lift plate 4194 can extend towards and engage the hood under test.

A bumper 4140 is fixed to the check mount 4132 and extends vertically and upwardly to engage the hood lift arm 4102 in a fully closed position. A suitable bumper 4140 is a McMASTER-CARR # 9732K15 or equivalent. A damper 4138 is mounted to the check mount 4132 and extends vertically and upwardly to engage the hood lift arm 4102 in a fully closed position. A suitable damper 4138 is the ENIDINE 1.0B-03 or equivalent. Preferably, an electric cylinder 4108 having an extensible piston is mounted pivotally to the upper cylinder mount 4146 at the end of the piston and is mounted pivotally at the opposed end of the cylinder 4108 to the lower cylinder mount 4162. A suitable cylinder 4108 is the # TH4104B-18-MP2-MT1 or equivalent.

An electric cylinder 4108 is preferred over other drivers to properly simulate human closure of hoods. This configuration is particularly necessary when the vehicle under test is cycled at extreme temperatures. While air cylinders may be used, they are subject to varied outputs as the ambient temperature changes. To ensure proper simulation of the velocity profile of a hood being closed by a human, an electric actuator—significantly less affected by temperature extremes—is preferred.

Additionally, while the control system should slow the hood lift arm 4102 down before the electric cylinder 4108 bottoms, the bumper 4140 and damper 4138 provides additional protection to the actuator 4100. Thus, the bumper 4140 and damper 4138 should be positioned relative to the hood lift arm 4102 such that the hood lift arm 4102 engages the bumper 4140 after a stroke of the actuator sufficient to rotate the arm 4102 to close the hood has been applied but before the electric actuator 4108 bottoms. Moreover, given that the assisted hood actuator 4100 can be used to slam the hood, the damper 4138 provides a device to dissipate the energy of the moving hood lift arm 4102.

The assisted hood lift actuators 4100 are provided preferably in two sizes. A small hood lift actuator is adapted for use with hoods of compact vehicles. A large assisted hood actuator is adapted for use with larger vehicles. Both hood lift actuators are constructed and arranged identically except that the relative dimensions are increased for the larger actuator and the driver 4108 is sized for the larger loads expected from larger vehicle hoods.

The assisted hood actuator 4100 is operated as follows. A hood of a vehicle under test is unlatched prior to activation of the actuator 4100. Initially, the lift plate 4194 of the lift hand assembly 4106 is extended towards the released hood such that it engages an edge of the hood. The cylinder 4188 extends the lift plate 4194. Once the lift plate has engaged the hood, the cylinder 4108 is activated to rotate the arm 4110 in an opening direction. Once the hood has reached a full-open position, further extension of the piston of the cylinder 4108 is stopped.

Thereafter, the roller 4168 is rotated into engagement with the hood as the piston 4178 of the cylinder 4178 is extended. Specifically, as the piston 4178 extends, the crank 4170 is rotated until the roller 4168 engages the hood under test. Next, the lift plate 4194 is retracted out of engagement with the hood. Once positioned, the cylinder 4108 retracts its piston to rotate the arm 4110 in a closing direction. The cylinder piston is retracted at a rate that will simulate human door closure. By virtue of the roller's 4168 contact with the door under test, the rotation of the arm 4110 will close the hood. Over-rotation of the arm is prevented by proper control of the cylinder 4108. Additionally, the bumper 4140 prevents over-rotation. The damper 4138 dampens any shock loading associated with any impact by the arm 4110 against the bumper 4140.

Free-Fall Hood Actuator

Figure 54:
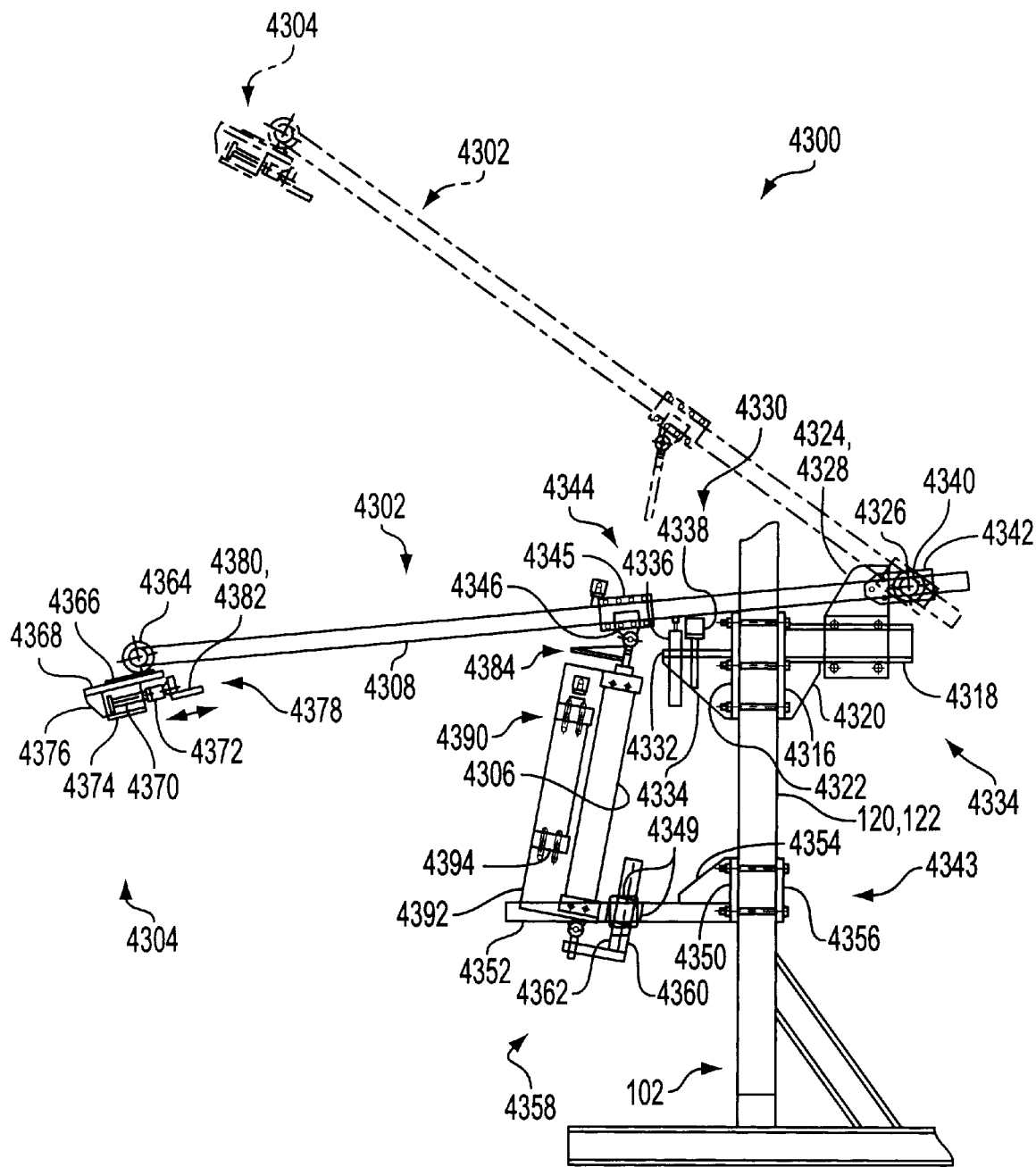
FIG. 54 is a free-fall hood actuator of the present invention.
Figure 55:
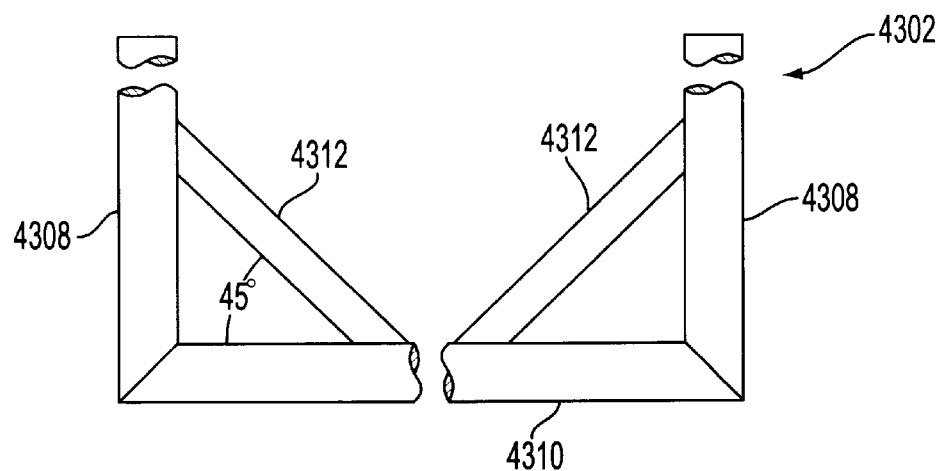
FIG. 55 is a C-shaped lift arm of the actuator of FIG. 54.

As shown in FIG. 54, a free-fall hood actuator 4300 is provided for cycling free-fall hoods of vehicles under test that remain in an open position only when supported by prop rods. The free-fall hood actuator 4300 comprises generally a C-shaped lift arm 4302, a lift hand assembly 4304 for lifting and releasing the hood, various supports and brackets, a driver 4306 operatively engaged to the lift arm 4302, and dampers and bumpers. More particularly, the free-fall hood lift arm 4302 comprises two parallel members 4308, preferably constructed from stainless steel tubing, fixed, preferably by welding, to opposed ends of an intermediate member 4310, also preferably constructed from stainless steel tubing, constructed and arranged in a square C-shape. (See FIG. 55.) Preferably, a stiffener member 4312 is disposed, preferably at 45°, in each of the corners of the C-shaped hood lift arm 4302. The hood lift arm 4302 is constructed to be wider than the width of a vehicle under test.

The hood lift arm 4302 is mounted pivotally to a small 100, medium 300, or large 500 main frame for rotation about a horizontal axis such that the parallel members 4308 of the lift arm 4302 extend outwardly from the main frame 100, 300, 500. The following detailed description refers particularly to the small mainframe 100, although it could have equally referred to the medium 300 or large 500 mainframes. In addition, this detailed description focuses primarily on the embodiment in which the free-fall hood actuator 4300 is mounted to the front of the mainframe 100 although another embodiment comprises the free-fall hood actuator 4300 mounted to the rear of the mainframe 100.

Specifically, a bearing plate mount 4314 comprising a first plate 4316 having a plurality of holes therethrough arranged along each lateral side of the plate 4316 is provided for each side 120, 122 of the main frame 100. The rectangular steel tube 4318 is fixed, preferably by welding, to one surface of the first plate 4316 and extends perpendicularly therefrom. A stiffener member 4320 is attached, preferably by welding, between the rectangular steel tube 4318 and the first plate 4316. A second plate 4322 also having holes arranged in an identical pattern to the first plate 4316 is also provided. The bearing plate mount 4314 is positioned in abutting relation to each vertical member 120, 122 of a main frame 100 and is fixed thereto by mechanical fasteners which pass through the holes of the first plate 4316 and second plate 4322. The bearing plate mounts 4314 are fixed to the main frame 100 such that the rectangular steel tubes 4318 extend rearwardly from the forward frame member.

Similarly, a bearing mount plate 4324 is provided for each bearing plate mount 4314 and is adapted to be attached to the rectangular steel tube 4318 of the bearing plate mount 4314. Specifically, the bearing mount plate 4324 defines two sets of holes. The first set is arranged in a square configuration spaced sufficiently apart to be wider than the width of the rectangular steel tube 4318 of the bearing plate mount 4314. The second set of holes is positioned laterally from the first set of holes and are configured to align with a conventional bearing assembly 4326. A second plate 4328 also having a set of holes positioned identically as the first set of holes of the bearing mount plate 4324 is also provided and is positioned on the opposed surfaces of the tube 4318 such that all holes align. A bearing mount plate 4324 is fixed to each of the rectangular steel tubes 4318 of the bearing plate mounts 4314 such that the second set of holes are disposed laterally from the rectangular steel tube 4318 and is clamped in place by mechanical fasteners passing through the holes of the first plate 4324 and second plate 4328. A bearing assembly 4326 suitable for the expected loads and frequency of cycling is fixed to each bearing mount plate 4324 at the second set of holes. Each of the parallel members 4308 is mounted pivotally to the bearing assemblies 4326. A suitable bearing 4326 is the MB # MFB-25K-1 or equivalent. A bearing plate mount 4314, bearing mount plate 4324 and bearing assembly 4326 is positioned on both vertical members 154, 156, or 120, 122 of either the rearward 104 or forward 102 frame such that the bearings 4126 are coaxial with the axis of rotation of the hood under test.

A check mount assembly 4330 comprising the plate 4322 having a plurality of holes aligned along the lateral edges of the plate 4322 is attached to each side of the main frame 100. Preferably, the holes of the plate 4322 are positioned identically to the mounting holes of the bearing plate mount 4314, and, thus, the plate 4322 is suitable for cooperation with the bearing plate mount 4314 to clamp both members to the vertical member 120, 122 of the main frame 100. A second plate 4332 is fixed, preferably by welding, perpendicularly to the first plate 4322 and extends horizontally therefrom. Preferably, a stiffener member 4334 is disposed between the first plate 4322 and the second plate 4332. The second plate 4332 defines a pair of holes for mounting a damper 4336 and a bumper 4338, as explained in more detail below. As configured, the second plate 4332 of the check mount assembly 4330 is substantially parallel with the steel tube member 4318 of the bearing plate mount 4314 but extends in an opposite direction.

As discussed above, the hood lift arm 4302 is configured to pivot horizontally between the vertical members of either the rearward frame 104 or forward frame 102. A cylindrical bracket 4340 and pin 4342 assembly is provided. The assembly comprises a cylindrical bracket 4340, similarly constructed and arranged as previously described cylindrical brackets, and a pin 4342 fixed to the bracket 4340. Specifically, the cylindrical bracket 4340 has a bore adapted to clamp to the parallel members 4308 of the hood lift arm 4302. A bearing pin 4342 is fixed, preferably by welding, to the lateral surface of the cylindrical bracket 4340 such that the axis of the bore of the bracket 4340 is perpendicular to the axis of the bearing pin 4342. A bracket and pin assembly is attached to each parallel member 4308 of the hood lift arm 4302 such that the pins 4342 are coaxial but extend outwardly. The pins 4342 are inserted into the bearings 4326.

An upper cylinder mount 4344 is fixed to each parallel member 4308 of the hood lift arm 4302 forward of the bearing assemblies 4326. Specifically, the upper cylinder mount 4344 comprises a cylindrical bracket 4345, as previously described with other modules, and a mounting plate 4346 fixed, preferably by welding, thereto. The mounting plate 4346 defines a hole in the free end of the plate. The upper cylinder mount assembly 4344 is fixed to the hood lift arm 4302 such that the mount plate 4346 extends downwardly and the axis of the hole is positioned perpendicularly to the parallel members 4308 of the hood lift arm 4302.

The free-fall hood lift actuator 4300 further comprises a lower cylinder mount assembly 4348. Specifically, the assembly 4348 comprises a plate 4350 having a plurality of holes, preferably arranged in a square configuration, adapted for mounting on a vertical member of either the rearward frame 104 or forward frame 102. The holes of the plate 4350 are spaced wider than the width of the vertical member 120, 122 of the frame 102. A tube 4352 is fixed, preferably by welding, to the plate 4350 and extends perpendicularly therefrom. A stiffener member 4354 is attached, preferably by welding, between the plate 4350 and the tube 4352. Preferably, the tube 4352 is constructed from stainless steel. A second plate 4356 having a set of holes arranged identically to the first plate 4350 is also provided. The tube and plate assembly 4348 is fixed to a vertical member of either the rearward frame 104 or forward frame 102 by mechanical fasteners passing through aligned holes of the first plate 4350 and second plate 4356. The plate and tube assembly 4348 is fixed to the frame 120, 122 such that the tube 4352 extends outwardly from the main frame 100. The lower cylinder mount assembly 4348 further comprises a pair of cylindrical brackets 4349 welded together such that the bores of the brackets 4349 are spaced angularly approximately 80°. The brackets 4349 are constructed and arranged as previously described. One of the brackets 4349 of the pair is clamped to the tube 4352 of the tube and plate assembly 4348 such that the axis of the second bracket 4349 inclines toward the main frame 100. Finally, a lower cylinder mount 4358, adapted to be clamped within the cylindrical bracket 4349 and preferably constructed from steel tube, is clamped within the second cylindrical bracket 4349 of the pair of cylindrical brackets 4349. Specifically, the lower cylinder mount 4358 comprises a plate 4362 having a hole therethrough for mounting to the other end of the driver 4306. A steel tube 4360, preferably constructed from stainless steel, is fixed, preferably by welding, to the plate 4362 and is spaced laterally from the hole. As configured, the tube 4360 of the lower cylinder mount 4358 is clamped in the second cylindrical bracket 4349 of the pair of brackets 4349 such that the plate 4362 of the lower cylinder mount 4358 is positioned laterally from the horizontal tube 4352 of the tube and plate assembly 4348.

As shown in FIG. 54, a lift hand assembly 4304 is fixed to the intermediate member 4310. The lift hand assembly 4304 comprises a pair of cylindrical brackets 4364, constructed and arranged as described above, aligned coaxially and fixed, preferably by welding, to a mount plate 4366. The mount plate 4366 is fixed to a support plate 4368. A pair of linear bearings having shafts 4370 slidably mounted therein are disposed on the support plate 4368 such that the shafts 4370 are positioned parallel and spaced laterally from each other. A conventional coupler 4372 is mounted to the shafts 4370 such that the coupler 4372 is movable fore and aft as the shafts 4370 slide within the linear bearings. A driver 4374 having an extensible piston, preferably an air cylinder, is mounted parallel and between the shafts 4370 of the linear bearings such that the piston of the cylinder 4374 extends parallel in the same direction as the shafts 4370. The cylinder is mounted to a cylinder mount 4376 fixed to the support plate 4368. The end of the extensible piston is fixed to the coupler 4372. A lift hand 4378 having a substantially L-shaped configuration providing a substantially horizontal surface 4380 parallel with the mount 4366 and support 4368 plates is mounted to the opposite side of the coupler 4372. A bumper 4382 is fixed to the surface of the lift plate 4380. Upon activation of the cylinder 4374, the lift plate 4380 extends or retracts as required. A suitable cylinder 4374 is a SMC # NCQ2B40-50 or equivalent. The lift hand assembly 4304 is fixed to the lift hood arm 4302 such that the lift plate 4380 can extend towards and engage the hood under test.

A bumper 4338 is fixed to the check mount 4330 and extends vertically and upwardly to engage the hood lift arm 4302 in a fully closed position. A suitable bumper 4338 is a McMASTER-CARR # 9732K15 or equivalent. A damper 4336 is mounted to the check mount 4330 and extends vertically and upwardly to engage the hood lift arm 4302 in a fully closed position. A suitable damper 4336 is the ENIDINE 1.0B-03 or equivalent.

Figure 56:
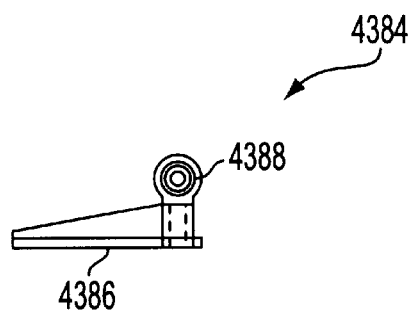
FIG. 56 is a cylinder abutment of the actuator of FIG. 54.

The driver 4306, preferably an electric cylinder, having an extensible piston is mounted pivotally to the upper cylinder mount 4344 at the end of the piston and is mounted pivotally at the opposed end of the cylinder 4306 to the lower cylinder mount 4358. A suitable cylinder 4306 is the SMC NCA1R250 or equivalent. More particularly, a stop cylinder abutment 4384 is fixed to the end of the extensible piston of the electric cylinder 4306. The abutment 4384, which is most easily viewed in FIG. 56, comprises a plate 4386 and a member 4388 defining a hole therethrough extending perpendicularly therefrom. As configured, the plate 4386 extends perpendicularly to the piston of the electric cylinder 4306 past the width of the cylinder 4306.

An electric cylinder 4306 is preferred over other drivers to properly simulate human closure of hoods. This configuration is particularly necessary when the vehicle under test is cycled at extreme temperatures. While air cylinders may be used, they are subject to varied outputs as the ambient temperature changes. To ensure proper simulation of a velocity profile of a hood being closed by a human, an electric actuator—significantly less affected by temperature extremes—is preferred.

The free-fall hood actuator 4300 also includes the bumper 4338 and the damper 4336 constructed and arranged substantially identically as in the assisted hood actuator 4100. Because a free-fall hood is dropped to closure rather than actively pushed to closure, however, there is generally less lift arm energy to dissipate by the damper 4336. Consequently, the bumper 4338 and damper 4336 plays a more important role in the assisted hood actuator 4100.

Figure 57:
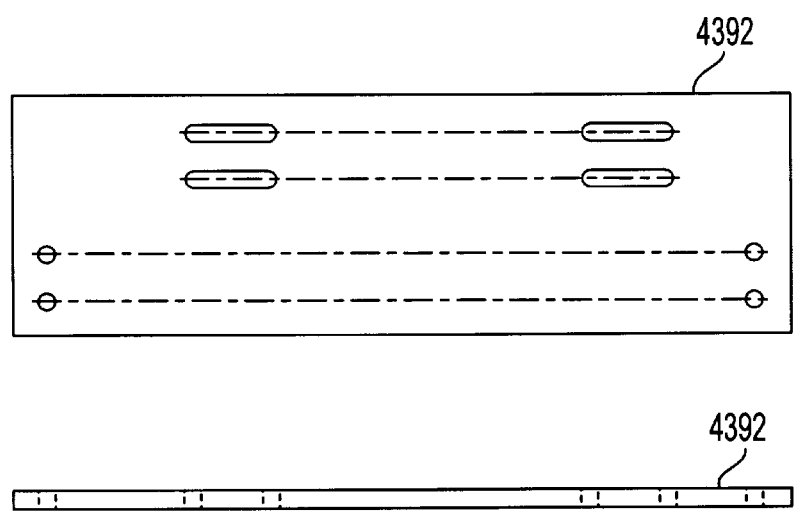
FIG. 57 is a stop cylinder mount plate of the actuator of FIG. 54.

The free-fall hood actuator 4300, however, also comprises preferably a stop cylinder assembly 4390. A stop cylinder mount plate 4392, which can also be seen in FIG. 57, is fixed, preferably by mechanical fasteners, to the lift arm actuator 4306 and provides a mounting surface spaced laterally from the lift arm cylinder 4306. A stop cylinder 4394 having an extensible piston is fixed to the mount plate 4392 such that the stop cylinder 4394 is substantially parallel with the lift arm cylinder 4306 and such that the stop cylinder piston extends in the same direction as the piston of the lift arm cylinder 4306. A suitable stop cylinder 4394 is a SMC NCA1R250 or equivalent.

Once the lift arm 4302 and lift hand assembly 4304 have lifted the free-fall hood under test to its full open position, the stop cylinder 4394 extends its piston to a desired drop height. Thereafter, the lift arm cylinder 4306 rotates the lift arm 4302 and lift hand 4304 in a closing direction until the stop cylinder abutment 4384 engages the end of the extended piston of the stop cylinder 4394. Thus, the stop cylinder abutment 4384 must be positioned across the longitudinal axis of the stop cylinder 4394, and the extension of the stop cylinder 4394 must be sufficiently long to cover all expected drop heights, as described below. The stop cylinder 4394 is extended to a predetermined length that sets the drop height of the hood under test to a predetermined value. In other words, the lift arm 4302 can only rotate in a closing direction until the stop cylinder abutment 4384 engages the piston of the stop cylinder 4394 thereby preventing further rotation of the arm 4302 and positioning the arm 4302 at some height above full closure. At the predetermined height, the lift hand 4304 is retracted and the hood under test is allowed to free fall through the predetermined height.

The stop cylinder 4394 provides the preferred method of setting the hood drop height. Sensors or limit switches, for example, could be used to indicate drop height and initiate free fall. Such a process, however, would not provide accurate control over drop height at temperature extremes. As the lift arm 4302 rotated the hood under test towards closure, the lift hand 4378, retracted by an air cylinder 4374, would respond in times that varied with temperature thereby varying the drop height. For example, if the lift hand 4378 took longer to fully retract—because of a temperature variation—following free-fall initiation while the lift arm 4302 was rotated, the drop height would be lowered. Thus, it would be difficult to release the hood under test at the same drop height for tests at different temperature extremes.

The free-fall hood lift actuator 4300 is provided preferably in two sizes. A small hood lift actuator is adapted for use with hoods of compact vehicles. A large free-fall hood actuator is adapted for use with larger vehicles. Both hood lift actuators are constructed and arranged identically except that the relative dimensions are increased for the larger actuator and the driver 4306 is sized for the larger loads expected from larger vehicle hoods.

Decklid Release

Figure 58:
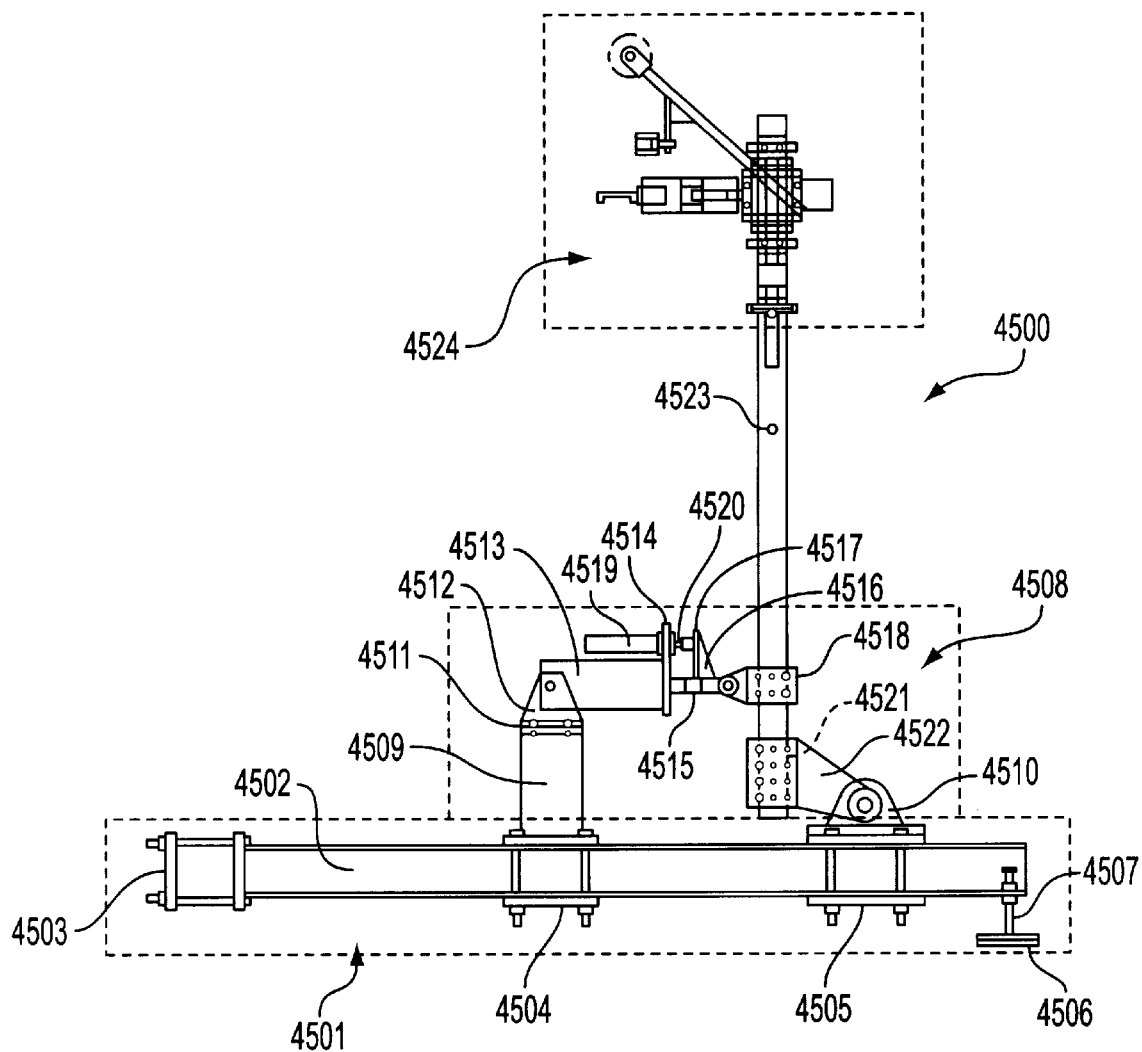
FIG. 58 is a decklid release of the present invention.
Figure 59:
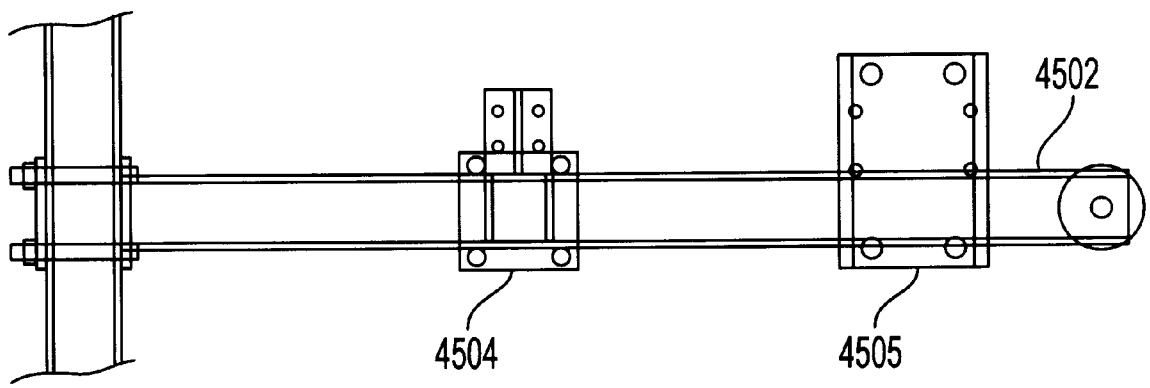
FIG. 59 is a support arm of the actuator of FIG. 58.

A decklid release 4500 cycles a rear lid locking mechanism of any truck, automobile or van by simulating the unlocking action when a key is inserted into the lid's locking mechanism and turns. The decklid can be a car trunk, hatch back, van door, station wagon door, rear truck door or any other like decklid horizontally disposed on a vehicle. Generally, as shown in FIG. 58, the decklid release 4500 comprises a support assembly 4501, an actuation assembly 4508, and a head assembly 4524.

The support assembly 4501 comprising a support arm 4502 disposed substantially horizontally is attached to a transverse member clamp 4503 and supports a cylinder mount 4509, a pivot mount 4510, and a levelling mount 4506. More particularly the transverse member clamp 4503 attaches the support assembly 4501 substantially perpendicularly from the transverse member 158 of the rear frame 104 so that the support assembly 4501 extends rearwardly from the main frame. The transverse member clamp 4503 comprises two parallel plates positioned about the transverse member 158 and is clamped to the transverse member 158 by any suitable means. One of the plates is fixed to an end of the support arm 4502, preferably by welding, such that the plate's face is substantially perpendicular to a longitudinal axis of the support arm 4502. Preferably, the plates are secured to the main frame by mechanical fasteners that pass through the plate attached to the support arm 4502 and tighten upon the plate opposed to the first plate, thereby clamping the support arm 4502 to the main frame. Consequently, the fasteners can be loosened such that the decklid release 4500 can be positioned anywhere along the width of the main frame.

Located at the opposite end of the support arm 4502, the levelling mount 4506 is attached to the support arm 4502 by any suitable means. Preferably, a drill hole is disposed in the bottom side of the support arm 4502. A levelling mount stem 4507 passes through the hole and supports the arm 4502 when the levelling mount 4506 abuts the ground. Two fasteners disposed on the stem 4507 are positioned on opposite sides of a support arm wall. Each of the fasteners can be tightened against the arm 4502 thereby fixing the levelling mount 4506 to the support arm 4502. A height of the levelling mount 4506, and consequently, the vertical position of the arm 4502, is adjusted to keep the decklid release 4500 level with the main frame.

Disposed between the transverse member clamp 4503 and the levelling mount 4506, the actuation assembly 4508 is attached to the support arm 4502 by the cylinder mount 4509 and the pivot mount 4510. The cylinder mount 4509 comprises a pair of plates 4504 substantially parallel to and abutting the arm 4502. The plates 4504 are clamped to the support arm 4502 by any suitable means. Preferably, the plates 4504 are secured to the support arm 4502 with mechanical fasteners that pass through the plates 4504 and tighten thereon, thereby securing the cylinder mount 4509 to the support arm 4502. Consequently, the fasteners can be loosened such that the cylinder mount 4509 can be positioned anywhere along the length of the support arm 4502. A substantially vertical member is attached at the end to the upper plate 4504, preferably by welding, and includes a flange 4511 fixed at the opposed end that extends laterally and perpendicularly from the vertical member. An actuator mount 4512 is attached to the flange 4511 and provides an offset pivot for an actuator 4513 as described below, positioned laterally from the support arm 4502.

Figure 60:
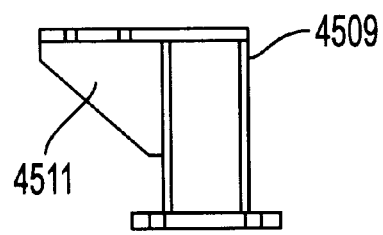
FIG. 60 is a cylinder mount of the actuator of FIG. 58.
Figure 61:
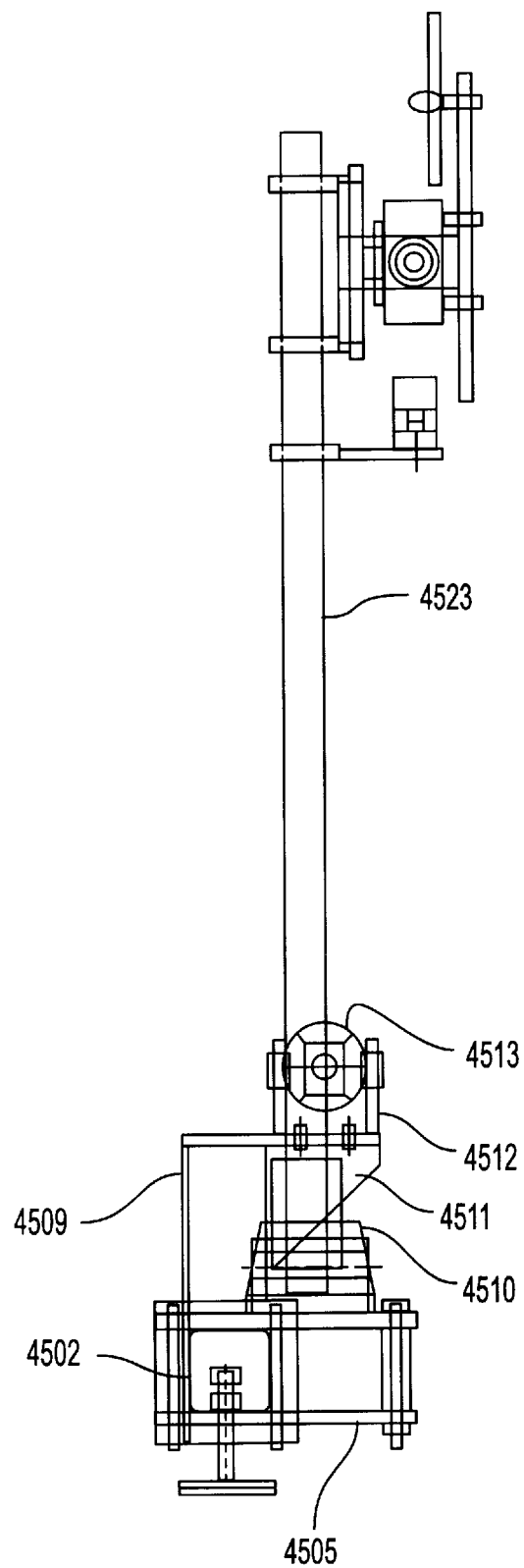
FIG. 61 is a front elevational view of the decklid release of FIG. 58.

The pivot mount 4510 comprises two parallel plates 4505 positioned about and clamped to the support arm 4502 by any suitable means, preferably in the manner described for the cylinder mount 4509. The pivot mount 4510 also provides an offset pivot for a shaft 4523, as described below, positioned laterally from the support arm 4502. Consequently, as best seen in FIG. 60, the offset cylinder mount 4509 and the offset pivot mount 4510 prevent interference between the shaft 4523 and the support arm 4502.

An actuation cylinder 4513 having an extendable piston 4515 is mounted pivotally to the actuator mount 4512 by any suitable means such that the cylinder 4513 is offset yet substantially parallel to the support arm 4502 when the shaft 4523 is substantially perpendicular to the support arm 4502. One skilled in the art will recognize that any suitable actuator, including hydraulic and electric actuators, may be incorporated as the actuation cylinder 4513. Fixed to the opposite end of the actuation cylinder 4513 is a shock mount plate 4514. A centrally located hole is disposed in the lower part of the plate 4514 through which the actuator piston 4515 can pass. A clamp 4518, preferably a collar, is mounted pivotally to the free end of the extendible piston 4515 and is secured by any conventional means to the shaft 4523.

Intermediate to the cylinder 4513 and the clamp 4518, a shock striker 4516 is fixed to the piston 4515. The shock striker 4516 provides a shock mounting surface 4517 that is substantially perpendicular to the piston 4515.

A damper 4519 of any general variety is attached to the upper part of the shock mount plate 4514 such that the damper 4519 is located above and parallel to the actuation cylinder 4513. A suitable damper is the ENIDINE damper #DEM 1.0B-04 or equivalent. One skilled in the art will recognize that the damper 4519 may be located below and parallel to the actuation cylinder 4513 as well. A centrally located hole is disposed in the upper part of the plate 4514 through which a piston 4520 of the damper 4519 can pass. The free end of the piston 4520 abuts the shock mounting surface 4517 of the shock striker 4516 when the shaft 4523 is in the vertical configuration.

The shaft 4523 is attached to the piston mount 4510 with a pivot collar 4521 which comprises two semi-circular members defining a bore therethrough when connected. One semi-circular member is fixed, preferably by welding, to a pivot flange 4522. The semi-circular members separate and can be positioned around and clamped to the vertical shaft 4523 by any suitable means. Specifically, the free semi-circular member incorporates screws that pass through the free semi-circular member and tighten into threads tapped into the semi-circular member fixed to the flange 4522, thereby securing the flange 4522 to the shaft 4523. The flange 4522 extends parallel to the longitudinal direction of the support arm 4502 and is secured to the pivot mount 4510 by any suitable means such that the pivot collar 4521, and consequently the shaft 4523, can freely rotate about the axis defined perpendicularly to the pivot mount fastener. As previously described, the clamp 4518 is fixed to the shaft 4523 such that upon activation of the cylinder 4513, the shaft 4523 is rotated about the mount 4510.

One skilled in the art will recognize that the actuation cylinder 4513 can be disposed between the vertical shaft 4523 and the levelling mount 4506. One skilled in the art will also recognize that the cylinder mount 4509 and pivot mount 4510 can be offset laterally to either side of the support arm 4502.

Figure 62:
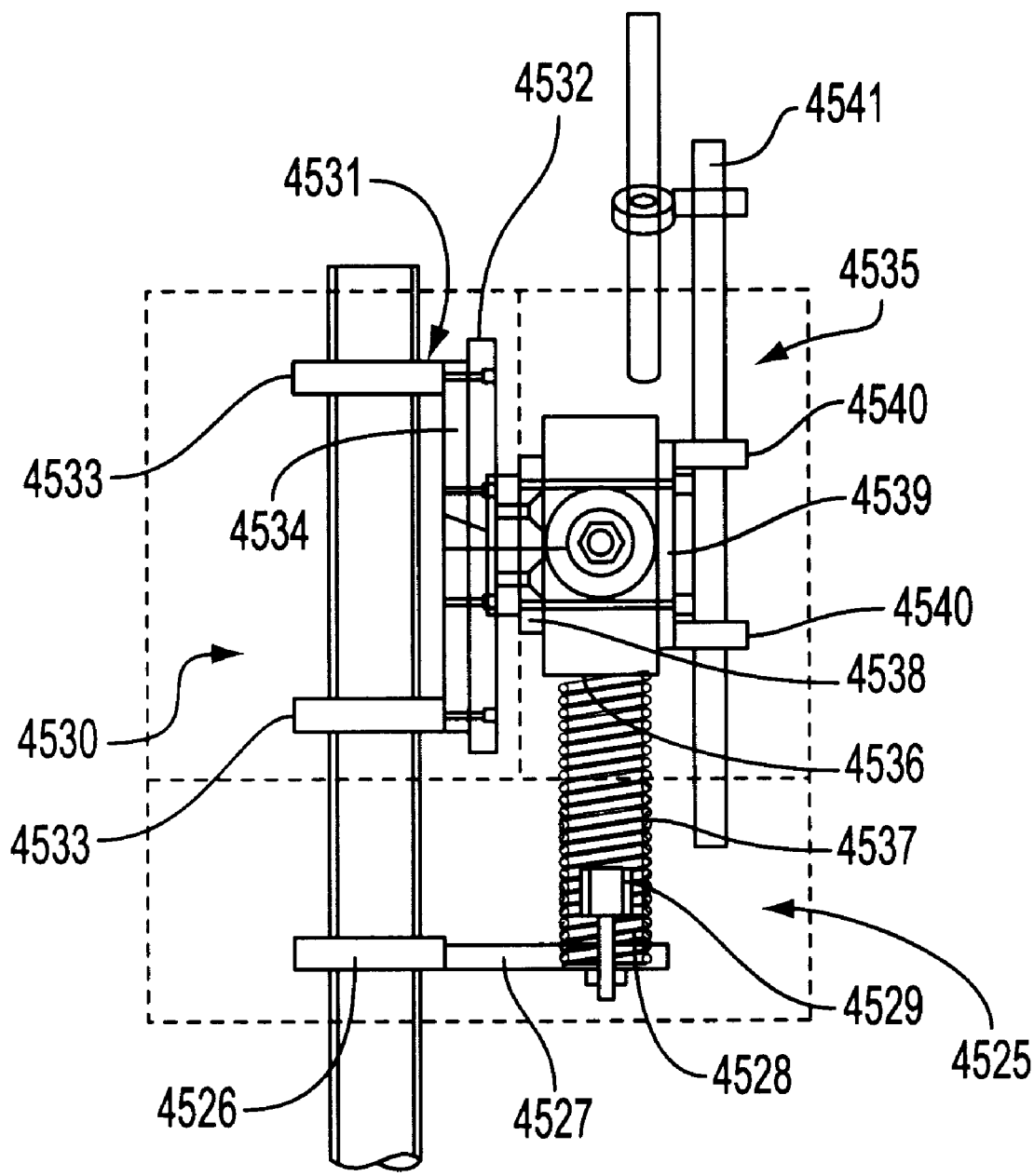
FIG. 62 is a head assembly of the decklid release of FIG. 58.
Figure 63:
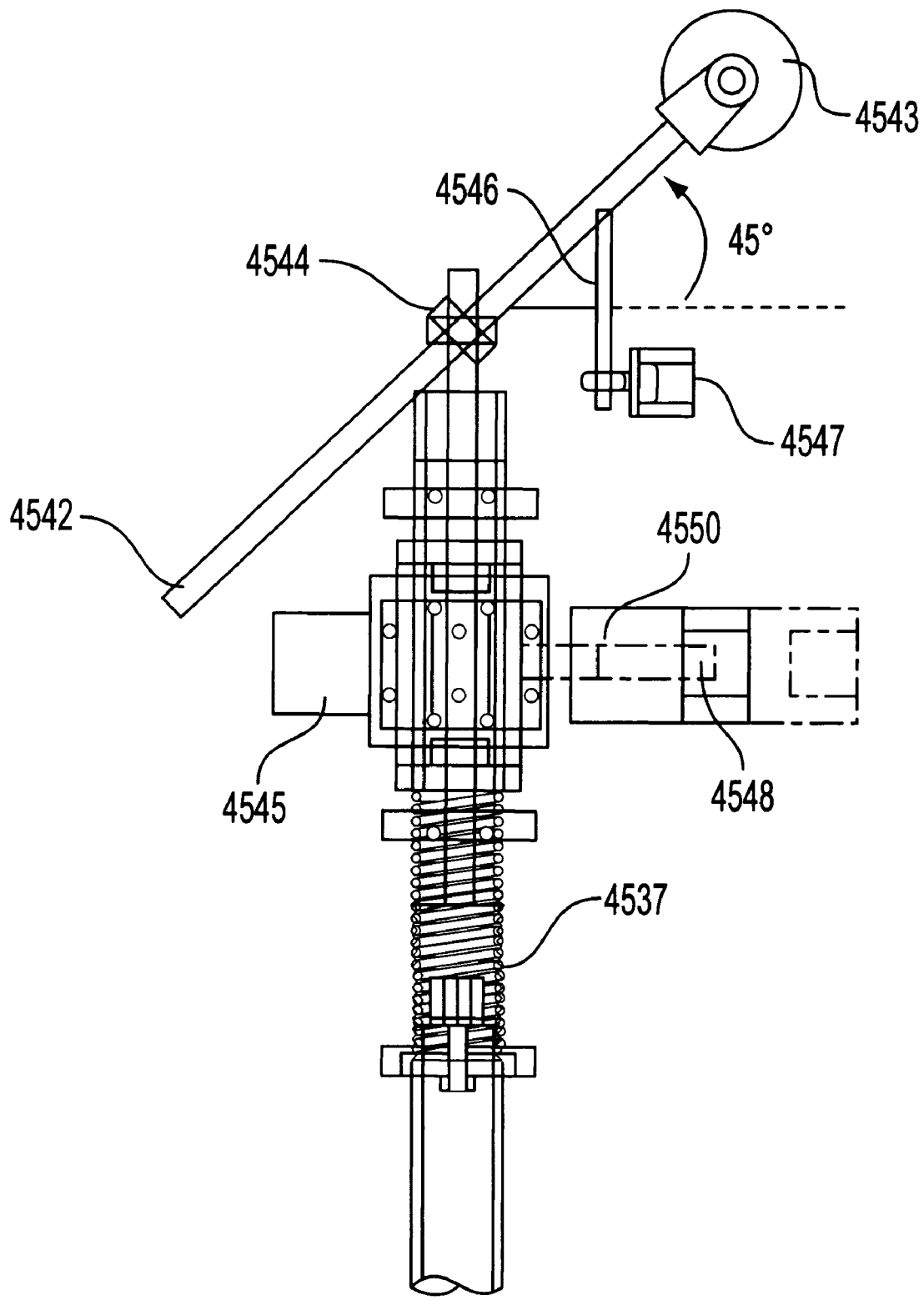
FIG. 63 is a side elevational view of the head assembly of FIG. 62.

As shown in FIGS. 62 and 63, the head assembly 4524 comprises a cylinder floater assembly 4525 that is secured to the vertical shaft 4523 by a cylindrical bracket 4526 that can be positioned about and clamped to the shaft 4523 by any suitable means. The bracket 4526, constructed as the previously described cylindrical brackets, is incorporated as part of a bumper mount 4527 that extends substantially perpendicularly from the vertical shaft 4523. A bumper standoff 4528, having a bumper 4529 secured thereto, is attached to the free end of the bumper mount 4527 by any suitable means. A biasing element 4537, preferably a compressible spring, is fixed to the standoff 4528 and extends past the bumper 4529. The free end of the biasing element 4537 abuts a cylinder assembly 4535 and supports the weight of the cylinder assembly 4535, as described below, without fully compressing the element 4537.

Disposed above the cylinder floater assembly 4525 and connected to the shaft 4523, a bearing assembly 4530, comprises a bearing mount 4531 and a linear bearing 4532 attached thereto. As shown in FIG. 62, the bearing mount 4531 comprises two cylindrical brackets 4533 fixed, preferably by welding to either end of a bearing surface 4534 such that the brackets 4533 are substantially perpendicular to the bearing surface 4534. The brackets 4533 are constructed as the previously described brackets and can be positioned about and clamped to the shaft 4523 by any suitable means, thereby securing the bearing assembly 4530 to the shaft 4523.

The linear bearing 4532 is fastened to the bearing surface 4534 by any suitable means such that the bearing 4532 provides linear motion parallel to the longitudinal axis of the shaft 4523. Specifically, the linear bearing 4532 incorporates screws that pass through the bearing 4532 and tighten upon threads tapped into the bearing surface 4534. A suitable linear bearing is the THK bearing #HRV21 CA1 UU+0180 or equivalent.

The cylinder assembly 4535 is attached to the linear bearing 4532 such that the assembly 4535 moves linearly and substantially parallel to the shaft 4523. As previously described, extending from the bumper standoff 4528 to the bottom of a cylinder mount block 4536 is the biasing element 4537. The stiffness of the element 4537 is such that the element 4537 can adequately support the weight of the cylinder assembly 4535 without being fully compressed. More particularly, the stiffness of the element 4537 is selected to provide a spring force equal to the weight of the cylinder assembly 4535 that biases the cylinder assembly 4535 along its travel on the bearing 4532. As configured, the element 4537 prevents the cylinder assembly 4535 from loading a decklid under test when the decklid opens. Thus, the cylinder assembly 4535 "floats" along the bearing 4532 thereby keeping the cylinder assembly 4535 in the same position relative to the decklid under test as the decklid opens.

A cylinder mount plate 4538 fastens to the linear bearing 4532 by any suitable means. Specifically, the cylinder mount plate 4538 incorporates screws that pass through the plate 4538 and tighten upon threads tapped into the linear bearing 4532, thereby fixing the mount plate 4538 to the linear bearing 4532. The cylinder mount block 4536 and a lift arm mount 4539 are fixed to the cylinder mount plate 4538 by any suitable means. Specifically, the lift arm mount 4539 incorporates screws the pass through the arm mount 4539 and the cylinder mount block 4536 and tighten upon threads tapped into the cylinder mount plate 4538, thereby securing the lift arm mount 4539 and the cylinder mount block 4536 to the mount plate 4538.

An actuator 4545 having both an extendible and rotary piston is fixed to the cylinder mount block 4536 by any conventional means. One skilled in the art will recognize that any suitable actuator, providing both linear and rotary activation, may be incorporated in this part of the decklid release 4500. Fixed to the free end of the piston of the actuator 4545 by any conventional means is a key carriage 4550. A plunger 4548 is disposed within the key carriage 4550 and can slide relative to the carriage 4550. As configured, the actuator 4545 performs two operations. The first actuation is linear and substantially perpendicular to the shaft 4523. With this motion, the carriage 4550 can engage a key (not shown) previously inserted into a decklid locking mechanism. Alternatively, the carriage 4550 can insert a key into the locking mechanism. The second actuation is rotational and about the longitudinal axis of the actuator 4545. With this motion, the carriage 4550 acts to turn the decklid key and unlock the decklid locking mechanism, thereby releasing the decklid. In any embodiment, the plunger 4548 ensures that the key is inserted fully into the lock.

As shown in FIG. 62, the lift arm mount 4539 comprises two cylindrical brackets 4540 fixed, preferably by welding, to a base of the mount 4539 such that the brackets 4540 are substantially perpendicular to the base. The cylindrical brackets 4540 are constructed as the previously described cylindrical brackets and can be positioned about and clamped to a lift arm 4541 by any suitable means, thereby securing the arm 4541 to the lift arm mount 4539.

Finally, a roller mount shaft 4542, having a soft roller 4543 disposed at the end of the shaft 4542, is secured to the lift arm 4541 by a lift arm angle mount 4544. The roller mount shaft 4542 is oriented such that the soft roller 4543 extends diagonally away from the actuator 4545 at an angle, approximately 45 degrees. The lift arm angle mount 4544 comprises two collars fixed to each other, preferably by welding, such that the axes of the collars are disposed relative to each other at the desired angle. The collars are constructed as the previously described cylindrical brackets and can be positioned about and clamped to the lift arm 4541 and roller mount shaft 4542 by any suitable means. The soft roller 4543 is rotatably mounted onto the extended end of the roller mount shaft 4542 by any conventional means.

A bumper arm 4546 is fixed to the extended part of the roller mount shaft 4542, preferably by welding, such that the arm 4546 extends downwardly, away from the roller mount, such that the arm 4546 is substantially parallel to the shaft 4541. A bumper 4547 is fixed by any conventional means to the end of the arm 4546 such that the bumper 4547 extends perpendicularly from the arm 4546.

Decklid Actuator

Figure 64:
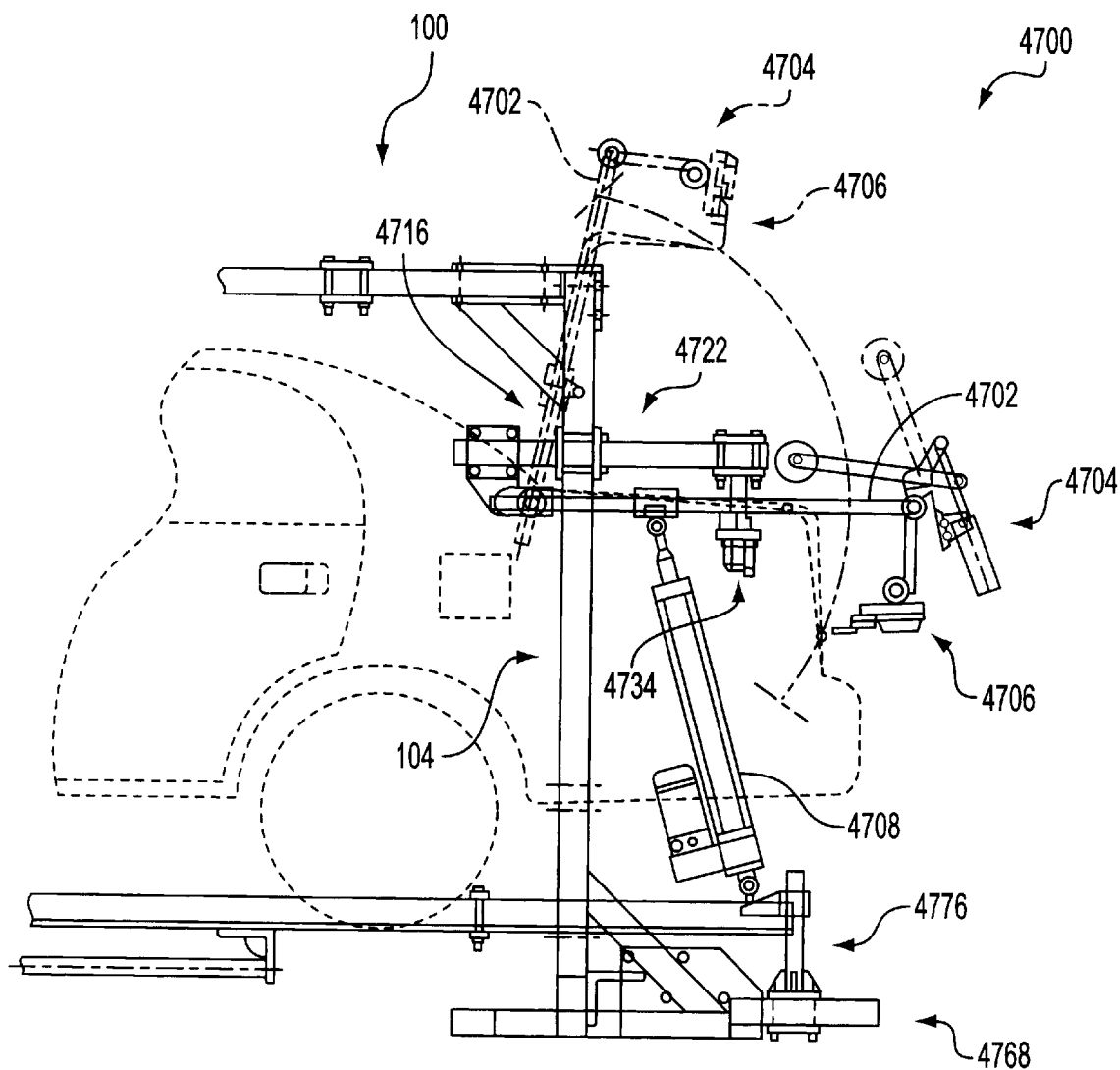
FIG. 64 is a decklid actuator of the present invention.
Figure 65:
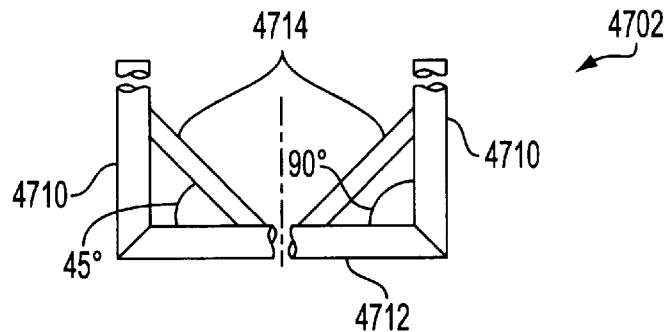
FIG. 65 is a C-shaped arm of the actuator of FIG. 64.

As shown in FIG. 64, a decklid actuator 4700 is provided for cycling decklids of vehicles under test. Prior to cycling of the decklid, the decklids are released, preferably by the decklid release device 4500 described above. The decklid actuator 4700 comprises generally a C-shaped lift arm 4702, a slam mechanism 4704 for closing the decklid, a lift hand assembly 4706 for lifting the decklid, various supports and brackets, a driver 4708 operatively engaged to the lift arm 4702, and dampers and bumpers. More particularly, as best viewed in FIG. 65, the decklid lift arm 4702 comprises two parallel members 4710, preferably constructed from stainless steel tubing, fixed, preferably by welding, to opposed ends of an intermediate member 4712, also preferably constructed from stainless steel tubing, constructed and arranged in a square C-shape. Preferably, a stiffener member 4714 is disposed, preferably at 45°, in each of the corners of the C-shaped decklid lift arm 4702. The decklid lift arm 4702 is constructed to be wider than the width of a vehicle under test.

The decklid lift arm 4702 is mounted pivotally to a small 100, medium 300, or large 500 main frame for rotation about a horizontal axis such that the parallel members 4710 of the lift arm 4702 extend outwardly from the main frame 100, 300, or 500. The following detailed description refers particularly to the small mainframe 100, although it could have equally referred to the medium 300 or large 500 mainframes. In addition, this detailed description focuses primarily on the embodiment in which the decklid actuator 4700 is mounted to the rear of the main frame 100 although another embodiment comprises the decklid actuator 4700 mounted to the front of the main frame 100.

Figure 69:
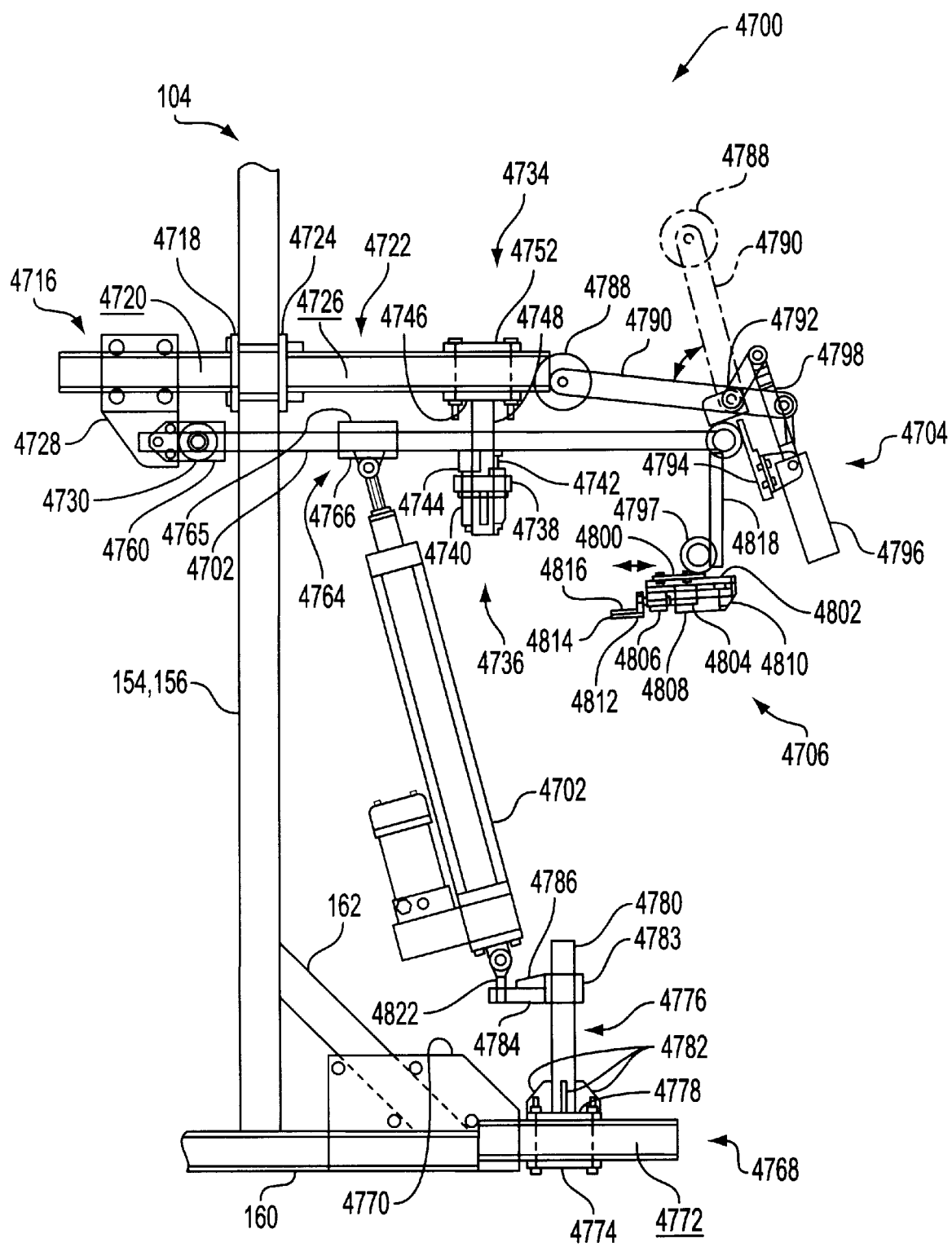
FIG. 69 is a side elevational view of the decklid actuator of FIG. 64.

Specifically, as shown in FIG. 69, a bearing plate support 4716 comprising a first plate 4718 having a plurality of holes therethrough arranged along each lateral side of the plate 4718 is provided for each vertical member 154, 156, of the rear frame member 104 of the main frame 100. A first rectangular steel tube 4720 is fixed, preferably by welding, to one surface of the first plate 4718 and extends perpendicularly therefrom.

A shock mount support 4722 comprising a second plate 4724 having a plurality of holes arranged in an identical pattern to the plurality of holes of the first plate 4718 is provided for each vertical member 154, 156 of the rear frame member 104 of the main frame 100. A second rectangular steel tube 4726 is fixed, preferably by welding, to one surface of the second plate 4724 and extends perpendicularly therefrom. The bearing plate support 4716 and the shock mount support 4722 are positioned in abutting relation to each vertical member 154, 156 of a main frame 100 such that the first rectangular steel tube 4720 extends in a substantially longitudinal forward direction and the second rectangular steel tube 4726 extends in a substantially longitudinal rearward direction. Preferably, the first bearing plate support 4716 and first shock mount support 4722 are each fixed to vertical member 154 such that the longitudinal axis of the forward bearing plate support 4716 is substantially coaxial with the longitudinal axis of the rearward shock mount support 4722. Similarly, a second bearing plate support 4716 and a second shock mount support 4722 are each fixed to vertical member 156 such that the longitudinal axis of the second bearing plate support 4716 is substantially coaxial with the longitudinal axis of the second shock mount support 4722. The longitudinal axes of the two bearing plate supports 4716 and the two shock mount supports 4722 are substantially in a plane parallel to the plane of the bearing surface 112, as can be seen in FIG. 69.

More specifically, the bearing plate supports 4716 and the shock mount supports 4722 are fixed to vertical members 154, 156 by aligning each hole in plate 4718 with a corresponding hole in plate 4724 and attaching a mechanical fastener therethrough for each hole. Preferably, there are four holes in each plate 4718, 4724 arranged to define the corners of a square configuration which is wider than the rectangular steel tubes 4720, 4726, 154, 156, and arranged such that there are two mechanical fasteners attached along each lateral side of each mainframe member 154, 156.

A bearing mount plate 4728 is provided for each bearing plate support 4716 and is adapted to be attached to the rectangular steel tube 4720 of the bearing plate support 4716. Specifically, the bearing mount plate 4728 defines two sets of holes. The first set is arranged in a square configuration spaced sufficiently apart to be wider than the width of the rectangular steel tube 4720 of the bearing plate support 4716. The second set of holes is positioned laterally from the first set of holes and are configured to align with a conventional bearing assembly 4730. As best viewed in FIG. 69, a second plate 4732 also having a set of holes positioned identically as the first set of holes of the bearing mount plate 4728 is also provided. A bearing mount plate 4728 is fixed to each of the rectangular steel tubes 4720 of the bearing plate supports 4716 such that the second set of holes are preferably disposed below the rectangular steel tube 4720 and is clamped in place by mechanical fasteners passing through the holes of the first plate 4728 and second plate 4732. A bearing assembly 4730 suitable for the expected loads and frequency of cycling is fixed to each bearing mount plate 4728 at the second set of holes. A suitable bearing is the SEALMASTER Number FB-16T or equivalent. The bearing plate support 4716, bearing mount plate 4728 and bearing assembly 4730 is positioned on both vertical members 154, 156 of the rearward frame 104 such that the bearings are coaxial with the axis of rotation of the decklid under test.

Figures 66A, 66B:
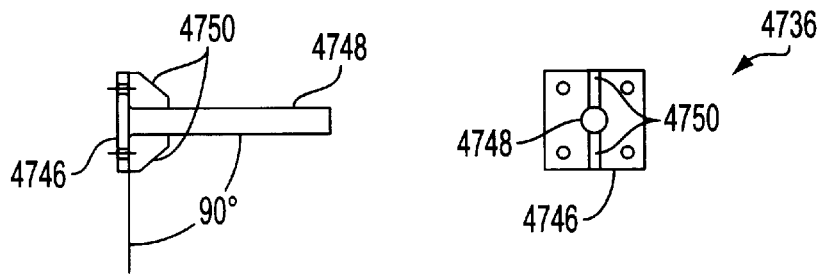
FIG. 66 is a shock mount post of the actuator of FIG. 64.

A shock mount assembly 4734 comprising a shock mount post 4736, a shock mount 4738, a bumper mount 4740, a damper 4742, and a bumper 4744 is provided. As is best viewed in FIG. 66, the shock mount post 4736 comprises a first plate 4746, with a plurality of holes therethrough arranged along each lateral side of the plate, and a tube 4748, preferably stainless steel, fixed perpendicularly to one surface of the plate 4746, preferably by welding. Two stiffener members 4750 are attached, preferably by welding, between the plate 4746 and the tube 4748. A second unattached plate 4752 having a plurality of holes alignable with the holes of the first plate 4746 is provided. The shock mount post 4736 is attached in abutting relationship to the rectangular tube 4726 of the shock mount support 4722 such that the first plate 4746 abuts the lower surface of the rectangular tube 4726, the shock mount post tubing 4748 extends in a downward direction substantially perpendicular to the lower surface of the rectangular tube 4726, and the second unattached plate 4752 abuts the upper surface of the rectangular tube 4726 such that the plurality of holes align with the plurality of holes in the first plate 4746. The first plate 4746 and second plate 4752 are preferably wider than the rectangular tube 4726 such that mechanical fasteners can be attached through the aligned holes on each transverse side of the tube 4726.

Figures 68A, 68B:
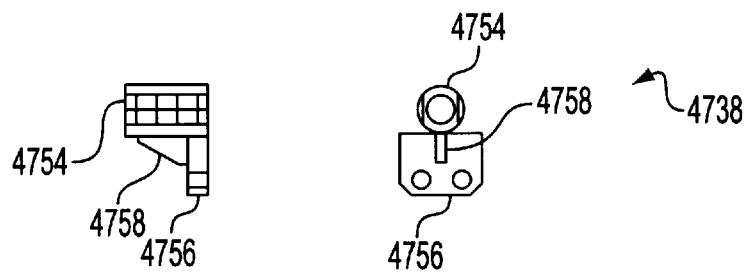
FIG. 68 is a shock mount of the actuator of FIG. 64.

The shock mount 4738, shown in more detail in FIG. 68, comprises a collar clamp 4754 attached, preferably by welding, to a plate 4756 which defines a pair of holes for mounting the damper 4742 and the bumper 4744, as explained in more detail below. A stiffening member 4758 is preferably attached between the collar clamp 4754 and the plate 4756. The shock mount 4738 is selectively attached to the shock mount post 4736 such that the plate 4756 is substantially parallel to the lower surface of the rectangular steel tube 4726 of the shock mount support 4722.

Figure 70:
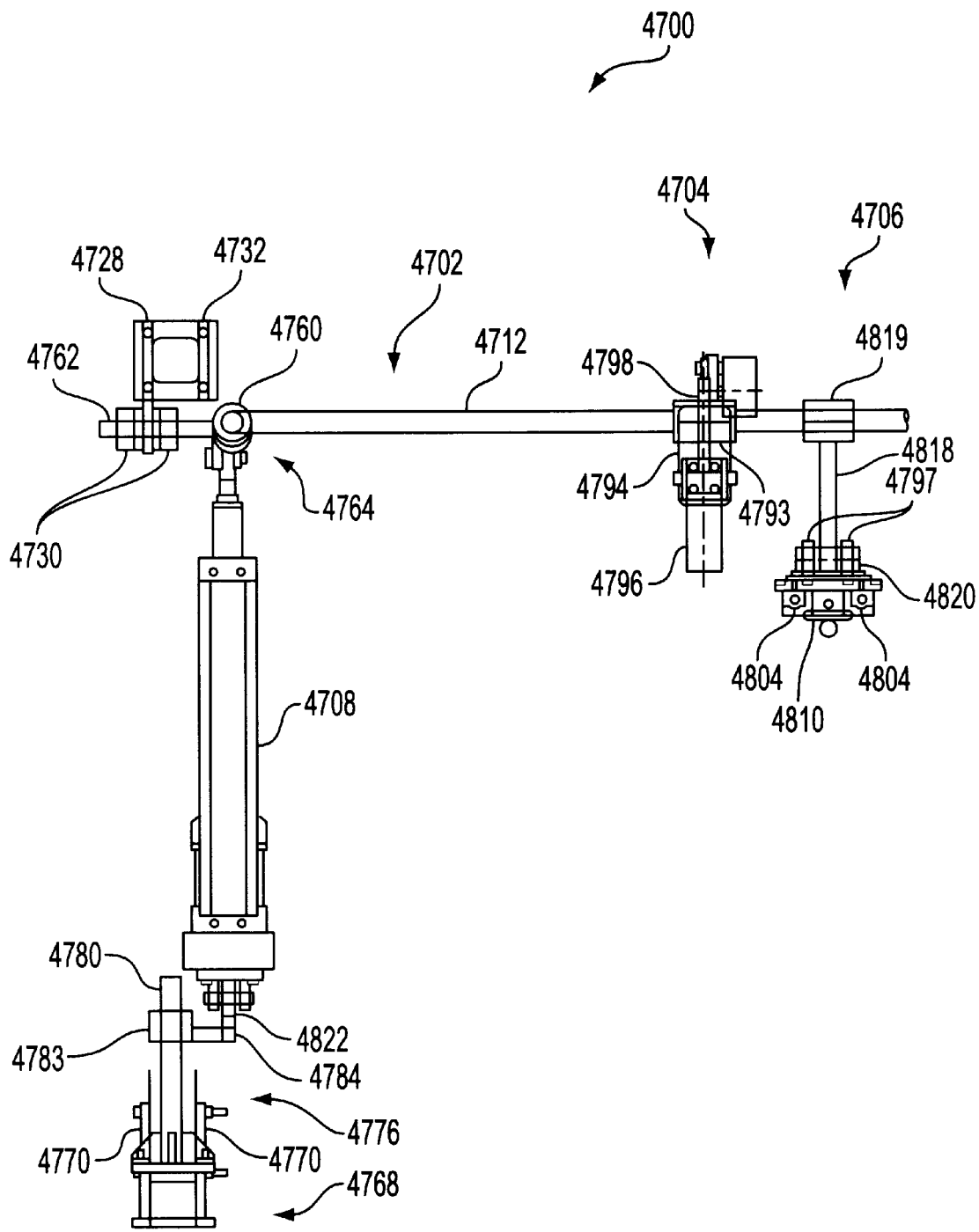
FIG. 70 is a front elevational view of the decklid actuator of FIG. 64.

As discussed above, the decklid lift arm 4702 is configured to pivot horizontally between the vertical members of either the rearward frame 154, 156 or forward frame 120, 122. As shown in FIG. 70, cylindrical bracket 4760 and pin 4762 assembly is provided. The assembly comprises a cylindrical bracket 4760, similarly constructed and arranged as previously described cylindrical brackets, and a pin 4762 fixed to the bracket. Specifically, the cylindrical bracket 4760 has a bore adapted to clamp to the parallel members 4710 of the decklid lift arm 4702. A bearing pin 4762 is fixed, preferably by welding, to the lateral surface of the cylindrical bracket 4760 such that the axis of the bore of the bracket 4760 is perpendicular to the axis of the bearing pin 4762. The bracket 4760 and pin 4762 assembly is attached to each parallel member 1410 of the decklid lift arm such that the pins 4762 are coaxial but extend outwardly. The pins 4762 are inserted into the bearings 4730.

An upper cylinder mount 4764 is fixed to each parallel member 4710 of the decklid lift arm 4702 forward of the bearing assemblies 4730. Specifically, the upper cylinder mount 4764 comprises a cylindrical bracket 4765, as previously described with other modules, and a mounting plate 4766 fixed, preferably by welding, thereto. The mounting plate 4766 defines a hole in the free end of the plate. The upper cylinder mount assembly 4764 is fixed to the decklid lift arm 4702 such that the mount plate 4766 extends downwardly, and the axis of the hole is positioned perpendicularly to the parallel members 4710 of the decklid lift arm 4702.

The decklid lift actuator 4700 further comprises a lower cylinder support 4768. Specifically, the cylinder support 4768 comprises two plates 4770 having a plurality of holes adapted for mounting on either the support assembly 160 of the rearward frame 104 or on the support assembly 126 of the forward frame 102. The holes of the plate 4770 are spaced wider than the width of, and substantially collinear with, the stiffener member 162 or 128 of the rearward 104 or forward 102 frame, respectively. The two plates 4770 are spaced laterally apart such that their surfaces are substantially parallel with yet separated slightly greater than the width of the rectangular tubes 160 and 162. The plates 4770 are fixed to one end of a rectangular steel tube 4772, preferably by welding. The tube 4772 extends parallel therefrom, with the lower surface of the rectangular tube 4772 offset sufficiently in the upward vertical direction from the lower edge of the plates 4770 to accommodate an unattached plate 4774 and mechanical fasteners.

Figures 67A, 67B:
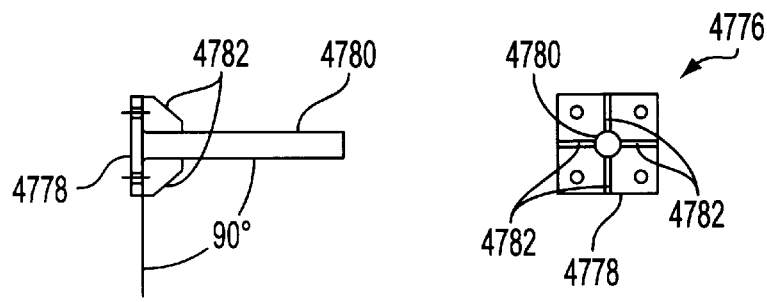
FIG. 67 is a cylinder post of the actuator of FIG. 65.

A cylinder post 4776, similar to the shock mount post 4736 is provided. As best viewed in FIG. 67, the cylinder post 4776 comprises a plate 4778, having a plurality of holes, attached, preferably by welding, to a circular tube 4780 which is preferably stainless steel extending perpendicularly therefrom. Preferably, four stiffener members 4782 are attached by welding between the plate 4778 and the tube 4780 such that they are substantially evenly distributed around the circumference of the tube 4780. The plurality of holes in plate 4778 define the corners of a rectangle with at least one dimension wider than the transverse width of the rectangular tube 4772. The unattached plate 4774 has a plurality of holes arranged identically to the holes in plate 4778 such that mechanical fasteners may be passed through the aligned holes of plates 4774 and 4778 to fasten the cylinder post 4776 to the lower cylinder support 4768. The plate 4774 and cylinder post 4776 are fixed to the frame such that the tube 4780 extends upwardly from the cylinder support 4768 substantially perpendicularly to the top surface of the rectangular tube 4772.

A lower cylinder mount comprising a cylindrical bracket 4783, constructed and arranged as described above, is configured to clamp to the steel tube 4780 of the cylinder post 4776. A plate 4784 is fixed, preferably by welding, to a side of the cylindrical bracket 4783 such that the plate 4784 extends perpendicularly to the bore axis of the cylindrical bracket 4783. A stiffening member 4786 is attached, preferably by welding, between the cylindrical bracket 4783 and the plate 4784. The plate 4784 defines a hole at the free end for attaching the driver 4708.

A slam mechanism 4704 for closing the decklid is disposed on the intermediate segment 4712 of the decklid lift arm 4702 and is adapted to close the decklid when the decklid lift arm 4702 is rotated in a closing direction. A lift hand assembly 4706 is also disposed on the intermediate member 4712 of the decklid lift arm 4702 and is adapted to lift the decklid when the decklid lift arm 4702 is rotated in an opening direction. More particularly, as shown in FIG. 69, the slam mechanism comprises a roller 4788 rotatably mounted at an end of one arm of a bell crank 4790. Any pliable roller 4788 suitable for contacting a decklid of a vehicle under test without imparting damage to the decklid may be used. A FAIRLANE # DR-754-20 or equivalent is suitable for this application. The bell crank 4790 having two arms angularly spaced is pivotally mounted to a bearing assembly 4792 at a point of intersection between the two arms of the bell crank 4790. A suitable bearing assembly 4792 is a TORRINGTON # KP-6 or equivalent. A cylindrical bracket 4793, as described above, is fixed to the bearing assembly 4792 such that the axis of the bore of the bracket 4793 is parallel to the axis of rotation of the bell crank 4790. A mounting plate 4794 is fixed to the cylindrical bracket 4793. A driver 4796 having an extensible piston or screw 4798, preferably an air cylinder, is mounted to the mounting plate 4794 such that the extensible piston 4798 is substantially parallel with the mounting plate 4794 and extended towards the second arm of the bell crank 4790. The piston 4798 of the air cylinder 4796 is pivotally mounted to the end of the second arm of the bell crank 4790.

The slam mechanism 4704 is mounted to the decklid lift arm 4702 such that upon activation of the air cylinder 4796 the bell crank 4790 is rotated towards the decklid and the roller 4788 engages a top surface of the decklid.

The lift hand assembly 4706 comprises a pair of cylindrical brackets 4797, as described above, aligned coaxially and fixed, preferably by welding, to a mount plate 4800. The mount plate 4800 is fixed to a support plate 4802. A pair of linear bearings 4804 having shafts slidably mounted therein are disposed on the support plate 4802 such that the shafts are positioned parallel and spaced laterally from each other. A conventional coupler 4806 is mounted to the shafts such that the coupler 4806 is movable fore and aft as the shafts slide within the linear bearings 4804. A driver 4808 having an extensible piston, preferably an air cylinder, is mounted parallel and between the shafts of the linear bearings 4804 such that the piston of the cylinder 4808 extends parallel in the same direction as the shafts. The cylinder 4808 is mounted to a cylinder mount 4810 fixed to the support shaft. The end of the extensible piston is fixed to the coupler 4806. A lift hand 4812 having a substantially L-shaped configuration providing a substantially horizontal surface 4814 parallel with the mount 4800 and support 4802 plates is mounted to the opposite side of the coupler 4806. A bumper 4816 is fixed to the surface of the lift plate 4814. Upon activation of the cylinder 4808, the lift plate 4814 extends or retracts as required. A suitable cylinder 4808 is provided by SMC # NCQ2B40-50. The lift hand assembly 4706 is fixed to a lift hand extension arm 4818 which is fixed to the decklid lift arm 4702 such that the lift plate 4814 can extend towards and engage the decklid under test.

The lift hand extension assembly is comprised of an extension arm 4818, a cylindrical bracket 4819, and a rod 4820. The cylindrical bracket 4819 is attached, preferably by welding, in abutting relation to the upper rearward surface of the extension arm 4818 such that the bore axis of the bracket 4819 is substantially perpendicular to the long axis of the extension arm 4818. The rod 4820 is attached, preferably by welding, in abutting relation to the lower forward surface of the extension arm 4818 such that the long axis of the rod 4820 is substantially perpendicular to the long axis of the extension arm 4818. The extension arm assembly is attached to the intermediate member 4712 of the decklid lift arm 4702 by the cylindrical bracket 4819. The lift hand assembly 4706 is attached to the lift hand extension assembly by clamping the two lift hand cylindrical brackets 4797 onto the rod 4820.

The bumper 4744 is fixed to the bumper mount 4740 and extends vertically and upwardly to engage the decklid lift arm 4702 in a fully closed position. A suitable bumper 4744 is a McMASTER-CARR # 9732K15 or equivalent. The damper 4742 is mounted to the shock mount 4738 and extends vertically and upwardly to engage the decklid lift arm 4702 in a fully closed position. A suitable damper 4742 is the ENIDINE 1.0B-04 or equivalent. Preferably, an electric cylinder 4708 having an extensible piston is mounted pivotally to the upper cylinder mount 4764 at the end of the piston and is mounted pivotally at the opposed end of the cylinder 4708 to the lower cylinder mount 4822. A suitable cylinder 4708 is the TH4104B-18-MP2-MT1 or equivalent.

An electric cylinder 4708 is preferred over other drivers to properly simulate human closure of decklids. This configuration is particularly necessary when the vehicle under test is cycled at extreme temperatures. While air cylinders may be used, they are subject to varied outputs as the ambient temperature changes. To ensure proper simulation of the velocity profile of a decklid being closed by a human, an electric actuator—significantly less affected by temperature extremes—is preferred.

Additionally, while the control system should slow the decklid lift arm 4702 down before the electric cylinder 4708 bottoms, the bumper 4744 and damper 4742 provides additional protection to the actuator. Thus, the bumper 4744 and damper 4742 should be positioned relative to the decklid lift arm 4702 such that the decklid lift arm 4702 engages the bumper 4744 after a stroke of the actuator sufficient to rotate the arm 4702 to close the decklid has been applied, but before the electric actuator 4708 bottoms. Moreover, given that the decklid actuator 4700 can be used to slam the decklid, the damper 4742 provides a device to dissipate the energy of the moving decklid lift arm 4702.

The decklid lift actuators are provided preferably in two sizes. A small decklid lift actuator is adapted for use with decklids of compact vehicles. A large decklid actuator is adapted for use with larger vehicles. Both decklid lift actuators are constructed and arranged identically except that the relative dimensions are increased for the larger actuator and the driver is sized for the larger loads expected from larger vehicle decklids.

HANDLE AND CHECK LOAD ACTUATORS

Handle Actuators

Outside Handle Actuator

Figure 71:
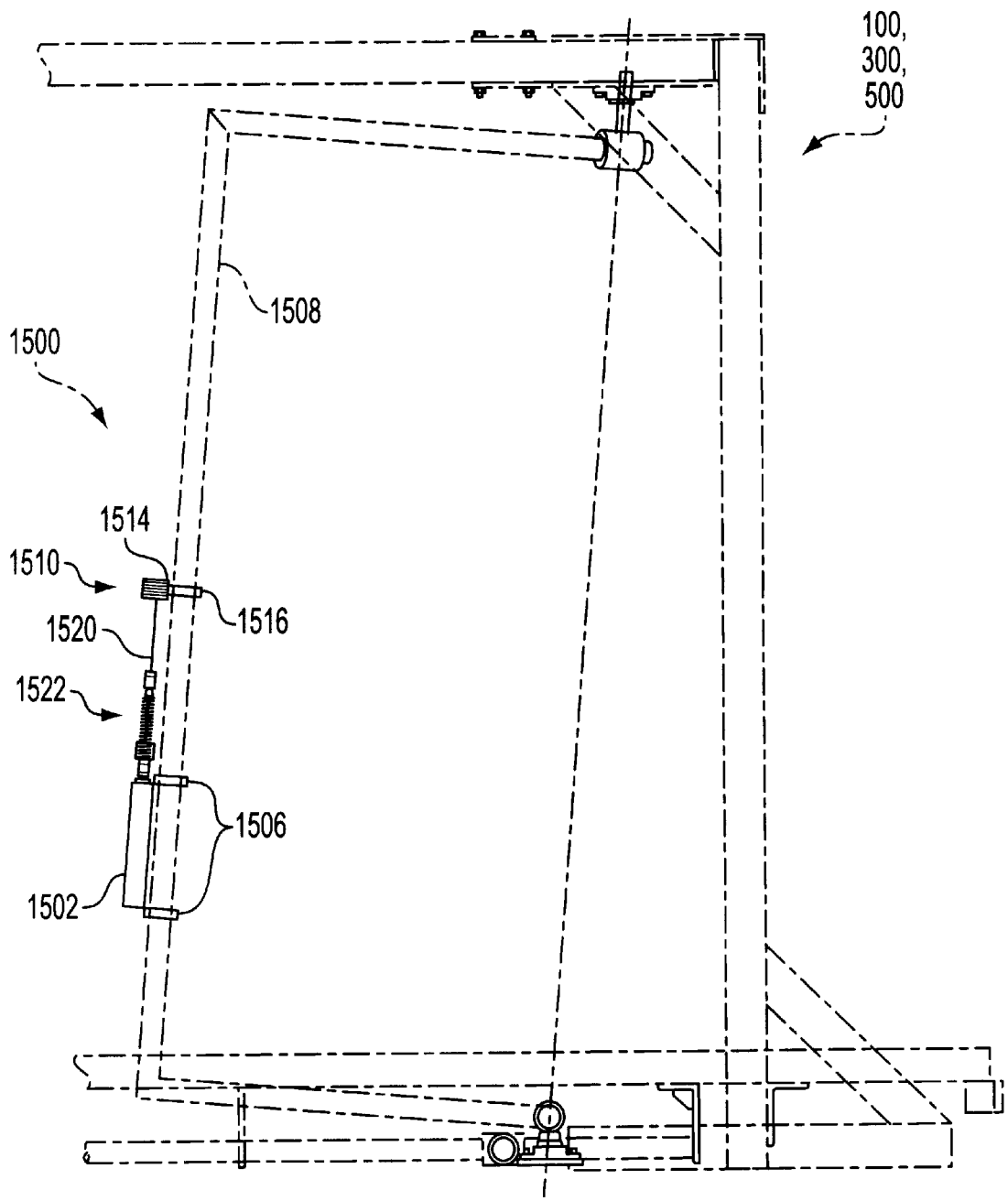
FIG. 71 is a front elevational view of a outside handle actuator of the present invention.
Figure 72:
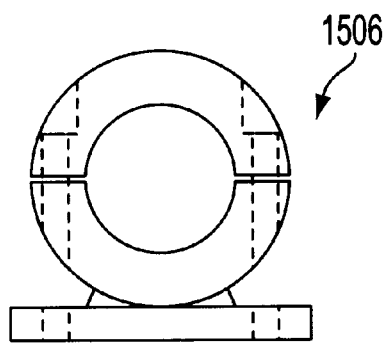
FIG. 72 is a cylindrical bracket of the actuator of FIG. 71.
Figure 72:
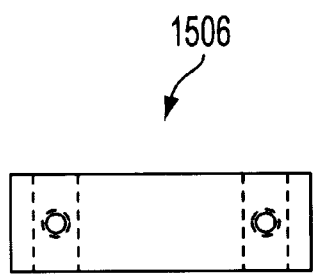
Figure 75:
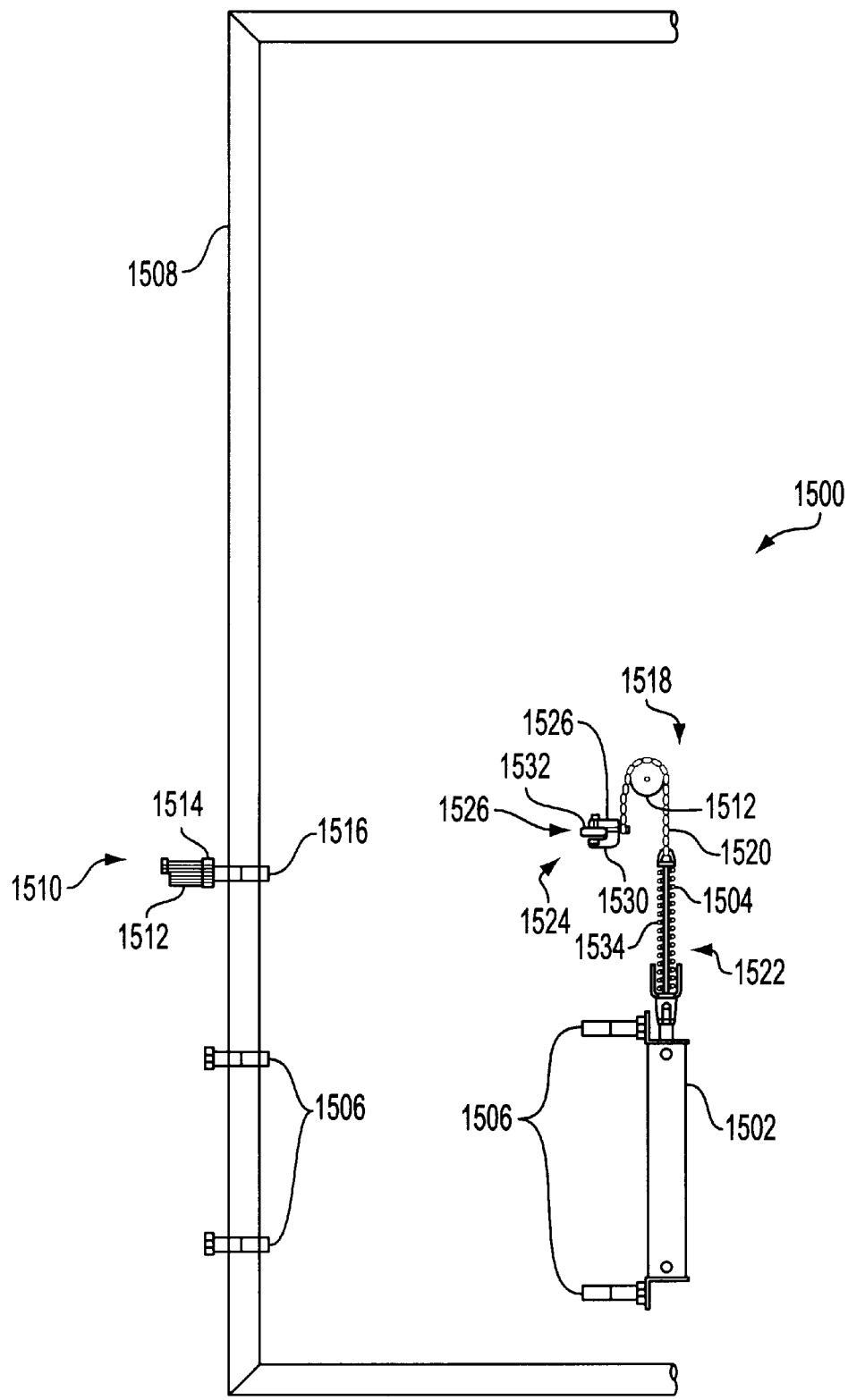
FIG. 75. is a side elevational view of the actuator of FIG. 71.
Figure 76:
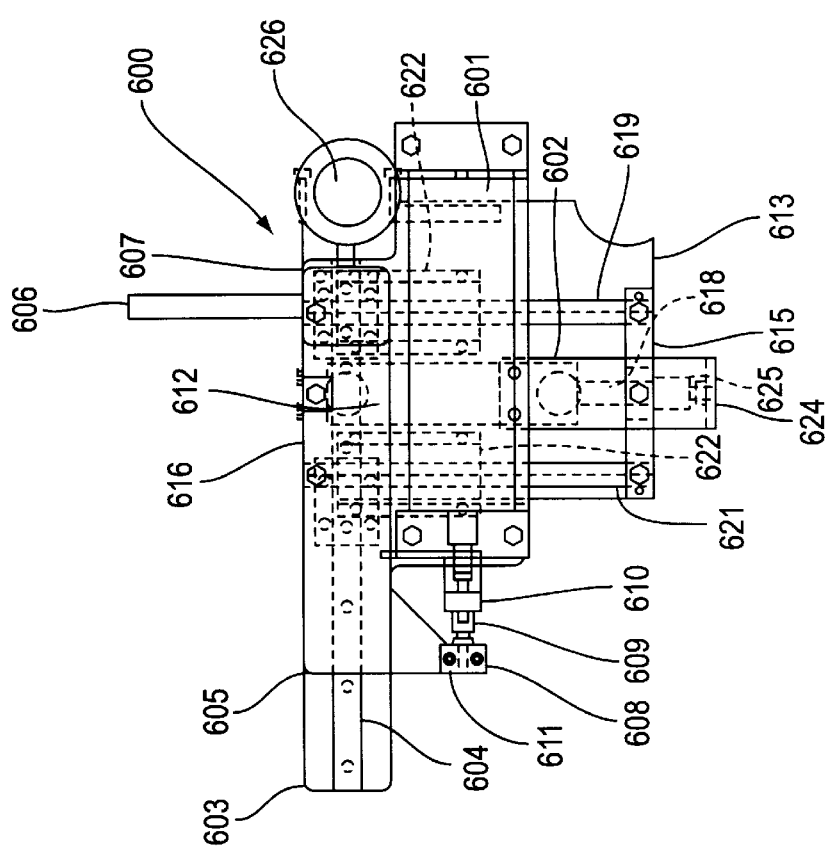
FIG. 76 is a top plane view of a check load actuator of the present invention.

As shown in FIG. 71, an outside door handle actuator 1500 is provided. The outside door handle actuator 1500 comprises preferably an air cylinder 1502 having an extensible piston 1504. Other linear actuators, however, may be incorporated including electric actuators and hydraulic cylinders. A cylindrical bracket 1506 is attached to each of the opposed ends of the air cylinder 1502. Specifically, as can be seen in FIG. 75, the cylindrical bracket 1506 comprises a flat plate defining a pair of holes spaced laterally from a center of the plate through which mechanical fasteners pass to attach the plate to the air cylinder 1502. The cylindrical bracket 1506 further comprises two mating semi-circular members that, upon assembly, define a bore therethrough fixed, preferably by welding, to the plate. The two semi-circular members are adapted to be connected to an outside door arm 1508 by separating the halves, positioning the halves about the outside door arm 1508, and clamping the halves to the outside door arm 1508 by any suitable means. Specifically, the semi-circular members incorporates screws that pass through one semi-circular member and tighten upon threads tapped into the opposing semi-circular member. As can be seen in FIG. 76, the semi-circular members are fixed to the plates such that the bores are oriented substantially parallel to the air cylinder 1502. The air cylinder 1502 is positioned preferably on the vertical member of the outside door arm 1508 below the level of the door handle.

Figure 73:
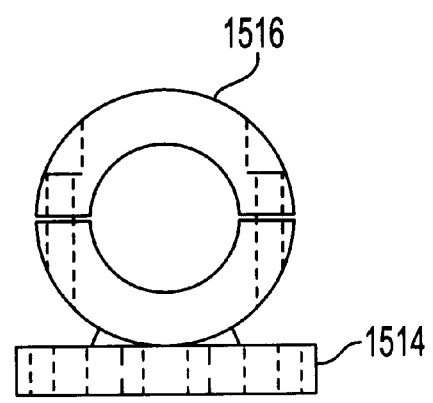
FIG. 73 is a cylindrical bracket of the actuator of FIG. 71.
Figure 73:
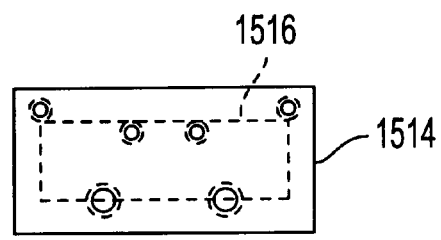

An idler sprocket assembly 1510 is fixed on the vertical member of the outside door arm 1508 above the air cylinder 1502. The idler sprocket assembly 1510 comprises an idler sprocket 1512, preferably ¼ pitch, rotatably mounted to a plate 1514. As can be seen in FIG. 76, a cylindrical bracket 1516 is fixed, preferably by welding, to the opposed surface of the plate 1514. The cylindrical bracket 1516 comprises two mating semi-circular members that, upon assembly, define a bore therethrough. As best viewed in FIG. 71, the two semi-circular members are adapted to be connected to the vertical member of an outside door arm 1508 by separating the halves, positioning the halves about the outside door arm 1508, and clamping the halves to the outside door arm 1508 by any suitable means. Specifically, the semi-circular members incorporates screws that pass through one semi-circular member and tighten upon threads tapped into the opposing semi-circular member. As shown in FIG. 73, the semi-circular members are fixed to the plate 1514 such that the bore is oriented substantially parallel to the air cylinder 1502. Moreover, the idler sprocket assembly 1510 is fixed to the door arm 1508 such that the axis of the idler sprocket 1512 is substantially parallel with the door under test. As configured, the idler sprocket 1512 is fixed to the plate 1514 and thereby to the door arm 1508, subject to the relative positioning of the idler sprocket 1512 to the door under test as described above, such that the leading toothed surface of the idler sprocket 1512 is coextensive with a center line of the air cylinder 1502.

The air cylinder piston 1504 is attached to a chain and spring assembly 1518, as described more fully below. The chain 1520 is fixed at one end to the spring assembly 1522 of the air cylinder 1502 and is attached at the other end to an outside handle base 1524. More particularly, the chain 1520 extends from the air cylinder spring assembly 1522 along the center line of the air cylinder 1502 to the leading toothed surface of the idler sprocket 1512 and thereafter extends downwardly to the outside handle base 1524. The outside handle base 1524 is fixed to the door handle.

Figure 74:
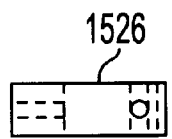
FIG. 74 is a C-shaped bracket of the actuator of FIG. 71.
Figure 74:
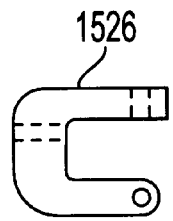

The outside handle base 1524 comprises a C-shaped bracket 1526, preferably constructed from aluminum, and a rod and spacer assembly 1528, preferably constructed from acetal resin or its equivalent including, for example DELRIN, mounted within the C-shaped bracket 1526. More particularly, as can be seen in FIG. 74, the C-shaped bracket 1526 includes a perpendicular portion disposed between two parallel portions. The C-shaped bracket 1526 includes a hole through the perpendicular portion through which a mechanical fastener passes to attach the chain 1520 to the C-shaped bracket 1526. Each of the parallel portions define a hole therethrough; the hole through the lower parallel portion, however, is aligned perpendicularly to the other holes. The rod 1530 has a tapped bore within a substantial portion of its length and has a diameter larger than the thickness of the lower parallel portion. The rod 1530 is fixed to the lower parallel portion by a mechanical fastener and extends perpendicularly to the other holes. As can be seen in FIG. 75, a spacer 1532 is positioned between the parallel portion coaxially with the hole of the upper parallel portion. The spacer 1532 is biased towards the rod 1530 by a bolt threaded in the hole of the upper parallel portion. As assembled to a handle of a door under test, the spacer 1532 is biased towards the outside surface of a horizontally hinged handle thereby clamping the handle between the spacer 1532 and the rod 1530.

The spring assembly 1522 comprises a conventional extension spring 1534 that allows relative movement between the air cylinder piston 1504 and the chain 1520. A suitable extension spring 1534 is a McMaster-Carr #9630K1 or equivalent. Generally, the extension spring 1534 must have a spring constant that will produce a force sufficient to open the outside door handle of the vehicle under test. The spring 1534 is disposed coaxially and coextensively with the piston 1504 of the air cylinder 1502. One end of the extension spring 1534 is connected to the chain 1520 while the other end abuts the air cylinder 1502. As configured, upon engagement of the air cylinder 1502 in a retracting direction, the extension spring 1534 is biased allowing the air cylinder piston 1504 to move relatively to the chain 1534. During the stroke of the piston 1504, the extension spring 1534 is also biased by a door handle load on the chain 1520 until the point where the spring force overcomes the door handle load. At such a point, continued retraction of the air cylinder piston 1504 pulls the chain 1520 and outside handle base 1524.

As configured, the extension spring assembly 1522 provides relative movement between the air cylinder piston 1504 and the chain 1520. This relative movement assures that constant tension is provided on the chain 1520 and takes up chain slack. Indeed, once the latch of the door under test is released, the door seal biases the door in an opening direction. During this time, the door may lead the chain 1520 thereby imparting slack to the chain 1520. Without the extension spring 1534, the actuator 1500 would open the handle of the door under test, allow the handle to close as slack formed in the chain 1520, and then jerk the handle open again as the chain 1520 and air cylinder piston 1504 caught up. However, the extension spring 1534 biases the chain 1520 to take up the slack such that the chain 1520 remains in tension. Moreover, the chain-tensioning capability of the extension spring 1534 prevents jerk-type loading on the door handle which would otherwise occur after the chain 1520 catches up with the leading door. In that regard, therefore, the outside door handle actuator 1500 is able to simulate the constant and uniform pull of a human opening the door handle.

The outside door handle actuator 1500 is provided preferably in two configurations. In the first configuration, the air cylinder 1502 is sized for smaller handle loads and smaller doors. As such, the first configuration is adapted typically for use with the small main frame 100. In the second configuration, the air cylinder 1502 is sized for larger handle loads and larger doors. As such, the second configuration is adapted typically for use with the medium mainframe 300 and large mainframe 500 since those frames usually are used with larger vehicles.

Check Load Actuator

Figure 77:
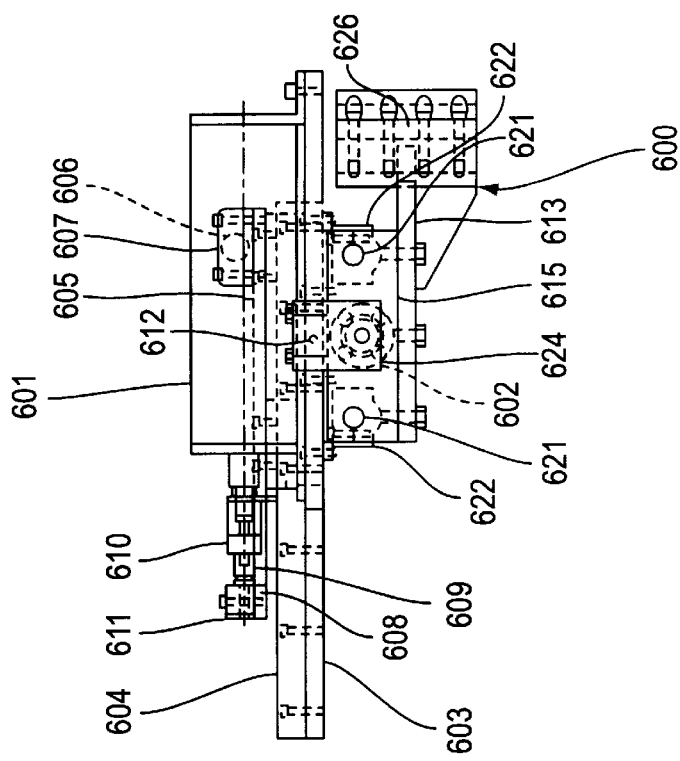
FIG. 77 is a side elevational view of the check load actuator of FIG. 76.

As shown in FIGS. 76 and 77, the check load fixture 600 loads the door under test beyond the full-open position. In that regard, the check load fixture 600 simulates an overload condition on the door that occurs, for example, when wind catches the door and pushes the door against the full open check. Additionally, given the modular configuration, the check load fixture 600 can also load the door under test in a substantially vertical direction.

Generally, the check load fixture 600, shown in FIGS. 76 and 77, comprises a pair of air cylinders 601, 602 disposed substantially perpendicular to each other thereby providing longitudinal and lateral movement of the fixture. While air fixtures are incorporated in this embodiment, one skilled in the art will recognize readily that any suitable actuator, including hydraulic or electric actuators, may be incorporated. The check load fixture 600 further comprises a cylindrical bracket 626 for securing the check load fixture 600 to an outside door arm.

Specifically, the check load fixture 600 comprises a load air cylinder mount 603, preferably an aluminum plate, having threaded bores therethrough spaced at uniform intervals providing the attachment points for a load air cylinder 601. A linear bearing 604 is disposed on the load air cylinder mount 603, and a shaft carriage 605 is mounted slidably thereto. A load shaft 606 is fixed perpendicularly to the slidable shaft carriage 605 with a clamp 607 and extends laterally therefrom. The load shaft 606 provides the bearing surface which engages and loads the door under test. Preferably, a flat bearing surface is disposed on the free end of the load shaft 606 to provide a better contact to the door under test.

The shaft carriage 605 includes a flange 608 extending perpendicularly to the longitudinal direction of the load air cylinder mount 603 and diagonally opposite from the load shaft 606. The load air cylinder 601 is fixed to the load air cylinder mount 603 and is spaced laterally from and substantially parallel to the linear bearing 604 but aligned longitudinally with the flange 608 of the shaft carriage 605. A piston 609 of the load air cylinder 601 having a load cell 610 attached at its free end is fixed with a clamp 611 to the flange 608 of the shaft carriage 605. Activation of the air cylinder 601 displaces the shaft carriage 605 in a longitudinal direction. The load cell 610 provides a feedback signal proportional to the load applied and is incorporated into the control apparatus, described below.

Figure 78:
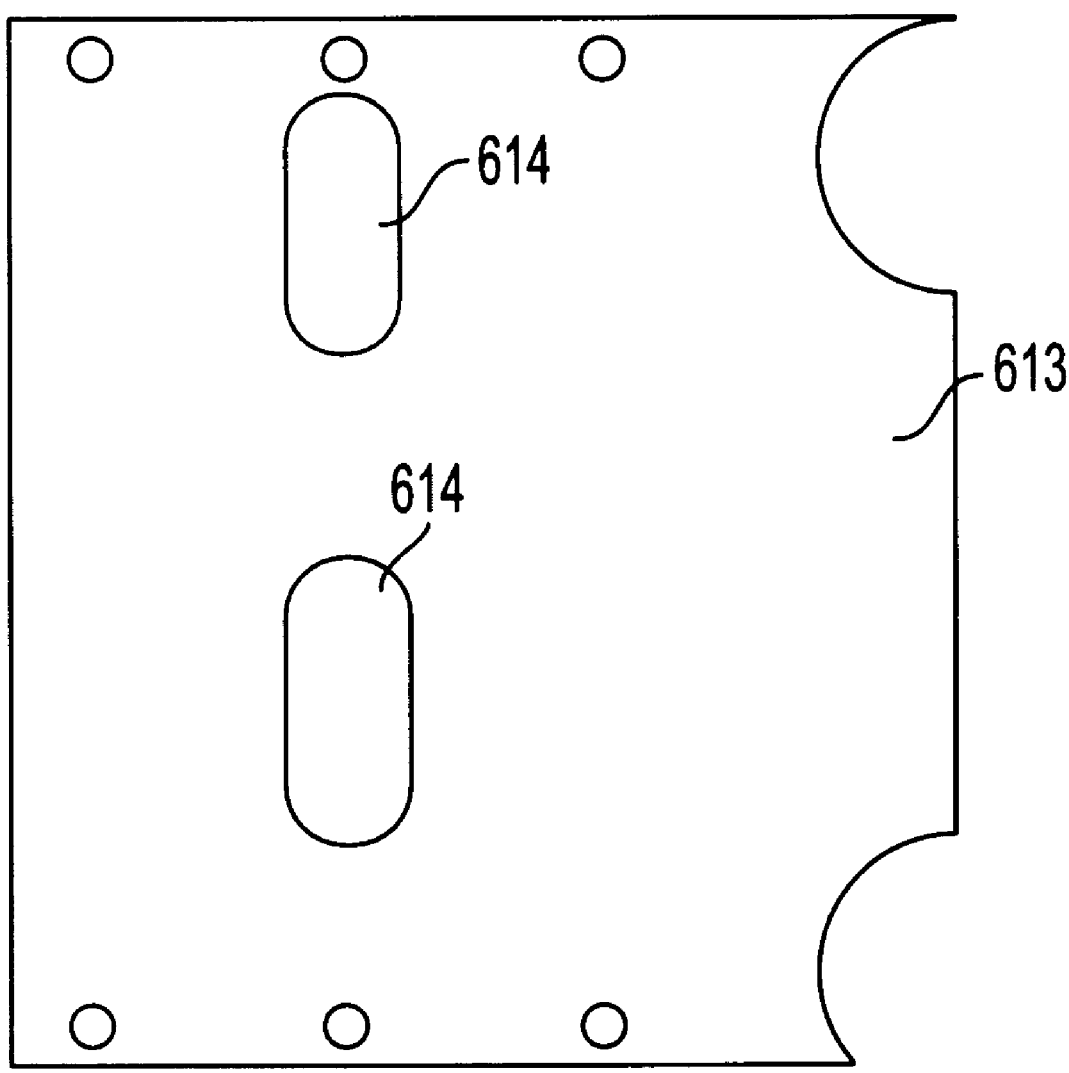
FIG. 78 is a lateral air cylinder mount of the actuator of FIG. 76.

Disposed below the load air cylinder mount 603, a lateral air cylinder assembly 612 is provided. One skilled in the art will recognize that the lateral air cylinder assembly 612 can be disposed effectively above the load air cylinder mount 603 as well. The lateral air cylinder assembly 612 comprises a lateral air cylinder mount 613 having a plurality of holes at each of opposing lateral sides. As shown in FIG. 78, the lateral air cylinder mount 613 also defines a pair of slots 614 providing convenient passages for air hoses. Clamping blocks 615, 616 are attached to each of the opposing sides of the lateral air cylinder mount 613 at the provided holes.

Figure 79:
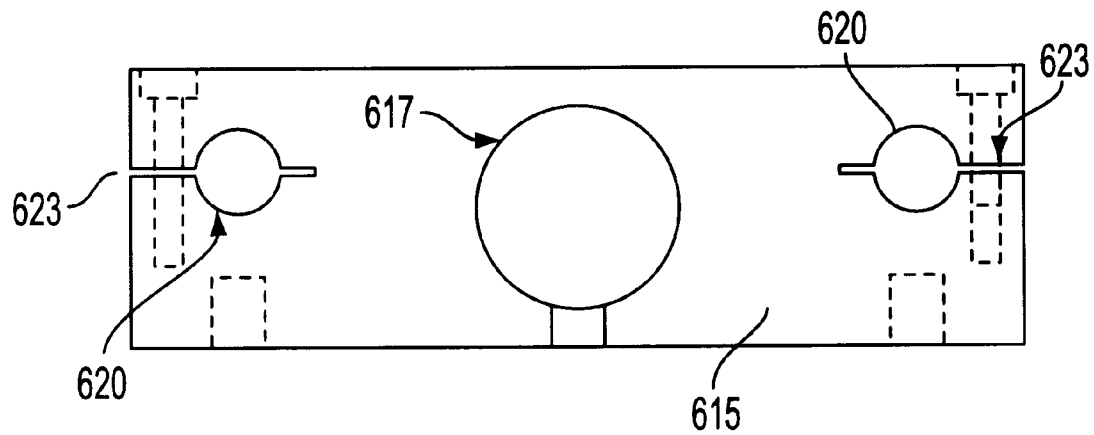
FIG. 79 is a clamping block of the actuator of FIG. 76.
Figure 80:
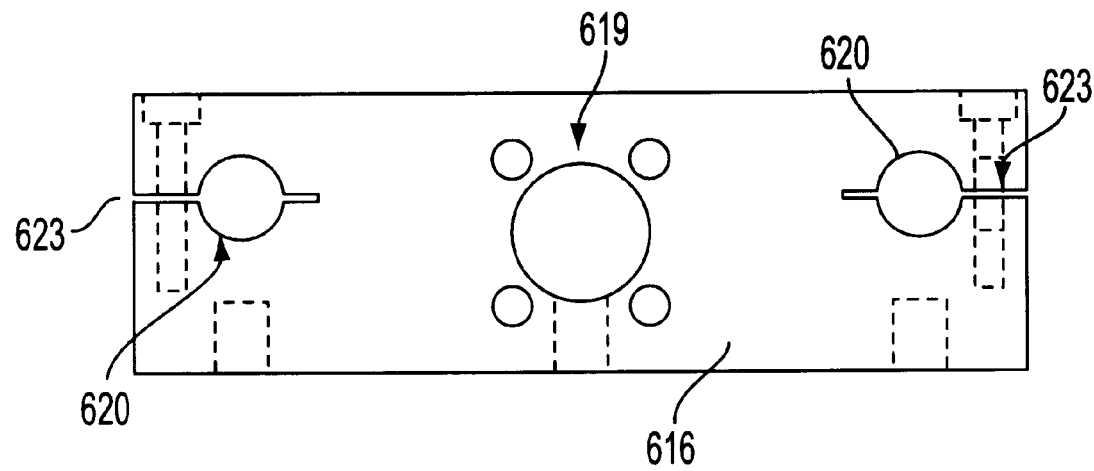
FIG. 80 is a mount of the actuator of FIG. 76.

Mechanical fasteners passing through the holes secure the clamping blocks 615, 616 to the lateral air cylinder mount 613. The clamping block 615 shown in FIG. 79 defines a centrally positioned hole 617 through which a piston 618 of a lateral air cylinder 602 passes. The clamping block 616 shown in FIG. 80 provides a centrally positioned mount 619 for the lateral air cylinder 602. Both of the clamping blocks 615, 616 define two holes 620 spaced laterally from the center providing attachment points for shafts 621 slidably mounted in ball bushing bearings 622. In the present embodiment, the laterally spaced holes 620 include expansion slits 623 extending from the holes 620. Once a shaft 621 is positioned within a lateral hole 620, the surrounding mount 615, 616 can be clamped onto the shaft 621 by mechanical fasteners.

The ball bushing bearings 622 are mounted to an opposed surface of the load air cylinder mount 603, and, thereafter, the shafts 621 are inserted into the bearings 622 and fixed to the clamps 615, 616. In this configuration, the lateral air cylinder mount 613 can slide relative to the load air cylinder mount 603. The lateral air cylinder 602 is fixed to the clamp 616 and lateral air cylinder mount 613 such that the piston 618 is extensible through the hole 617 of the clamp 615. The free end of the piston 618 is connected to an L-shaped bracket 624 with a clamp 625 such the bracket 624 extend upwardly to the load air cylinder mount 603. The L-shaped bracket 624 is fixed to the load air cylinder mount 603 such that, upon activation of the lateral air cylinder 602, the load air cylinder mount slides 603 laterally relative to the lateral air cylinder mount 613.

Finally, the check load fixture 600 comprises a cylindrical bracket 626. The cylindrical bracket 626 comprises two mating semi-circular members that, upon assembly, define a bore therethrough. The two semi-circular members are adapted to be connected to the vertical arm of a pivot arm of an outside door actuator by separating the halves, positioning the halves about the vertical arm of the pivot arm, and clamping the halves to the pivot arm by any suitable means. Specifically, the semi-circular members of the upper pivot bracket incorporates screws that pass through one semi-circular member and tighten upon threads tapped into the opposing semi-circular member. The cylindrical bracket 626 is fixed, preferably by welding, to the lateral air cylinder mount 613 such that bore of the bracket 626 is substantially perpendicular to the lateral air cylinder mount 613. Preferably, a brace is fixed between the cylindrical bracket 626 and the lateral air cylinder mount 613.

The check load fixture should be provided preferably in two sizes. A short check load fixture should be adapted for relatively shorter actuator strokes, while a long check load fixture should be adapted for relatively longer actuator strokes. Each of the check load fixtures are constructed and arranged identically except for their relative dimensions and the stroke of the air cylinders incorporated therein.

SYSTEM DESCRIPTION

Figure 81:
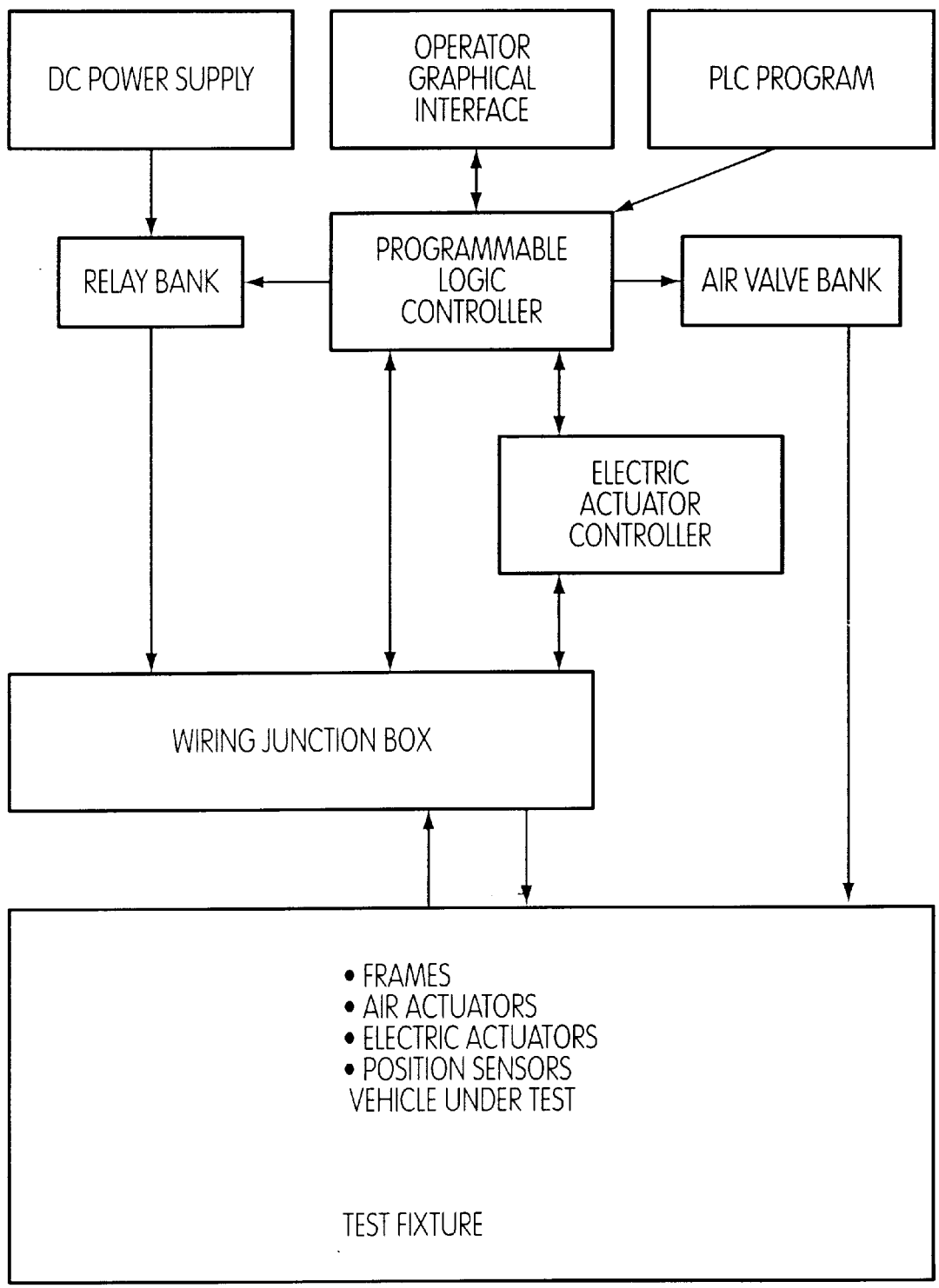
FIG. 81 is a door cycle test system block diagram of the present invention.

The CST apparatus operates as a system to simultaneously cycle all vehicle closures (1) without loading the vehicle under test with extraneous mass or force in a manner that simulates human use and (2) on a portable platform that allows the vehicle under test to be transported to different test locations without the need for reconfiguration. The configuration and operation of the frames and actuation modules are described above. As shown in FIG. 81, the actuation modules and frames are only one part of the total CST system and are represented collectively by the TEST FIXTURE block.

Figure 82:
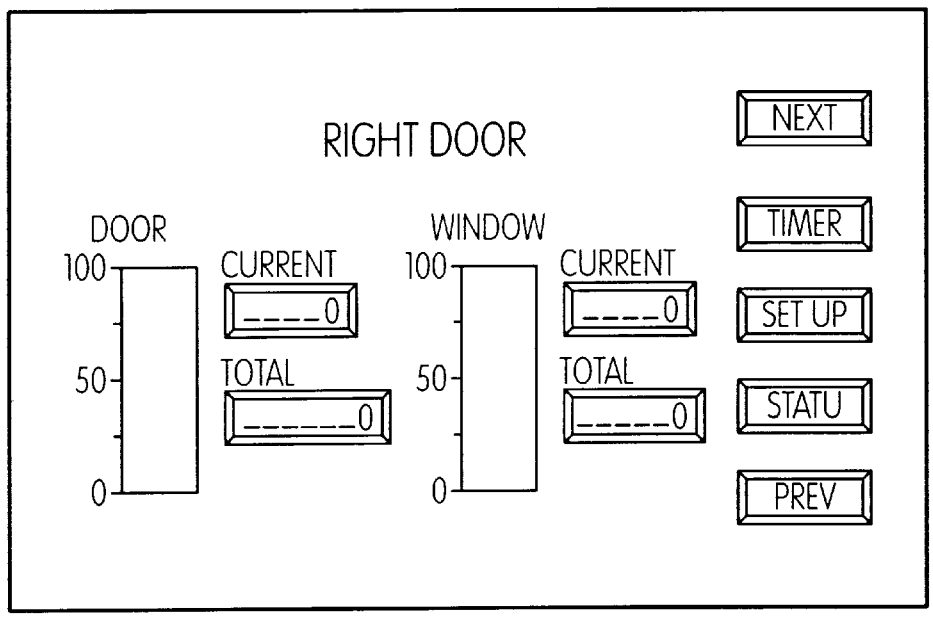
FIG. 82 is a graphical display of the present invention.
Figure 83:
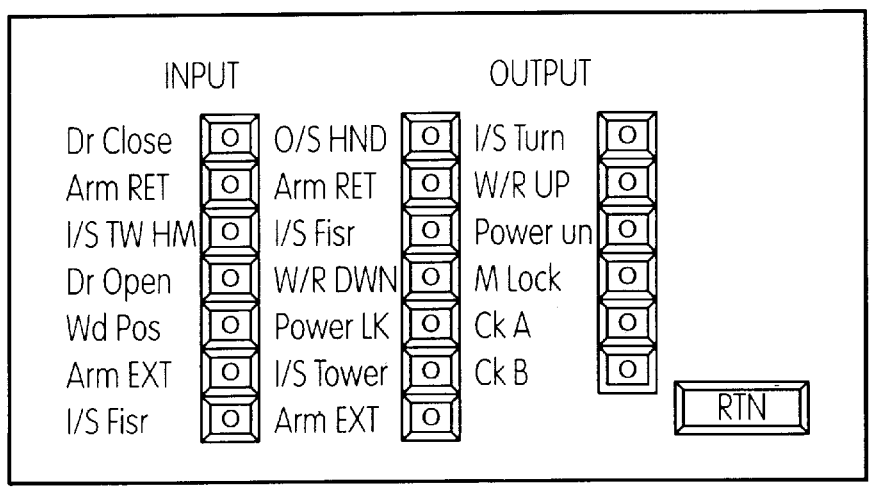
FIG. 83 is a graphical display of the present invention.

Central to the control and operation of the CST system is a programmable logic controller (PLC) represented by a block of the same name. The PLC is a matter of design choice and can be either a computer, for example a PC or workstation, or a dedicated controller. Any controller having sufficient outputs to control the expected number of relays and air valve banks is acceptable. A PLC program, adapted, of course, for use on the selected controller, provides the control algorithms, discussed below, for operation of the CST system. Preferably, the PLC should include an OPERATOR GRAPHICAL INTERFACE (OGI) that provides the user with, at least, the current number of door cycles and the total number of door cycles. Such a graphical interface is shown in FIG. 82. As shown in FIG. 83, the OGI should provide preferably a screen indicating the status of PLC inputs and outputs. Such inputs and outputs would include door open/closed status, door actuator extended/retracted status, and handle and/or lock status (if such actuators are used).

Again as shown in FIG. 81, the PLC output controls a RELAY BANK and an AIR VALVE BANK. The relay bank contains a plurality of relays, the number of which is determined by the number of modules, for activating or energizing the actuation modules. The relay bank is powered by a DC POWER SUPPLY. As described below the relay bank is connected to a WIRING JUNCTION BOX. Similarly, the air valve bank contains a plurality of air valves, the number of which is determined by the number of air cylinders used, for operating the air cylinders. The air valve bank is connected to the test fixture.

Since the object of the CST system is to simulate human closure of vehicle doors, as described above, electric actuators are most suitably incorporated into the CST system because they provide the best control over velocity profiles of door closure. Consequently, the PLC is interfaced to an ELECTRIC ACTUATOR CONTROLLER. The electric actuator controller is connected to the wiring junction box.

Any electric actuator that can output a velocity profile necessary to cycle a vehicle door in a manner that simulates human closure of a door is acceptable. The electric actuator should be able to accelerate a door under test to higher velocity levels to slam the door as well as provide substantially constant velocity closure of doors. Industrial Devices Corporation H3301 series electric actuators are suitable for this application. Such actuators incorporate travel limit switches to detect the linear or rotary position of the actuator. The electric actuator controller provides the interface between the PLC and the electric actuator for the transfer of control and feedback signals.

The wiring junction box and the air valve bank are provide with quick disconnects of any suitable make or design that allow easy disconnection of the test fixture from and reconnection to the remaining CST system. As configured, the test fixture can be disconnected from the PLC and transported to a different test site on the moving gears and thereafter be reconnected at the new site, for example, a temperature chamber.

Figure 84:
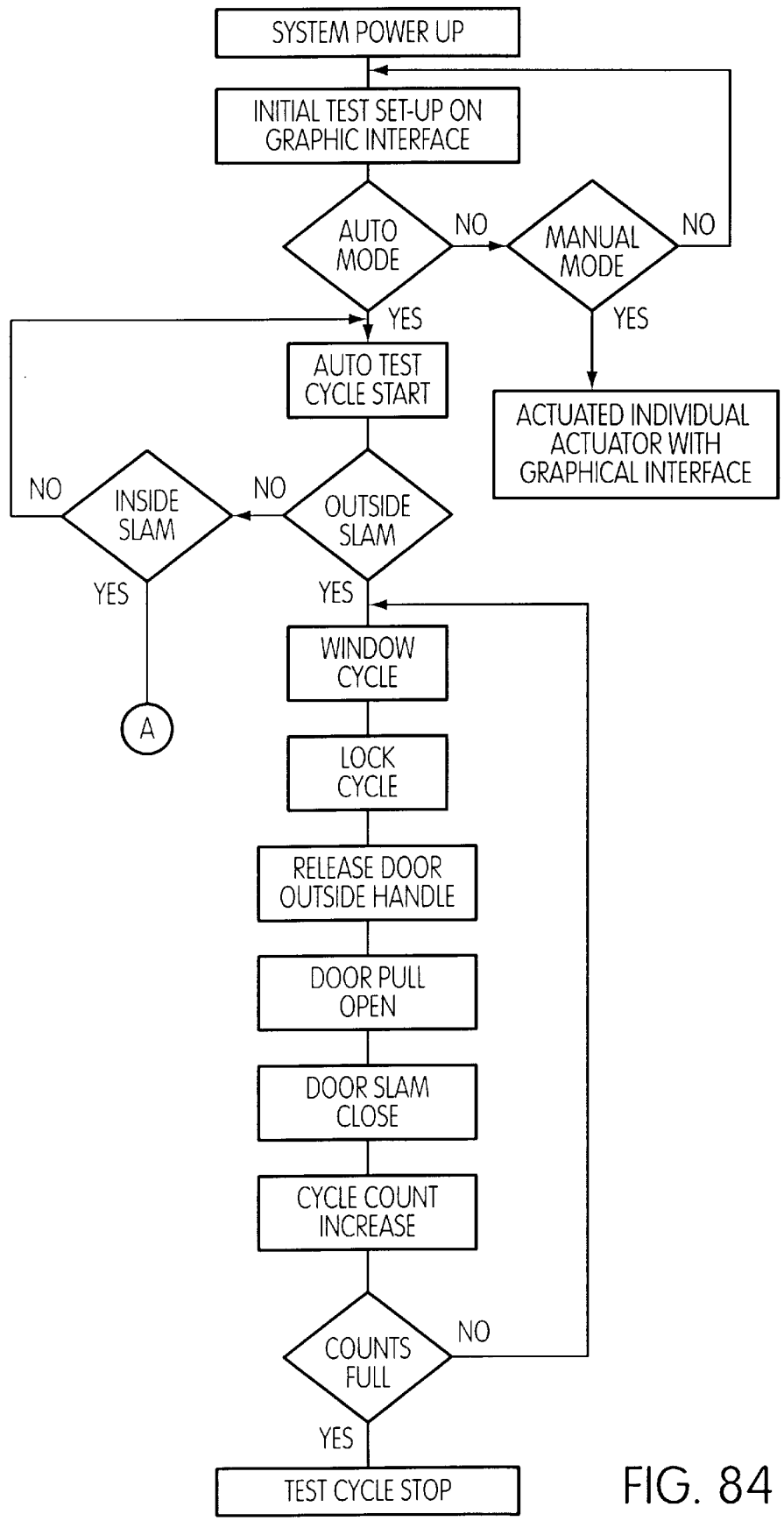
FIG. 84 is a door cycle program flowchart of the present invention.
Figure 85:
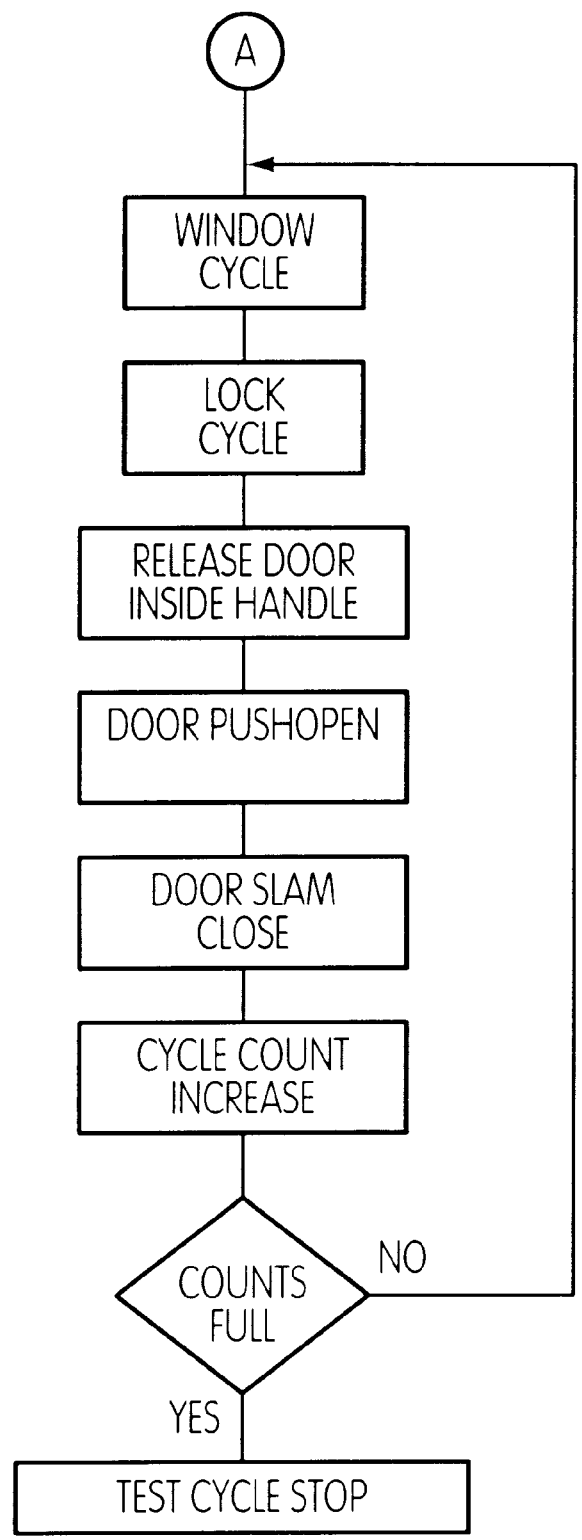
FIG. 85 is a door cycle program flowchart of the present invention.

FIGS. 84 through 89 show in flow chart form the algorithms used by the PLC program to control the test fixture. As shown in FIG. 84, following system power up and initial test set-up, the PLC program provides the option of cycling the test fixture in automatic or manual mode. Once the PLC receives confirmation of automatic cycling, the automatic test cycle begins. Initially, the PLC program determines whether the door under test will be cycled form the inside or outside of the vehicle. FIG. 84 shows the program control for an outside door actuator, while FIG. 85 shows the program control for an inside door actuator. Generally in both cases, the door window is cycled (if such an actuator is being utilized), the door lock is then cycled (again, if such an actuator is utilized), the door latch is released by activation of either an inside handle actuator or an outside handle actuator, as applicable, the door is pulled or pushed open, as applicable, and finally, the door is pulled or pushed closed, as applicable. Once the PLC receives confirmation that the door is closed, the program increments a cycle count. In the final step, the PLC program checks the cycle count with a pre-programmed full count and either stops the cycling if the cycle count equals the full count or continues cycling if the cycle count is less than the full count.

FIGS. 84 and 85 only show the flow control for a single door. One skilled in the art will appreciate that the PLC can control multiple doors simultaneously.

Figure 86:
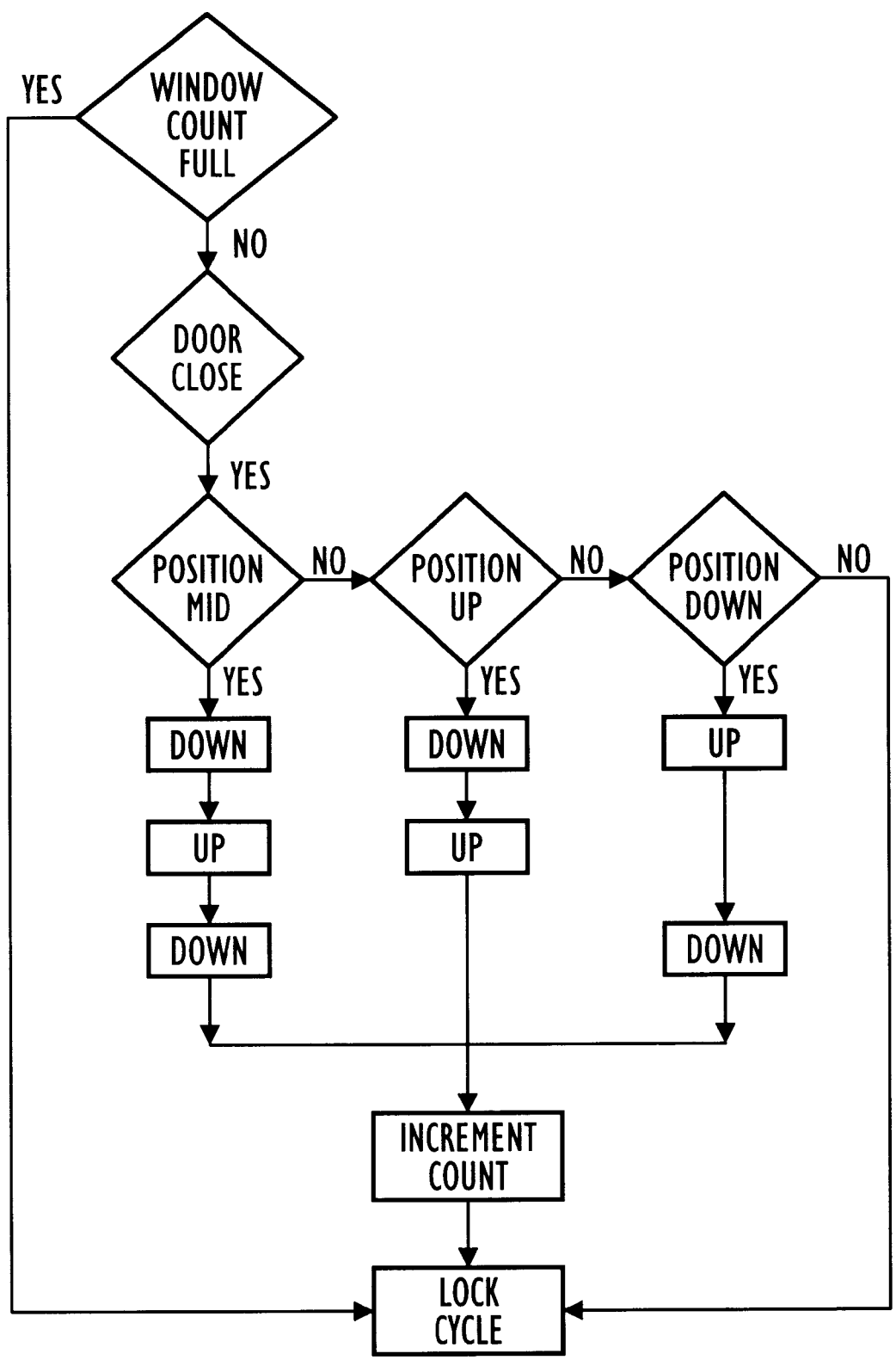
FIG. 86 is a window cycle flowchart of the present invention.

FIG. 86 shows the program flow for a window actuator. The PLC program checks the cycle count and verifies that the door is closed prior to cycling the window under test. Thereafter, the window position is determined so that a full cycle of the window can be performed. After the window is cycled, the cycle count is incremented. The PLC program exits from the window cycle when the cycle count reaches a pre-programmed level.

Figure 87:
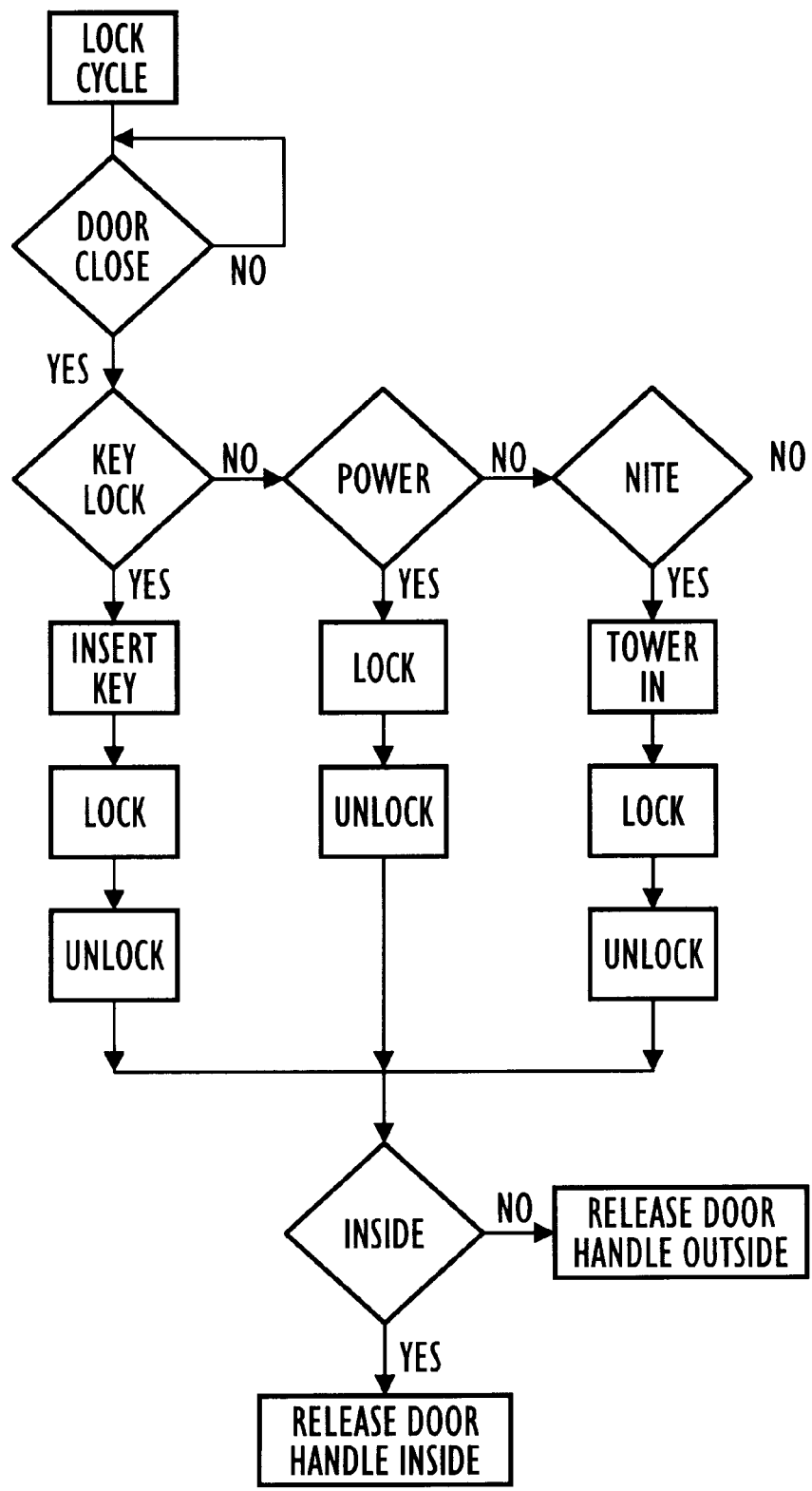
FIG. 87 is a lock cycle flowchart of the present invention.

FIG. 87 shows the program flow for a lock actuator. As with the window cycle program, the PLC program checks the cycle count and verifies that the door is closed prior to cycling the door lock under test. The PLC program verifies the lock type—key, power, or night or plunger type lock— and thereafter cycles the lock. Program control then passes to either an outside or inside handle control as applicable.

Figure 88:
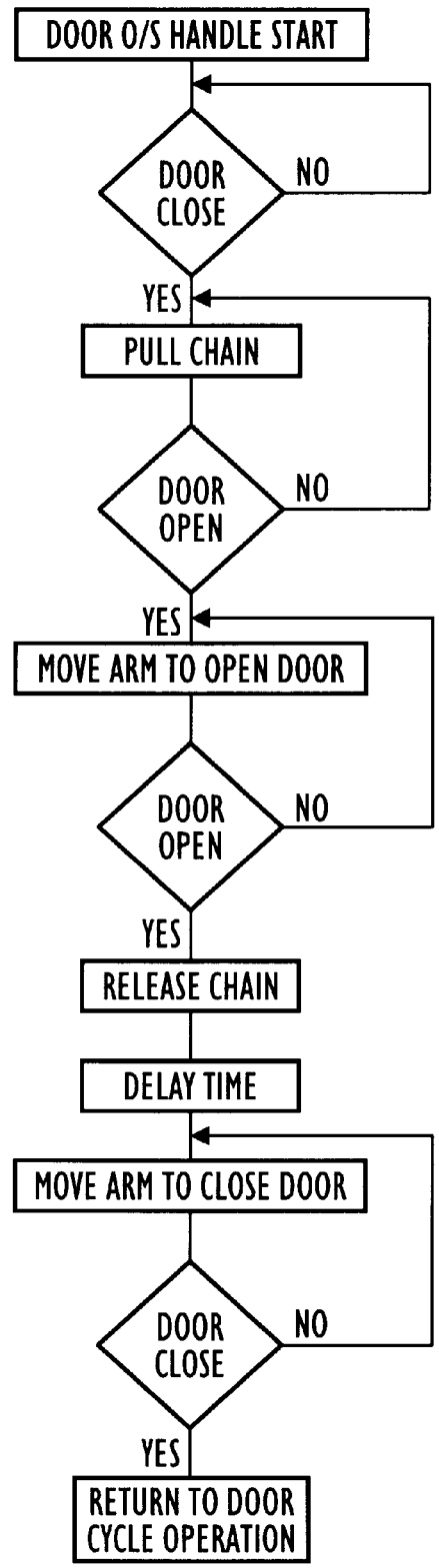
FIG. 88 is a outside door handle flowchart of the present invention.
Figure 89:
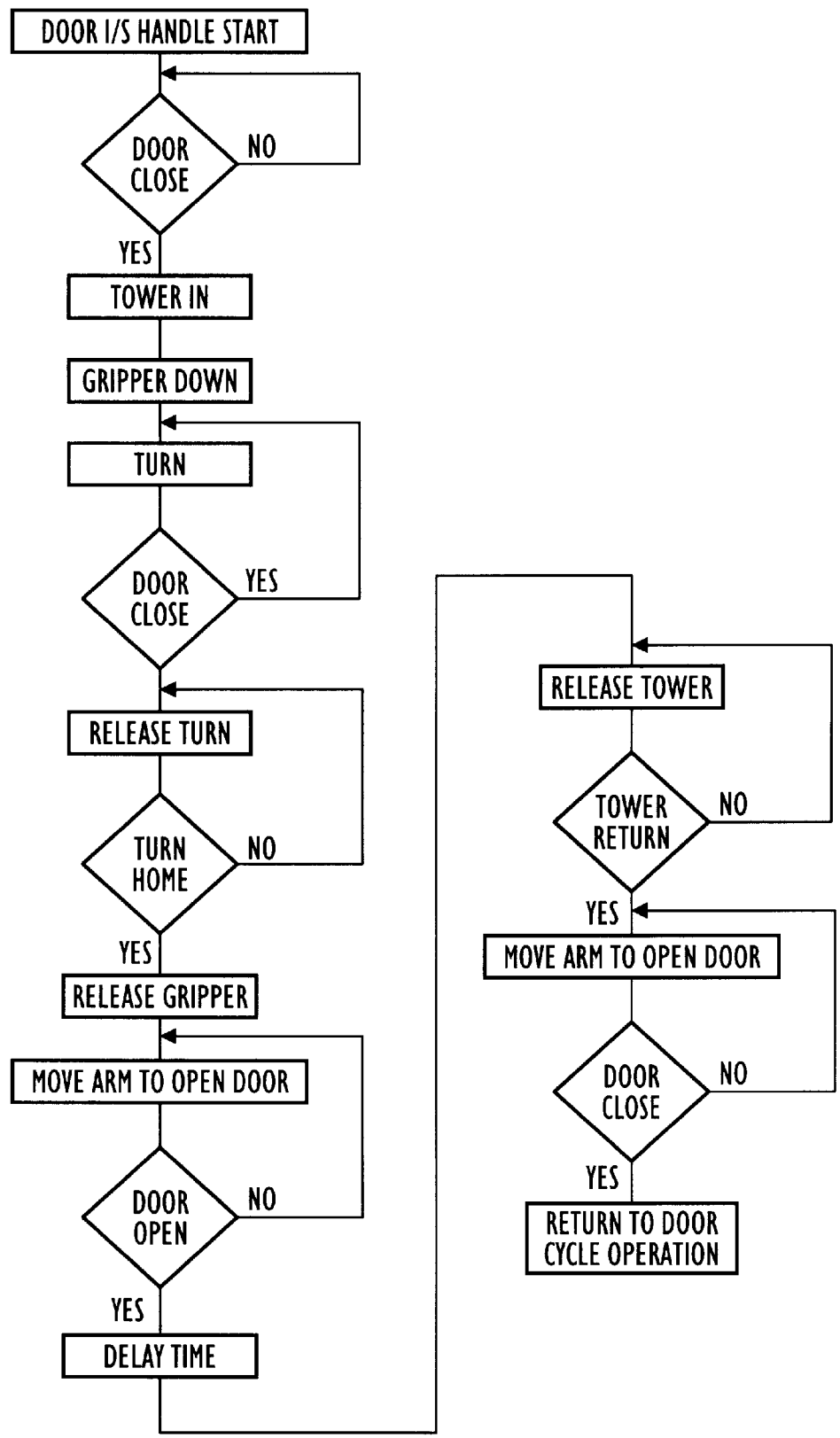
FIG. 89 is an inside door handle flowchart of the present invention.

FIGS. 88 and 89 show the program flow control for an outside and inside handle actuator, respectively.

One skilled in the art will recognize readily that the sequence of program flow control can proceed in orders other than that described above (except, of course, a door latch of a latched door must be released before the door is opened). Additionally, windows and locks can be cycled in batch prior to cycling the door, or they can be cycled incrementally each time the door is cycled.

What is claimed is:

1. In a vehicle closure testing apparatus for opening and closing a vehicle door of a vehicle under test, the vehicle door having a surface and an axis of rotation, said apparatus including a supporting structure adapted to be positioned adjacent to the vehicle under test such that said supporting structure is in a spaced relationship to the surface of the vehicle door and is disposed in an operative position relative to the vehicle under test during a testing of the vehicle door, a door moving mechanism movably disposed on said supporting structure at a position on said supporting structure that enables said door moving mechanism to engage an area of contact on the surface of the vehicle door having the axis of rotation when said supporting structure is in said operative position, said door moving mechanism being constructed and arranged to move in a first direction and in a second direction counter to said first direction such that said door moving mechanism can engage the area of contact on the surface of the vehicle door and move the vehicle door in an opening direction and a closing direction, an electric actuator having an extensible member operatively associated with said door moving mechanism, said electric actuator being constructed and arranged to activate said door moving mechanism by extending and retracting said extensible member to cause said door moving mechanism to engage and move the vehicle door in the opening direction and the closing direction, and an electric actuator controller communicating with said electric actuator so as to transfer a control signal to said electric actuator and to receive a feedback signal indicative of door movements during the movement of said door moving mechanism such that said electric actuator controller can control said electric actuator to obtain a desired velocity profile in the movement of the vehicle door by said door moving mechanism, the improvement which comprises:

a programmable logic controller communicating with said electric actuator controller, said programmable logic controller having an input for receiving said feedback signal from said electric actuator indicative of said door movements and an output for transferring said control signal from said programmable logic controller to said electric actuator controller such that said electric actuator controller can control said electric actuator to obtain the desired velocity profile in the movement of the vehicle door by said door moving mechanism;

a positional sensor associated with said electric actuator, said positional sensor being adapted to detect a degree of extension of said extensible member of said electric actuator and to output said feedback signal as a positional feedback signal indicative of the degree of extension of said extensible member, wherein said programmable logic controller determines a velocity of the vehicle door based upon said positional feedback signal, and wherein said programmable logic controller responsively adjusts said control signal based upon said positional feedback signal from said positional sensor to control said electric actuator to obtain the desired velocity profile.

2. The vehicle closure testing apparatus according to claim 1, wherein the positional sensor comprises a plurality of travel limit switches to detect a linear position of said extensible member of said electric actuator.

3. The vehicle closure testing apparatus according to claim 1, wherein the programmable logic controller can control the electric actuator to cause said door moving mechanism to move the vehicle door at a constant velocity.

4. The vehicle closure testing apparatus according to claim 1, wherein the programmable logic controller can control the electric actuator to cause said door moving mechanism to accelerate and slam the vehicle door.

5. The vehicle closure testing apparatus according to claim 1, wherein the programmable logic controller stores a count indicative of the number of times said door moving mechanism has cycled the vehicle door opened and closed, wherein the programmable logic controller determines when said door moving mechanism has closed the vehicle door and increments said count by one, said programmable logic controller stops vehicle door testing when said count equals a preset value.

6. In a vehicle closure testing apparatus for opening and closing a vehicle door of a vehicle under test, the vehicle door having a surface and an axis of rotation, said apparatus including a supporting structure adapted to be positioned adjacent to the vehicle under test such that said supporting structure is in a spaced relationship to the surface of the vehicle door and is disposed in an operative position relative to the vehicle under test during a testing of the vehicle door, a door moving mechanism movably disposed on said supporting structure at a position on said supporting structure that enables said door moving mechanism to engage an area of contact on the surface of the vehicle door having the axis of rotation when said supporting structure is in said operative position, said door moving mechanism being constructed and arranged to move in a first direction and in a second direction counter to said first direction such that said door moving mechanism can engage the area of contact on the surface of the vehicle door and move the vehicle door in an opening direction and a closing direction, an electric actuator having a rotary member operatively associated with said door moving mechanism, said electric actuator being constructed and arranged to activate said door moving mechanism by rotating said rotary member to cause said door moving mechanism to engage and move the vehicle door in the opening direction and the closing direction, and an electric actuator controller communicating with said electric actuator so as to transfer a control signal to said electric actuator and to receive a feedback signal indicative of door movements during the movement of said door moving mechanism such that said electric actuator controller can control said electric actuator to obtain a desired velocity profile in the movement of the vehicle door by said door moving mechanism, the improvement which comprises:

a programmable logic controller communicating with said electric actuator controller, said programmable logic controller having an input for receiving said feedback signal from said electric actuator indicative of said door movements and an output for transferring said control signal from said programmable logic controller to said electric actuator controller such that said electric actuator controller can control said electric actuator to obtain the desired velocity profile in the movement of the vehicle door by said door moving mechanism;

a positional sensor associated with said electric actuator, said positional sensor being adapted to detect a degree of rotation of said rotary member of said electric actuator and to output said feedback signal as a positional feedback signal indicative of the degree of rotation of said rotary member of said electric actuator, wherein said programmable logic controller determines a velocity of the vehicle door based upon said positional feedback signal, and wherein said programmable logic controller responsively adjusts said control signal based upon said positional feedback signal from said positional sensor to control said electric actuator to obtain the desired velocity profile.

7. The vehicle closure testing apparatus according to claim 6, wherein the positional sensor comprises a plurality of travel limit switches to detect a rotary position of said rotary member of said electric actuator.

8. The vehicle closure testing apparatus according to claim 6, wherein the programmable logic controller can control the electric actuator to cause said door moving mechanism to move the vehicle door at a constant velocity.

9. The vehicle closure testing apparatus according to claim 6, wherein the programmable logic controller can control the electric actuator to cause said door moving mechanism to accelerate and slam the vehicle door.

10. The vehicle closure testing apparatus according to claim 6, wherein the programmable logic controller stores a count indicative of the number of times said door moving mechanism has cycled the vehicle door opened and closed, wherein the programmable logic controller determines when said door moving mechanism has closed the vehicle door and increments said count by one, said programmable logic controller stops vehicle door testing when said count equals a preset value.

* * * * *